(12) United States Patent
Lawler et al.

(10) Patent No.: US 7,550,682 B2
(45) Date of Patent: Jun. 23, 2009

(54) MEASURING DEVICE, SUCH AS A SCALE OR MEDICAL SCALE

(75) Inventors: Matthew H. Lawler, Homergeln, IL (US); Paul D. Nizzere, Darien, IL (US); Theron Kotze, Chicago, IL (US)

(73) Assignee: Pelstar, LLC, Bridgeview, IL (US)

( * ) Notice: Subject to any disclaimer, the term of this patent is extended or adjusted under 35 U.S.C. 154(b) by 0 days.

(21) Appl. No.: 10/574,385

(22) PCT Filed: Oct. 1, 2004
(Under 37 CFR 1.47)

(86) PCT No.: PCT/US2004/032609

§ 371 (c)(1),
(2), (4) Date: Jul. 24, 2007

(87) PCT Pub. No.: WO2005/033637

PCT Pub. Date: Apr. 14, 2005

(65) Prior Publication Data

US 2008/0223625 A1 Sep. 18, 2008

Related U.S. Application Data

(60) Provisional application No. 60/508,565, filed on Oct. 3, 2003.

(51) Int. Cl.
*G01G 21/28* (2006.01)
(52) U.S. Cl. ............... 177/25.16; 177/126; 177/238
(58) Field of Classification Search ............. 177/25.16, 177/126, 127, 177, 238, 244
See application file for complete search history.

(56) References Cited

U.S. PATENT DOCUMENTS

| 3,743,040 | A | | 7/1973 | Hutchinson et al. |
| 4,013,135 | A | | 3/1977 | Kechely |
| 4,441,568 | A | * | 4/1984 | Heffner ................ 177/129 |
| 5,612,515 | A | * | 3/1997 | Eisen .................. 177/126 |

(Continued)

FOREIGN PATENT DOCUMENTS

BR 6801820 4/1990

(Continued)

OTHER PUBLICATIONS

Supplementary European Search Report for EP 04794087, dated Jul. 31, 2008.

*Primary Examiner*—Randy W Gibson
(74) *Attorney, Agent, or Firm*—Michael Best & Friedrich LLP

(57) ABSTRACT

A medical scale for determining the weight of a person where the person is one of self-supported, partially self-supported, and supported by a support device, such as a wheelchair. In some embodiments, the scale is provided with wheels to be portable. Also, some scales can be folded, pivoted, or adjusted into a more compact structure to be moved or stored. Some embodiments include an interface that can be swivelable and/or pivotable to allow the display to be viewed from a variety of directions. Some embodiments can also communicate with a network. The scale can also have individual adjustable load cells. The scale can also be configured to accept a Swipe card, smart card, or light pen to match patient identification with a measured weight.

23 Claims, 66 Drawing Sheets

U.S. PATENT DOCUMENTS

| | | | |
|---|---|---|---|
| 5,878,376 A * | 3/1999 | Schurr | 702/102 |
| 6,038,465 A * | 3/2000 | Melton, Jr. | 600/407 |
| 6,256,532 B1 | 7/2001 | Cha | |
| 6,369,337 B1 * | 4/2002 | Machiyama et al. | 177/25.13 |
| 6,403,897 B1 * | 6/2002 | Bluth et al. | 177/144 |
| 6,441,323 B1 | 8/2002 | Montagnino et al. | |
| 6,472,617 B1 | 10/2002 | Montagnino | |
| 6,576,849 B2 * | 6/2003 | Bliss et al. | 177/25.13 |
| 6,590,166 B2 * | 7/2003 | Yoshida | 177/25.13 |
| 6,646,209 B2 | 11/2003 | Montagnino et al. | |
| 6,700,080 B2 | 3/2004 | Stephens | |
| 6,825,425 B2 | 11/2004 | Perry | |
| 2002/0066602 A1 | 6/2002 | Bliss et al. | |
| 2002/0148654 A1 | 10/2002 | Montagnino et al. | |

FOREIGN PATENT DOCUMENTS

| | | |
|---|---|---|
| JP | 62130316 | 6/1987 |
| JP | 09113344 | 5/1997 |
| WO | 03067373 | 8/2003 |

* cited by examiner

Base Top

Front Load Cell Mounting

Load Cell Mounting

Middle Reinforces
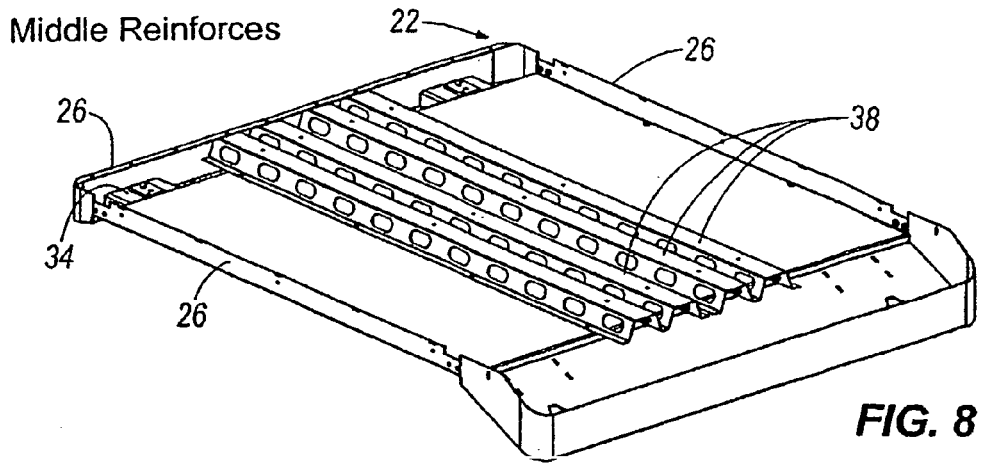
FIG. 8
FIG. 9
Side Reinforces
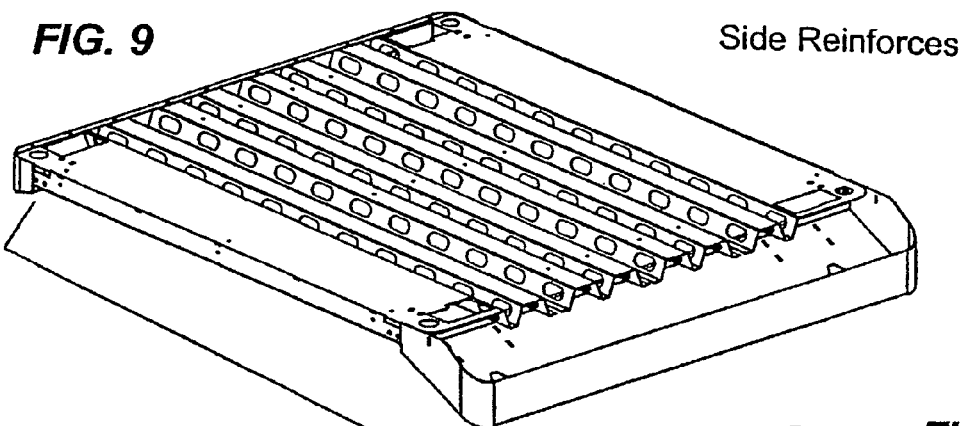
FIG. 10
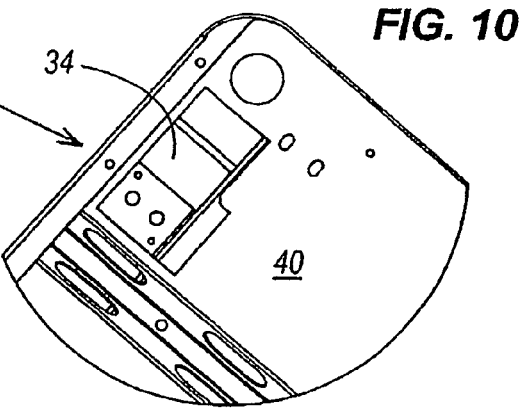
FIG. 11
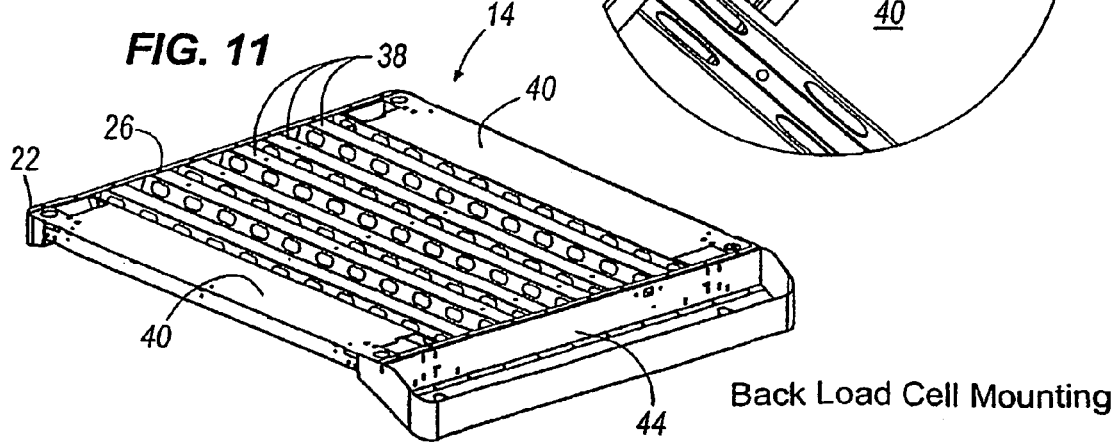
Back Load Cell Mounting Pillar Mounting Support Back Load Cell Mounting Pillar and Head Mounting Assembly

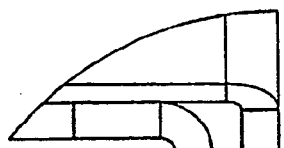
FIG. 21
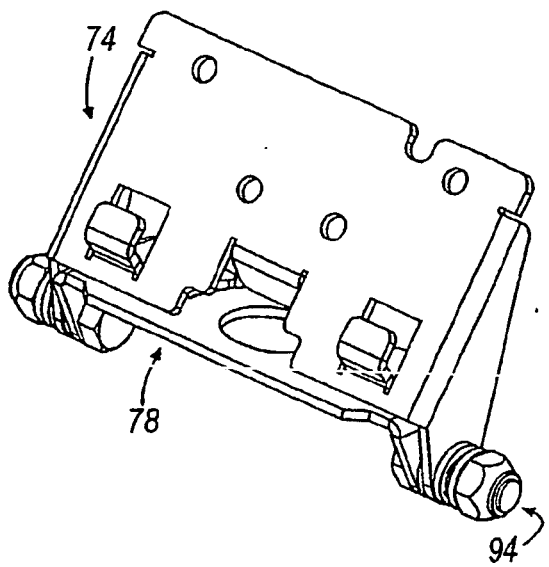
FIG. 22
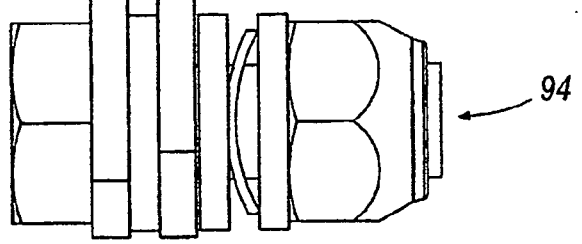
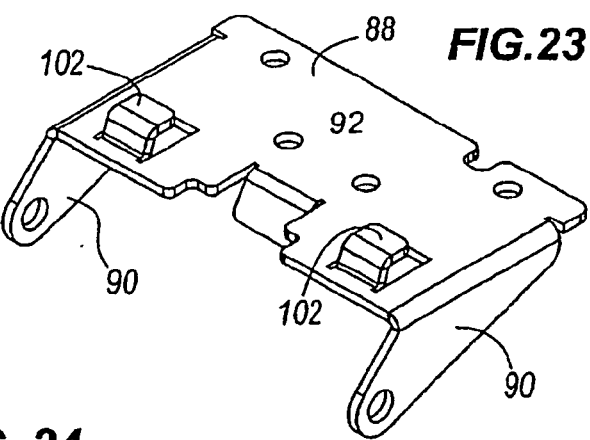
FIG. 23
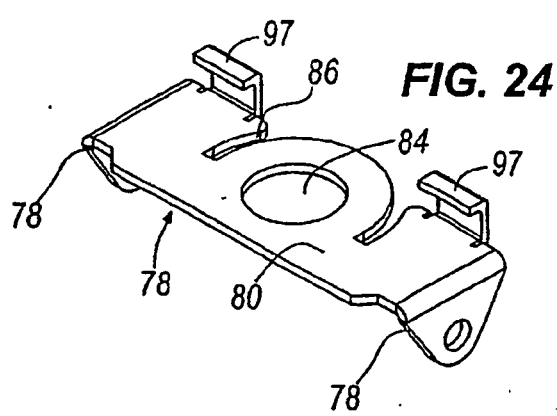
FIG. 24

Ramp and Hinge Assembly

Head Assembly

In Mold Inserts

Ultrasonic/Heat Welding Inserts

Self-Tapping Screw

Front View

Key Pad Connector Outlet

Weight 28 Kg (61.5 lb)

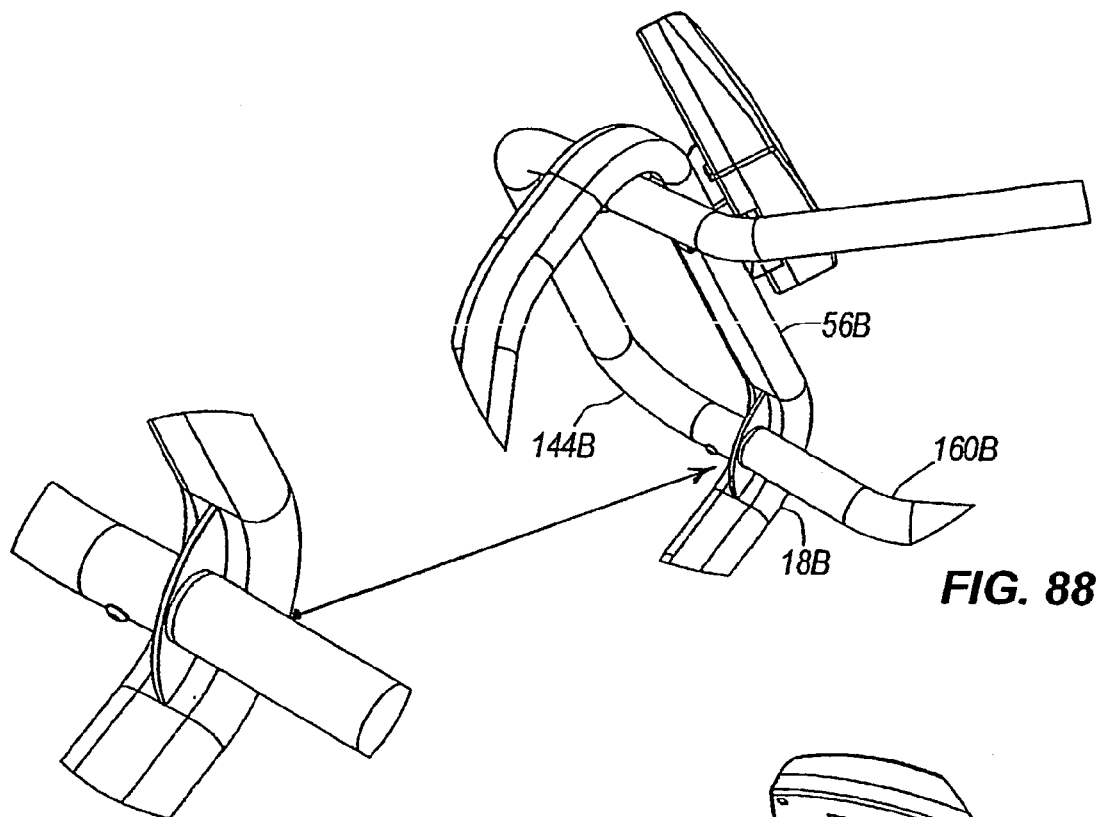
FIG. 88
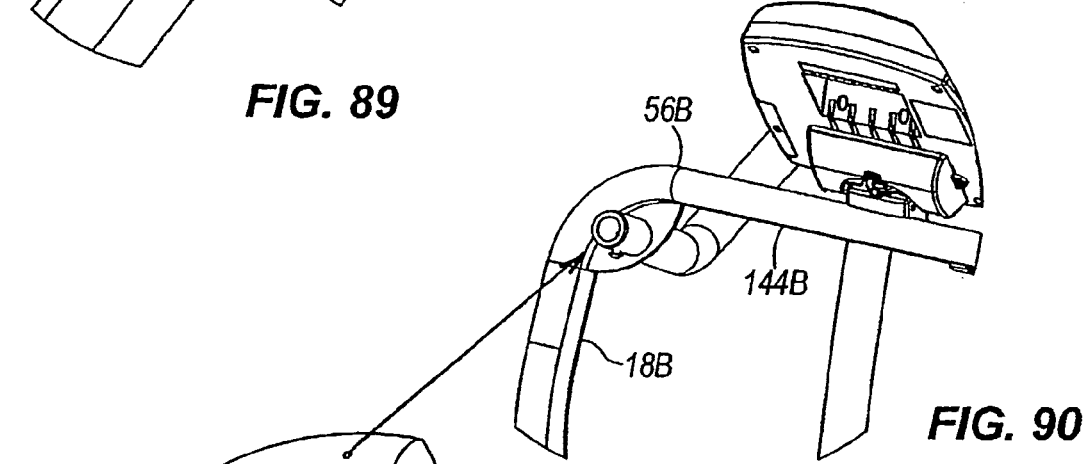
FIG. 89
FIG. 90
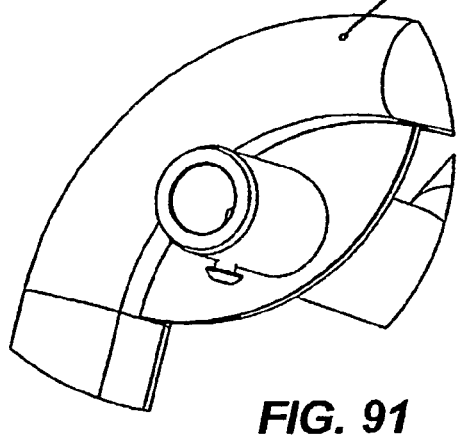
FIG. 91

Weight 48 Kg (105.5 lb)

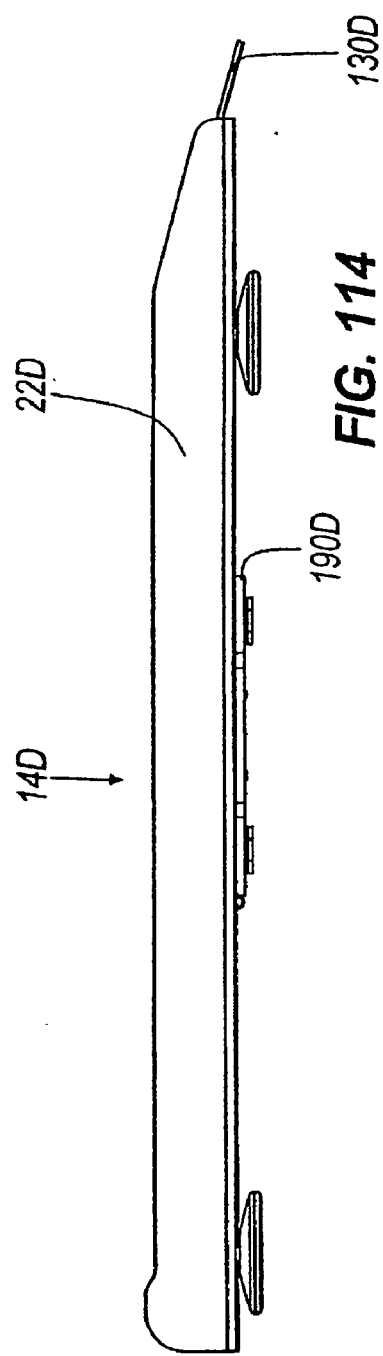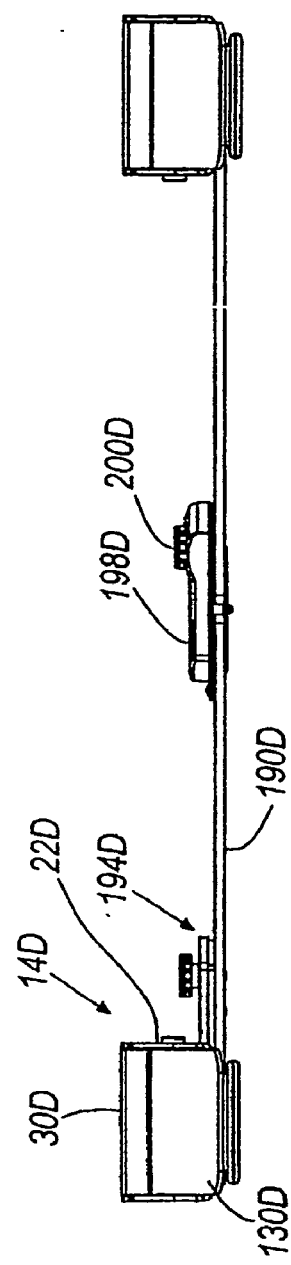

FIG. 127
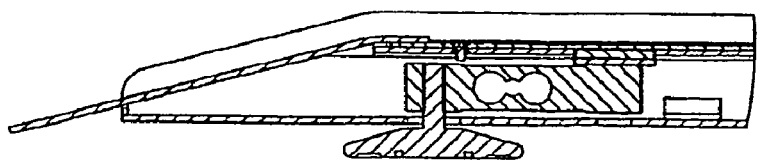
FIG. 128
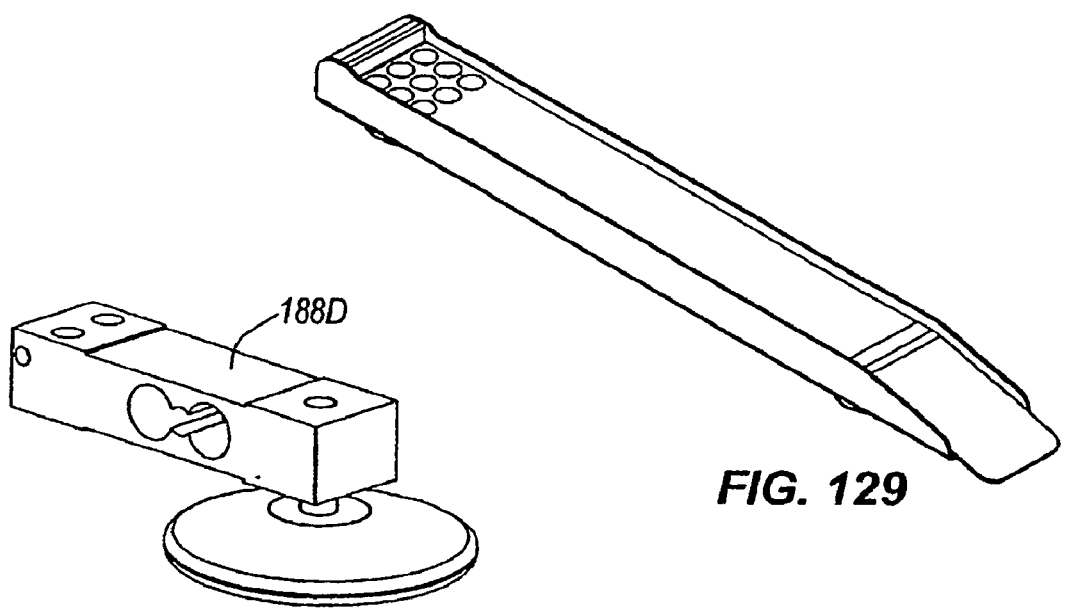
FIG. 129
FIG. 131
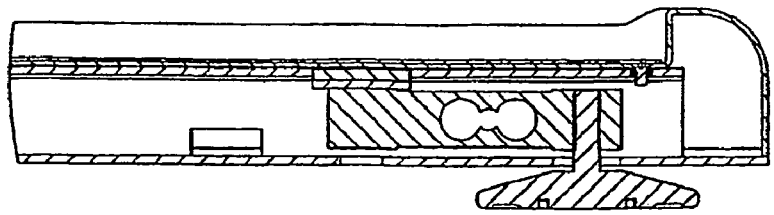
FIG. 130

US 7,550,682 B2

MEASURING DEVICE, SUCH AS A SCALE OR MEDICAL SCALE

CROSS-REFERENCE TO RELATED APPLICATIONS

This patent application is a national stage filing under 35 U.S.C. 371 of International Application No. PCT/US2004/032609, filed Oct. 1, 2004, which claims priority to U.S. Provisional Application Ser. No. 60/508,565, filed Oct. 3, 2003, the entire contents of each of which are hereby incorporated by reference. Priority to each application is hereby claimed.

FIELD OF THE INVENTION

The present invention relates to measuring devices, such as scales, and more particularly, to medical scales.

BACKGROUND OF THE INVENTION

Scales that are used to weight people can come in a variety of sizes. Typically, those used in the medical industry are larger and more robust than those used in a typical home. This is particularly true for dual use scales or for scales that are specifically adapted for wheelchair occupants. The size of some of these scales can be quite large to accommodate a wheelchair.

SUMMARY OF THE INVENTION

Thus, the storage and movement of above-described devices can be somewhat complicated.

Furthermore, those scales that can accommodate a wheelchair may not have components situated in positions to best accommodate a wheelchair. For example, some conventional scales have a centrally located pedestal or pillar that supports a digital read-out or other indicator. The position of this pillar can be problematic for wheelchair occupants. Specifically, the occupant's feet or legs or portions of the wheelchair may hit the central pillar while the wheel chair is being situated and/or weighed on the scale. Additionally, the indicator positioned on the pillar may be too positioned too high, angled incorrectly, or a combination thereof for the wheelchair occupant to easily read the indicator.

Some embodiments of the present invention provide a scale that can better accommodate a wheelchair.

Some embodiments of the present invention provide a scale, which is portable. For example, a scale can be provided with wheels to be portable. Also, some scales can be folded, pivoted, or adjusted into a more compact structure to be moved or stored.

Some embodiments of the present invention provide for a measuring device, graphical display, or interface with communication capabilities. The display or interface can be swivelable and/or pivotable in some embodiments. Additionally, the display can have a generally omega shape.

Some embodiments of the present invention provide a measuring device including software that is updateable and/or rewriteable via a personal computer or a network such as the world wide web.

Some embodiments of the present invention provide a measuring device having individual adjustable load cells.

Some embodiments of the present invention configurable to accept swipe card, smart card, or light pen matching patient identification with measured weight.

Independent features and independent advantages of the invention will become apparent to those skilled in the art upon review of the following detailed description and drawings.

BRIEF DESCRIPTION OF THE DRAWINGS

In the drawings:

FIGS. 1-48 are views of a measuring device, such as a scale, having an interface and embodying aspects of the invention.

FIGS. 81-108 are views of a measuring device, such as a scale, having an interface and embodying aspects of the invention.

FIGS. 109-138 are views of a measuring device, such as a scale, having an interface and embodying aspects of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. In addition, the terms "connected" and "coupled" and variations thereof are not restricted to physical or mechanical connections or couplings.

DETAILED DESCRIPTION

Figure 1:
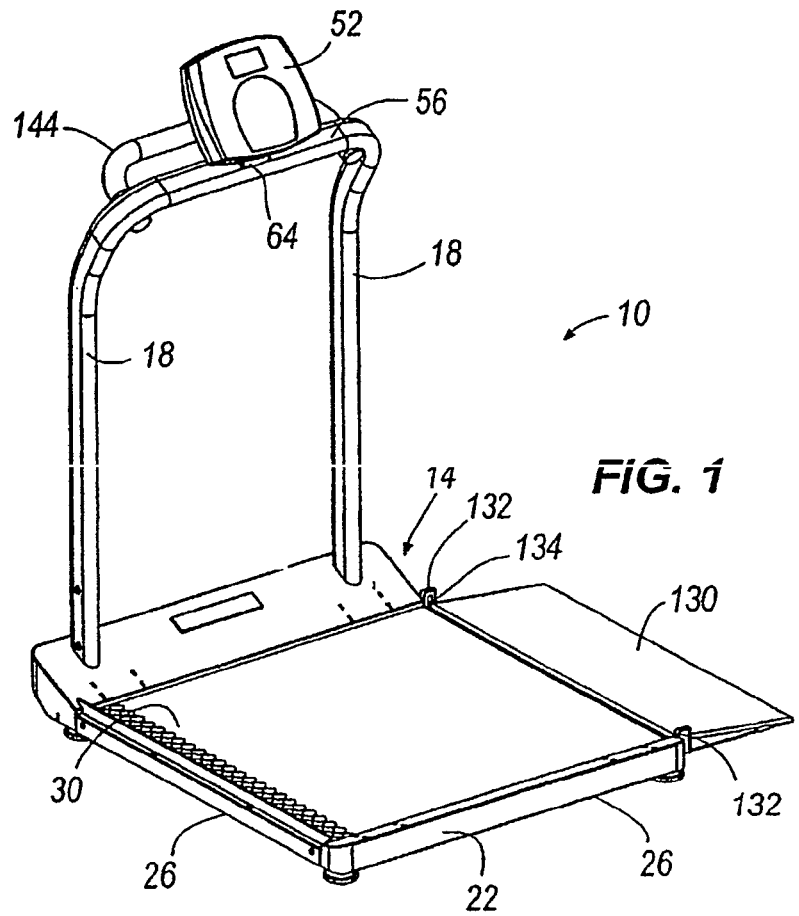
Figure 2:
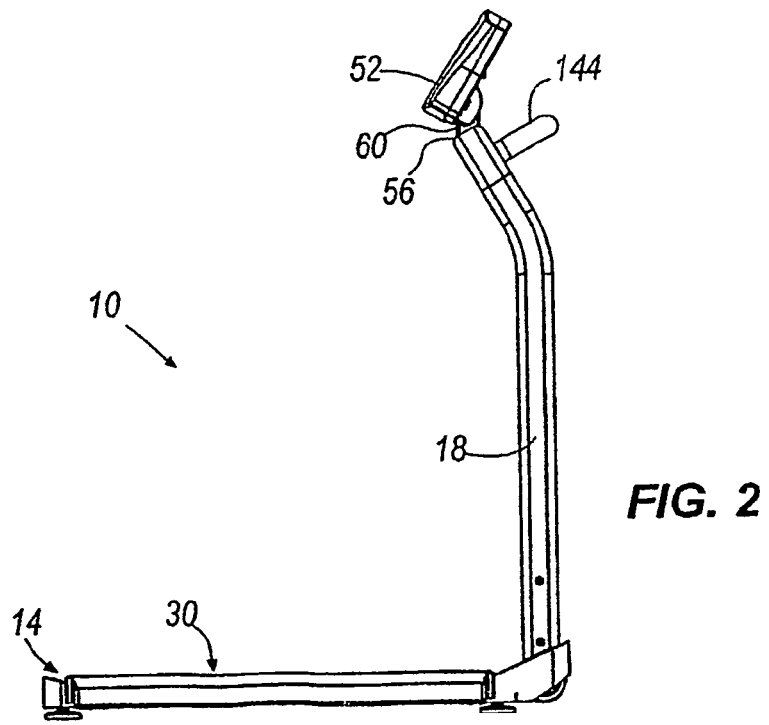
Figure 3:
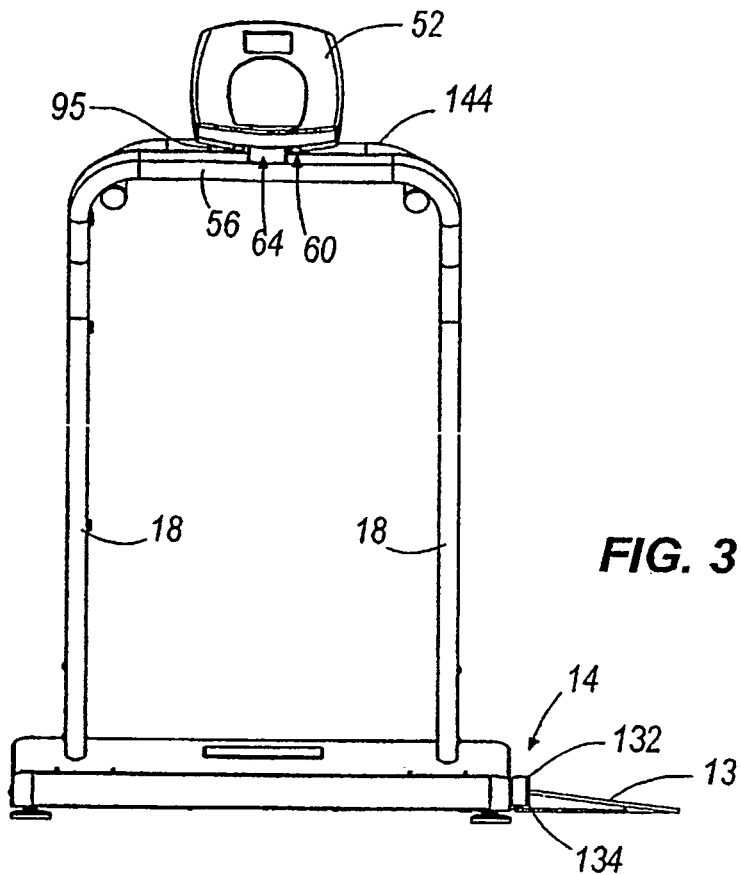
Figure 4:
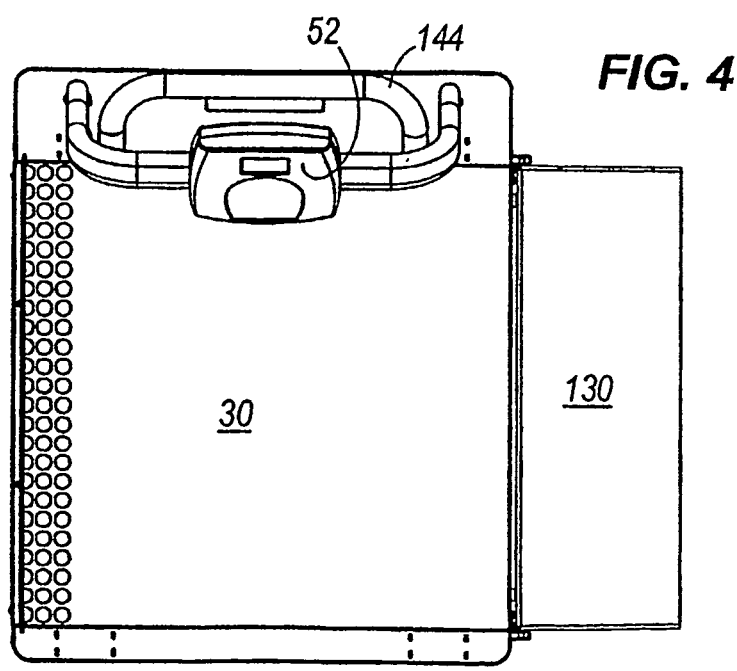
Figure 73:
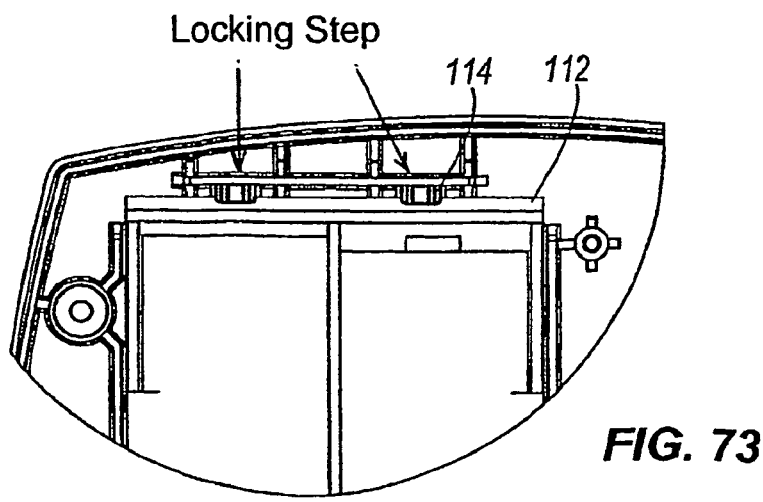
Figure 73A:
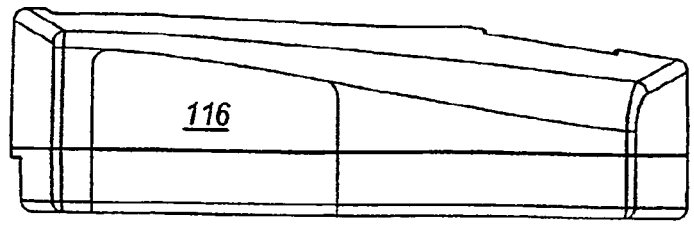
Figure 73B:
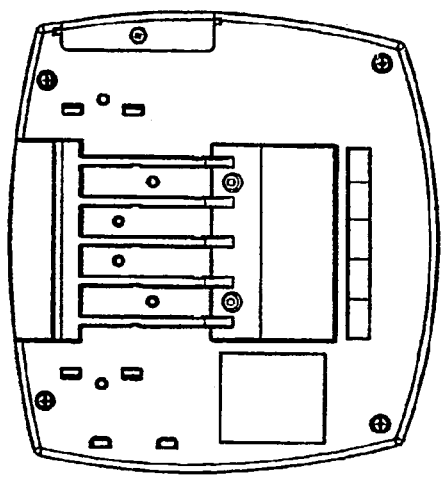
Figure 73C:
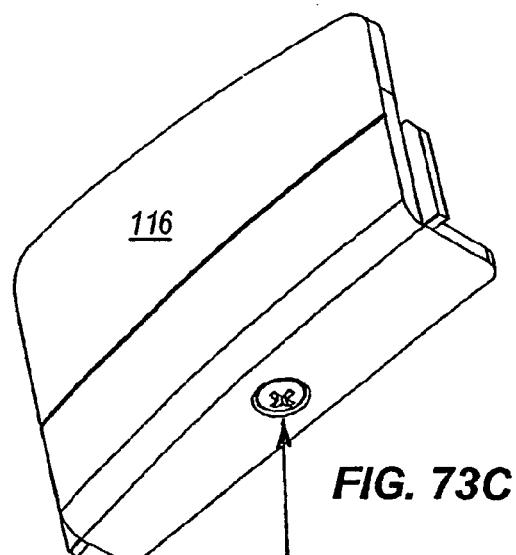
Figure 73D:
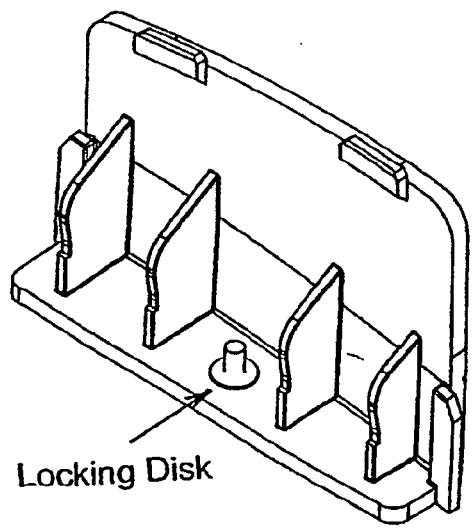
Figure 76:
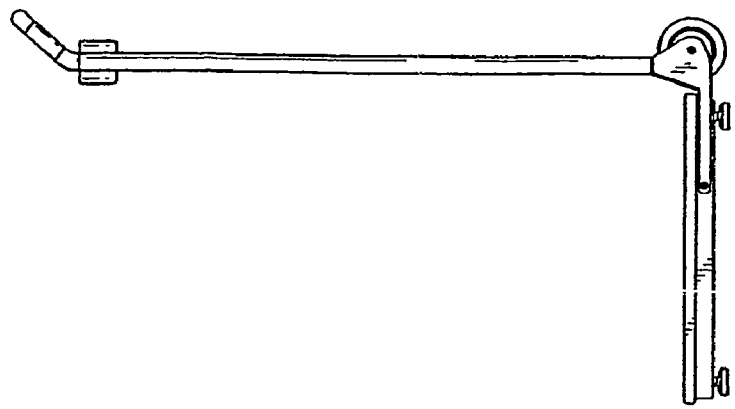
FIGS. 74-80 are views of a measuring device, such as a scale, having an interface and embodying aspects of the invention.
Figure 75:
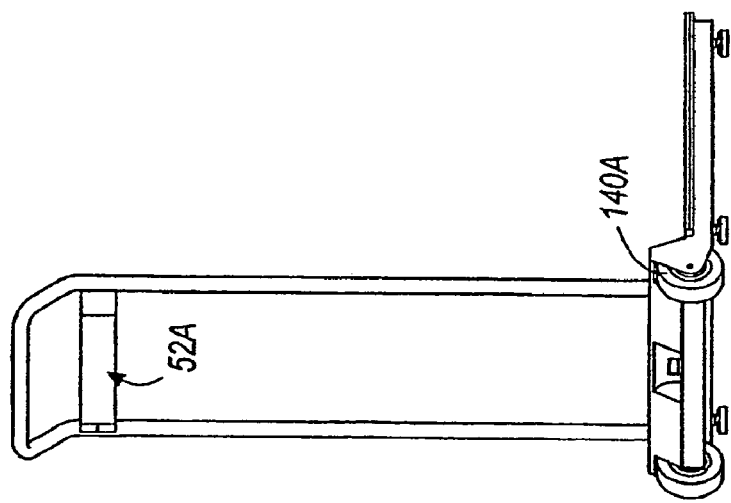
Figure 74:
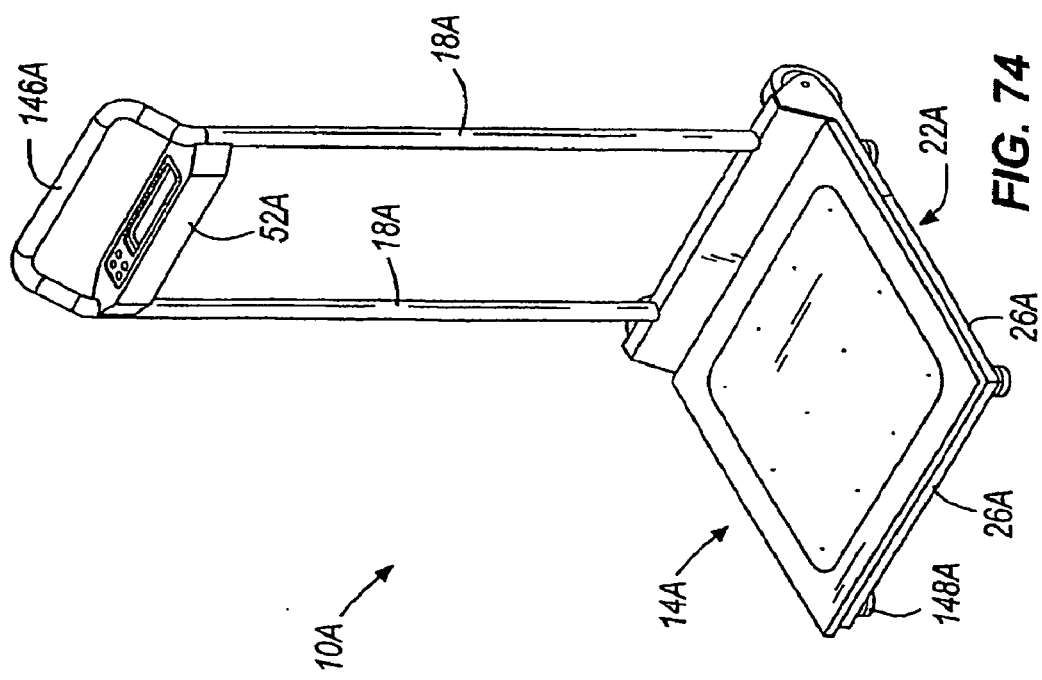

FIGS. 1-73 illustrates a measuring device, such as, for example, a scale 10 embodying one or more aspects of features of the present invention. Referring to FIGS. 1-4, illustrates a scale 10 has a base 14 and pillars or one or more uprights 18 coupled to and extending from the base 14. The base 14 has a frame 22 having a plurality of walls 26 and a top 30. As illustrated in FIGS. 5-11, a plurality of elements are housed within the base 14. Specifically, in the illustrated construction a plurality of load cells 34 are positioned within the base 14. The configuration and operation of the load cells 34 will be described in greater detail below.

The base 14 can also have one or more reinforcing members 38, which can help support and distribute a load positioned on the top 30 of the base 14. As illustrated in FIGS. 8-11, the reinforcing members 38 have a length that can be oriented in a front-to-back orientation. However, in other constructions (not shown), the length of the reinforcing members can be oriented in a side-to-side orientation or a combination of side-to-side and front-to-back. Furthermore, although many different types of reinforcing members 38 such as rods, posts, beams, and the like having various cross-sections can be used, each illustrated reinforcing member 38 is a channel member. When these channel members are positioned side-by-side, they form a corrugated or honeycomb pattern, which adds support and stability to surfaces. Not all embodiments, however, need to have a plurality of reinforcing members 38. Rather, this corrugated or honeycomb pattern can be formed from a single sheet of material, extruded, and the like, to form a large, unitary reinforcing member 38.

Side reinforcing members 40 may also add strength to the frame 22. As illustrated in FIGS. 9 and 11, the side reinforcing members 40 can connect to intersecting walls 26 of the frame 22 to provide stability to the intersecting walls. The side reinforcing members 40 also cover the area in which the load cells 34 are mounted. However, the side reinforcing members 40 can be provided with an aperture or other access means such as a removable panel or pivotable door to allow quick and easy access to the load cells 34.

Figures 12, 13, 14:
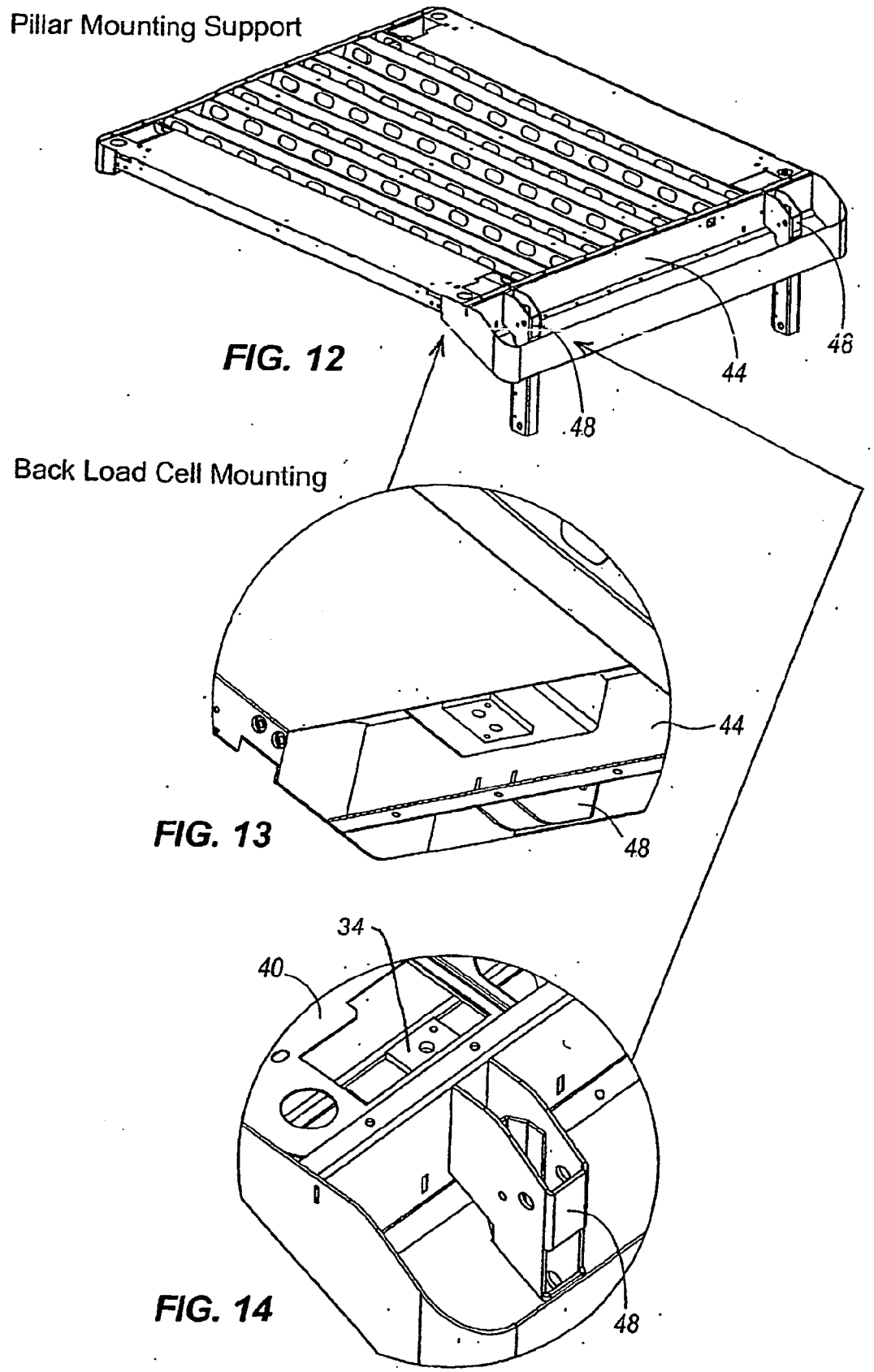
Figure 15:
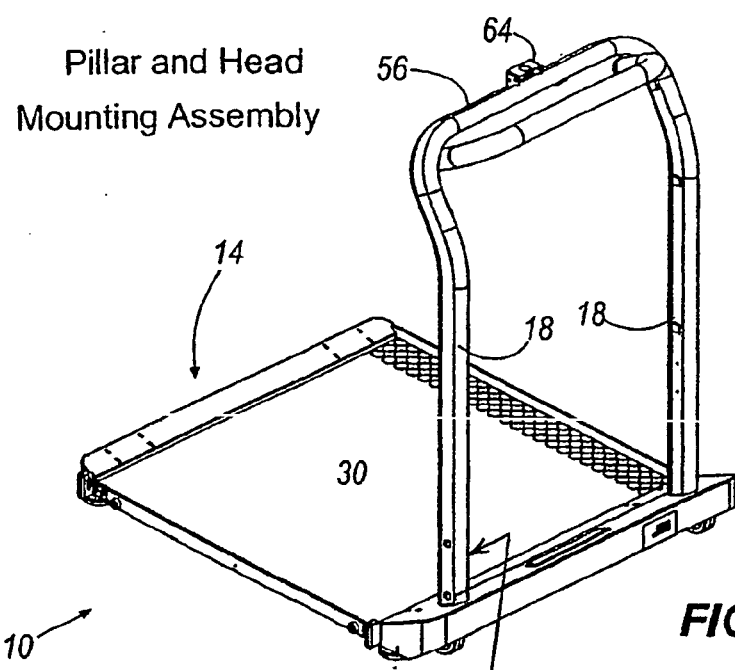
Figure 16:
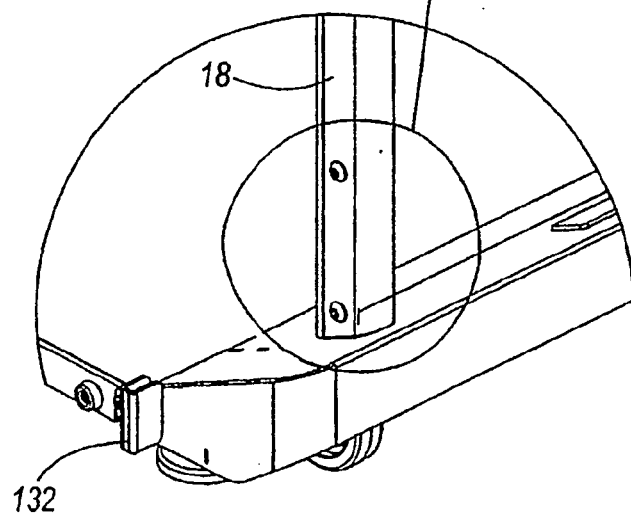
Figure 17:
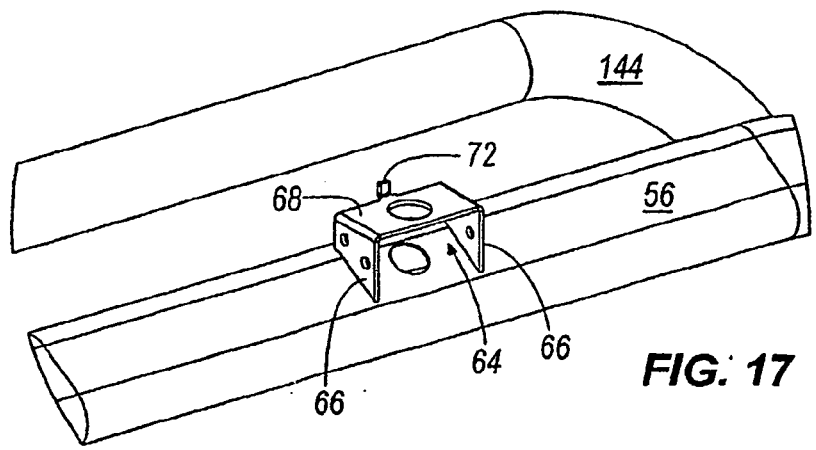
Figure 18:
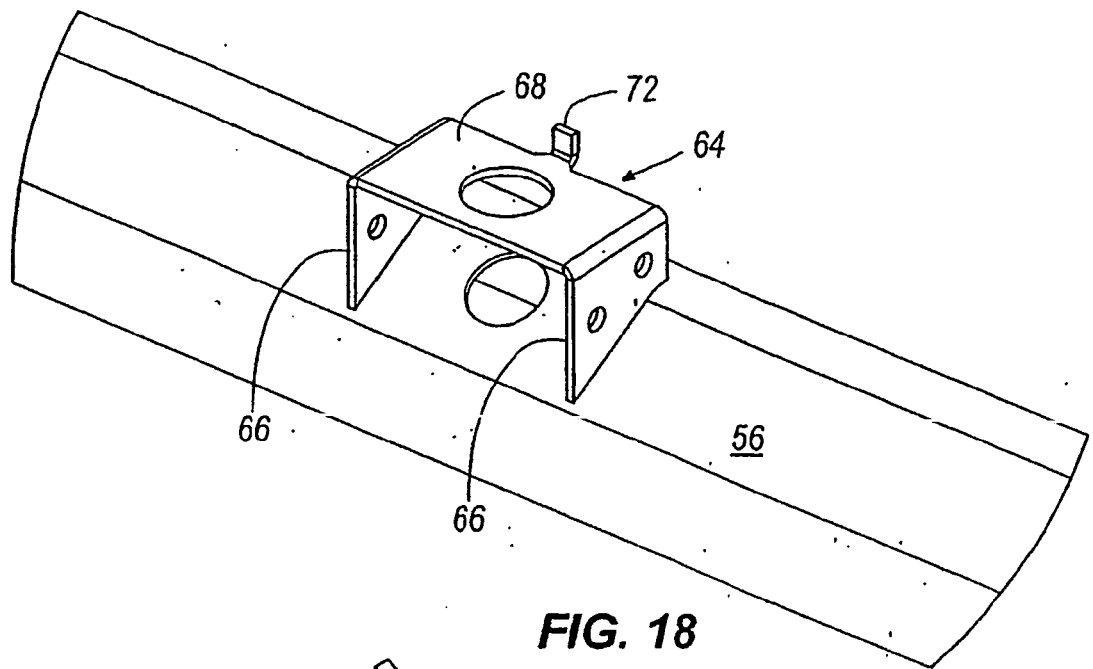
Figure 19:
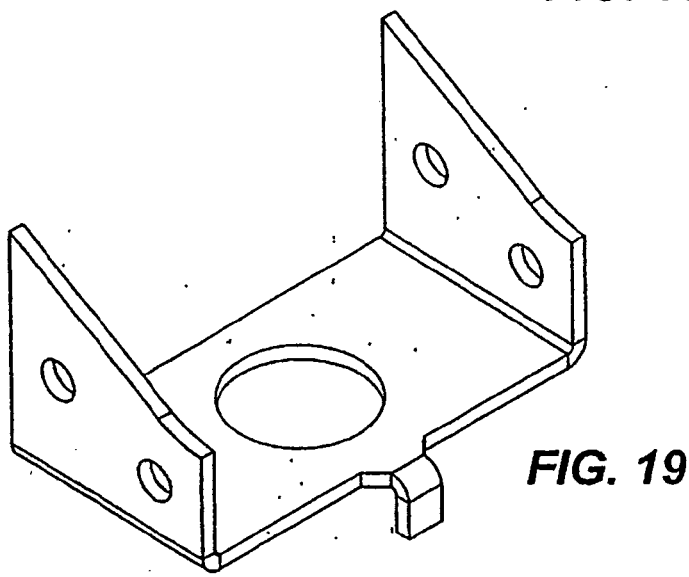
Figure 20:
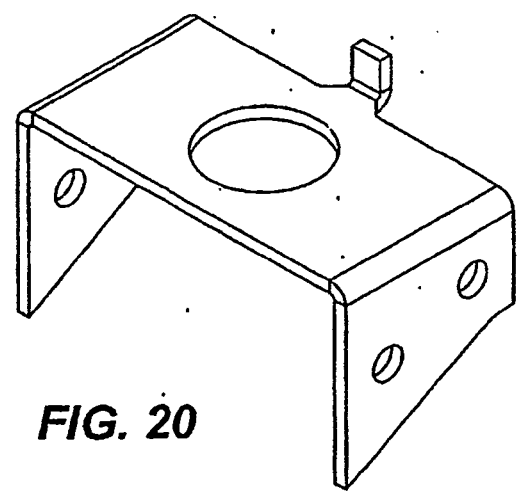
Figure 25:
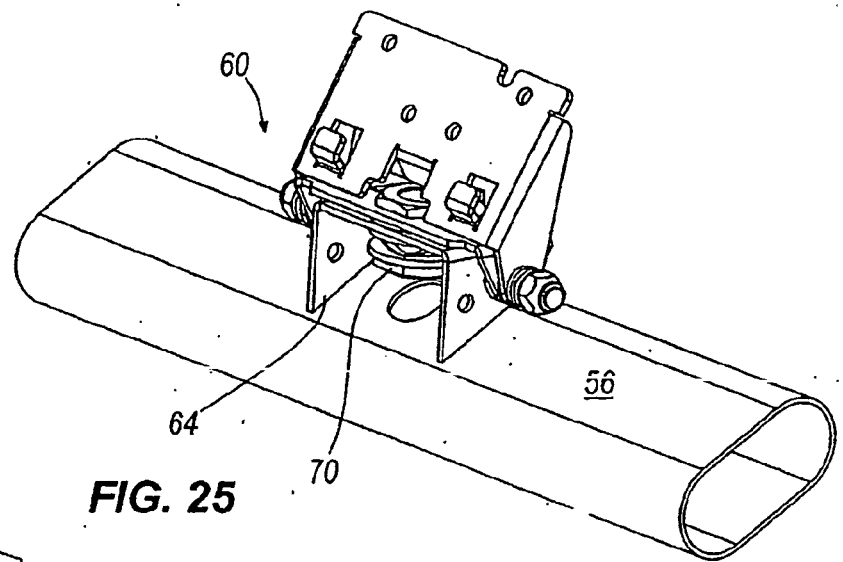
Figure 26:
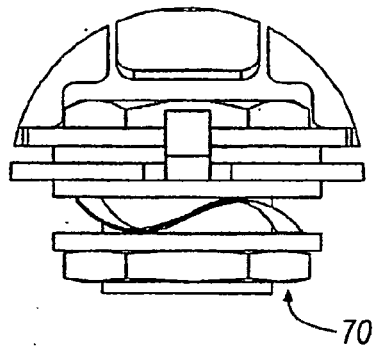
Figure 27:
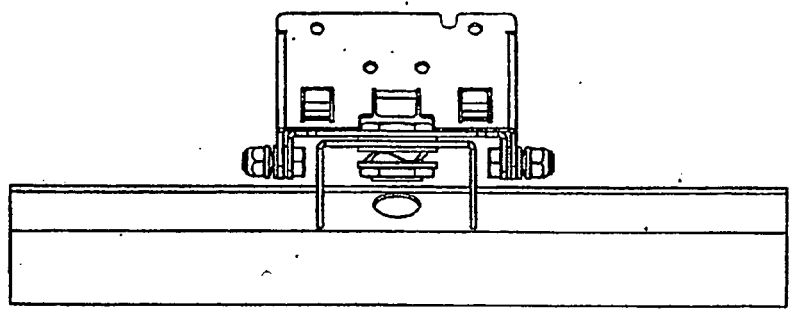
Figure 28:
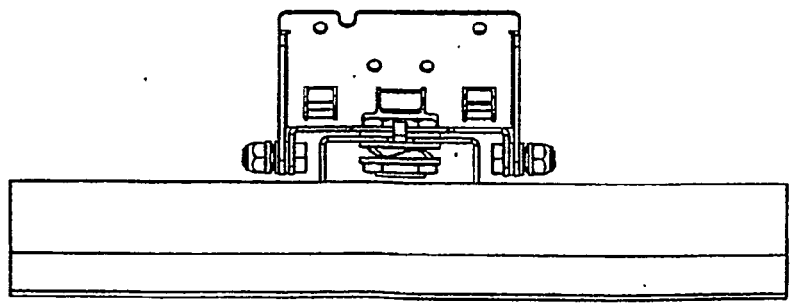
Figure 29:
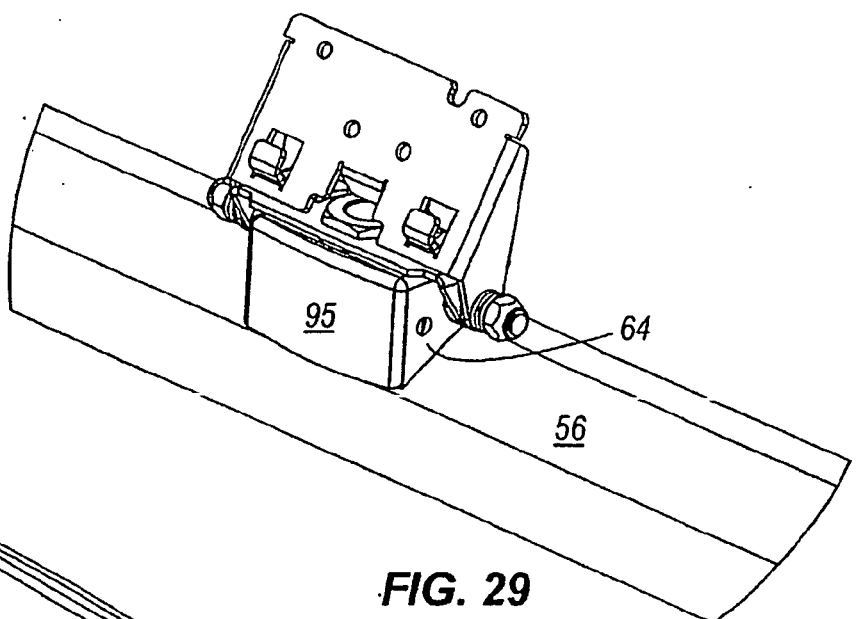
Figure 30:
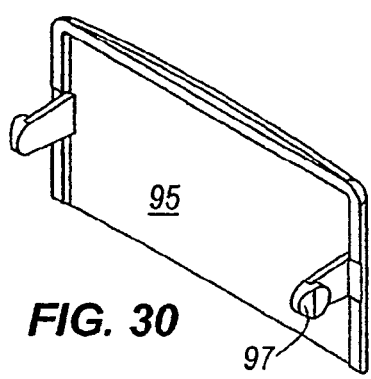
Figure 31:
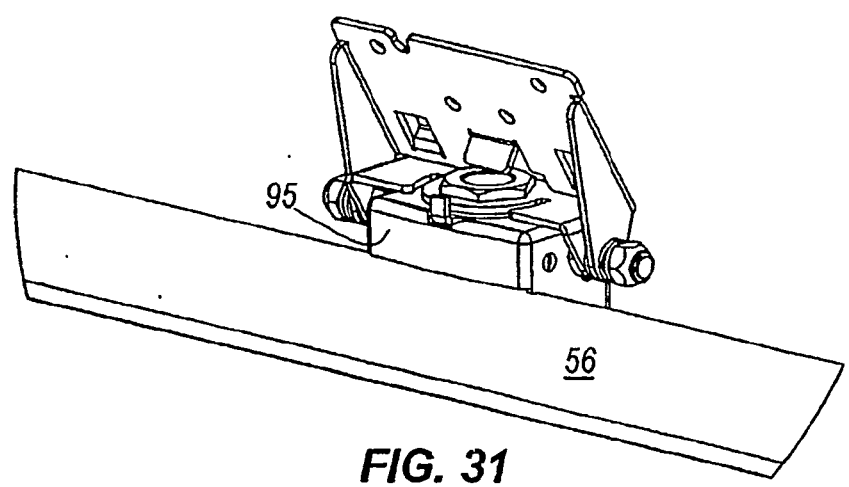
Figure 32:
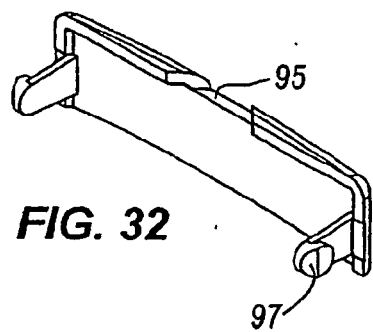
Figure 33:
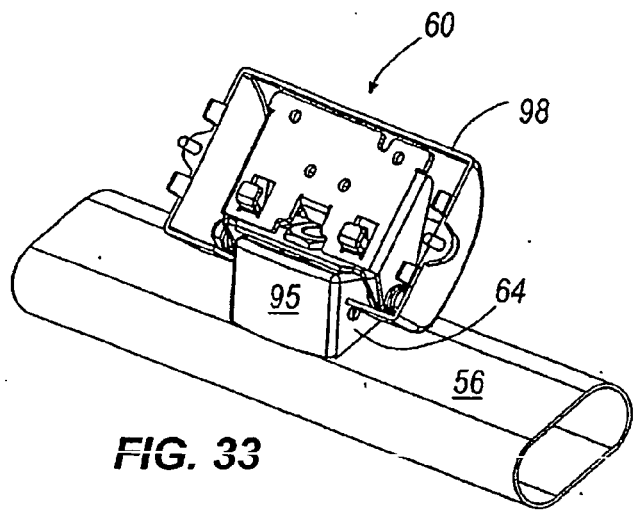
Figure 34:
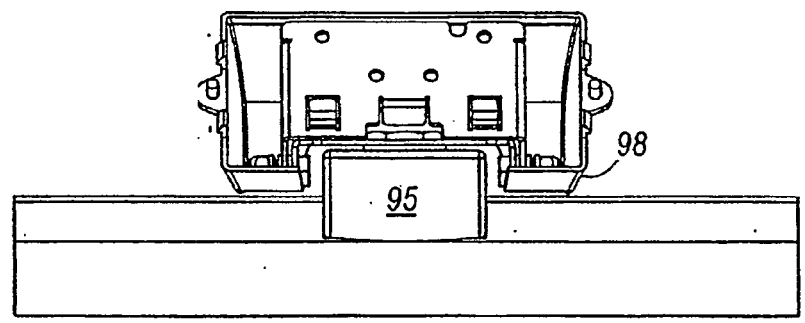
Figure 35:
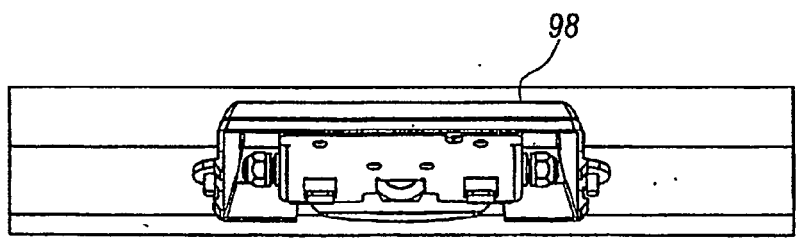
Figure 36:
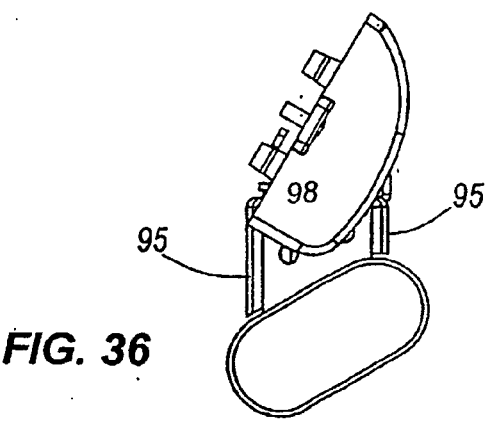
Figure 37:
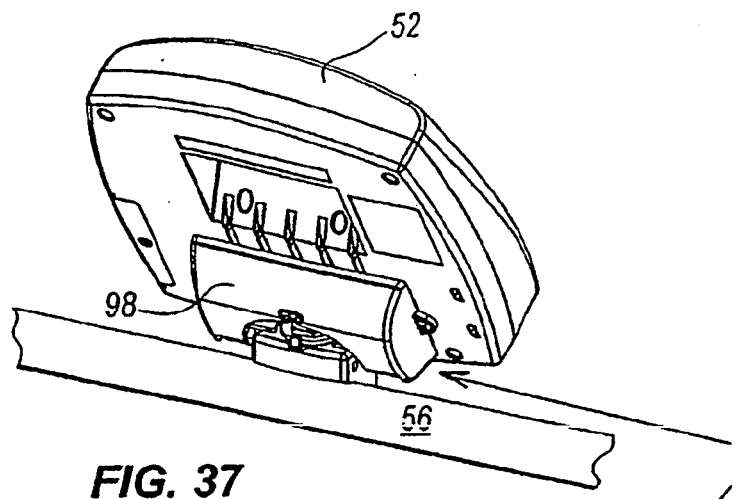
Figure 38:
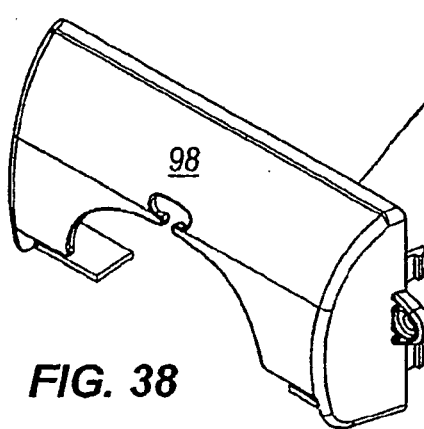
Figure 39:
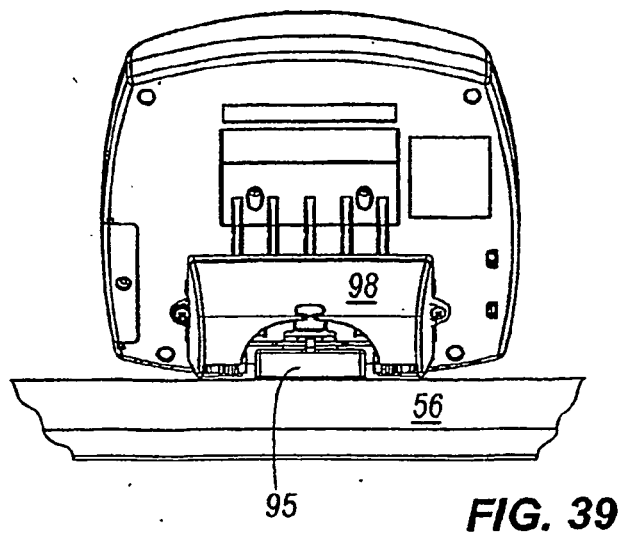

Some embodiments also have an additional lateral support member 44 stretching across the base 14. This lateral support member 44 can provide support to the side walls or the reinforcing members. Additionally, one or more pillar mounting supports 48 can be coupled to the lateral support member 44 as illustrated in FIG. 12. Each pillar mounting support 48 is connected to the lateral support member 44 and has a projecting portion that extends upward to connect to and support a pillar 18. Specifically, the projecting portion extends through an aperture in the base 14. As illustrated in FIGS. 15 and 16 the projecting portion of the pillar 18 connects to a pillar mounting support in a conventional manner.

As illustrated in FIGS. 1-4 and 12-15, the pillar 18 preferably has two, spaced apart uprights that extend upward from the base to support a user interface 52. The pillars 18 can be two separate members or one member bent, in which both ends of the bent member to connect to the base 12. The spaced apart configuration of the pillars 18 can be advantageous in some situations, such as, for example, when a seated person must be weighed.

Most conventional scales have a centered pillar extending from the base to support an indicator. Such a conventional construction, however, tends to cause problems for seated weight measurements, such as with wheelchair occupants. Such, wheelchair occupants may tend to hit the center pillar during use with either the wheelchair, their feet, or their knees. As such, the individual to be weighted may not be properly positioned on the scale for an accurate measurement, or they are not properly positioned to read the indicator on the centered pillar.

In some aspects, the illustrated embodiment eliminates the centered pillar and instead utilizes two, spaced apart pillars 18 located off-center. This allows a wheelchair occupant to properly position themselves on the scale without hitting the pillars 18 or having a centered pillar located between their legs. Also, the occupant may be better positioned to read the indicator.

As illustrated, the pillars 18 of this embodiment are also bent towards the position of a person being weighed. Thus, the surface 56 that supports the interface 52 is some what cantilevered. This allows the interface 52 to be positioned closer to the person being weighed. Thus, the person does not have to reach as far to view and interact with the interface 52.

For additional convenience, in some aspects, an adjustable interface mounting assembly 60 can be coupled to the support surface 56 of the pillars 18. The adjustable interface mounting assembly 60 can be configured to allow the interface 52 to pivot or tilt with respect to a horizontal axis and swivel about the vertical axis if desired. As illustrated in FIGS. 17-20, a flange base 64 can be coupled to the pillars 18 or, more specifically, the support surface 56 of the pillars 18. Although the flange base 64 can have a variety of shapes, the illustrated flange base 64 has two upright supports 66 extending upward from the support surface 56 and a body 68 extending between the two supports 66. An aperture is located in the body 68. The aperture allows a swivel pivot or rod 70 to extend between the body 68 and the interface 52 or other swivelable member. A projection 72 can also extend from the body 68. The projection 72 can be used as a stop to prevent swiveling beyond a predetermined limit.

As illustrated in FIGS. 21-28, a tilt mechanism 74 can be coupled to the flange base 64 via a swivel pivot 76, such as a rod, tube, threaded fastener or the like. The tilt mechanism 74 has a swivel member 78 having a main body portion 80 and ears 82 angled with respect to the main body portion 80. The main body portion 80 has an aperture 84 the also receives the swivel pivot 76 to allow relative movement between the flange base 64 and the tilt mechanism 74. A curved groove 86 is centered about the aperture 80. The groove 86 is positioned and sized to accept the projection 72 from the flange base 64. The projection 72 can travel in this groove 86 as the tilt mechanism 74 is swiveled with respect to the flange mechanism 74. The relative movement is limited by the ends of the groove 86. Thus, when the projection 72 hits the end of the groove 86, the tilt mechanism 74 cannot swivel any further in that direction. The illustrated groove 86 allows the tilt mechanism 74 to swivel about 90 degrees in each direction. In other embodiments, the tilt mechanism 74 may swivel more or less.

A pivot platform 88 is coupled to the ears 82 of the swivel member 78. More specifically, the pivot platform 88 has two ears 90 that are angled with respect to the main body portion 92 of the platform 88. These ears 90 align with the ears 82 of the swivel member 78. One or more pivots 94, such as a threaded fasteners, rods, rivets, and the like, extend between the ears 82 on the swivel member 78 and the ears 90 on the platform 88. This arrangement allows the platform 88 to be pivoted with respect to the swivel member 78. As illustrated in FIG. 24, the swivel member 78 (or the platform 88) can be equipped with one or more tabs 96 to limit the amount of relative movement between the platform 88 and the swivel member 78.

Once the swivel member 78 is coupled to the flange base 64 via a swivel pivot 76, the swivel pivot 76 can be hidden with a pair of panels 95. As illustrated in FIGS. 29-32, the panels 95 can be sized to abut the edges of the flange base 64 and cover the opening created by the U-shape of the flange base 64. Although these panels 95 can be attached in a variety of ways, the illustrated panels have projecting members 97 that form an interference fit with an aperture in the upright supports 66 of the flange base 64.

As illustrated in FIGS. 33-39, some embodiments can also cover the hardware of the tilt mechanism 74 with a cover 98. The cover 98 can improve the aesthetics of the scale 10 by hiding the hardware and can also eliminate exposed pinch points. The cover 98 can be attached to the tilt mechanism 74 or can be coupled to the interface 52. The illustrated cover 98 has several protections that form an interference fit with the housing 100 of the interface 52. However, other connections can be used. The connection between the housing 100 of the interface 52 and the cover 98 will generally be sufficient to couple the interface 52 to the scale 10. However, other connections can be used instead of or in addition to this coupling. For example, as illustrated in FIGS. 21-28 projections 102 on the pivot platform can engage apertures on the housing 100 to provide for added security. Additionally, other fasteners can be used to connect the interface 52 to the scale 10.

As will be discussed in greater detail below, the housing 100 of the interface 52 is adapted to support, house, receive, and/or protect a variety of elements, such as user readable displays, manipulable controls, electrical connections, circuitry, batteries, and the like. Although the housing 100 can be formed any number of portions, in the illustrated construction, it is preferably formed from two main halves or shells 104, 106 as shown in FIGS. 57-59, 68, and 69. The lower shell 104 is generally used to support various elements within the housing 100 and to connect the housing 100 to the scale 10, while the upper shell 106 generally supports various interfaces such as readable displays and manipulable controls. The lower shell 104 can be coupled to the upper shell 106 in a variety of manners, such as with an adhesive/cohesive bond, welds, friction fits, interference fits, threaded fasteners and the like. The illustrated shells 104, 106 have ultrasonic/heat welded inserts that form a snap fit when combined. In other words, one shell has a projection that is received in a recess of the other shell to connect the two.

Figure 58:
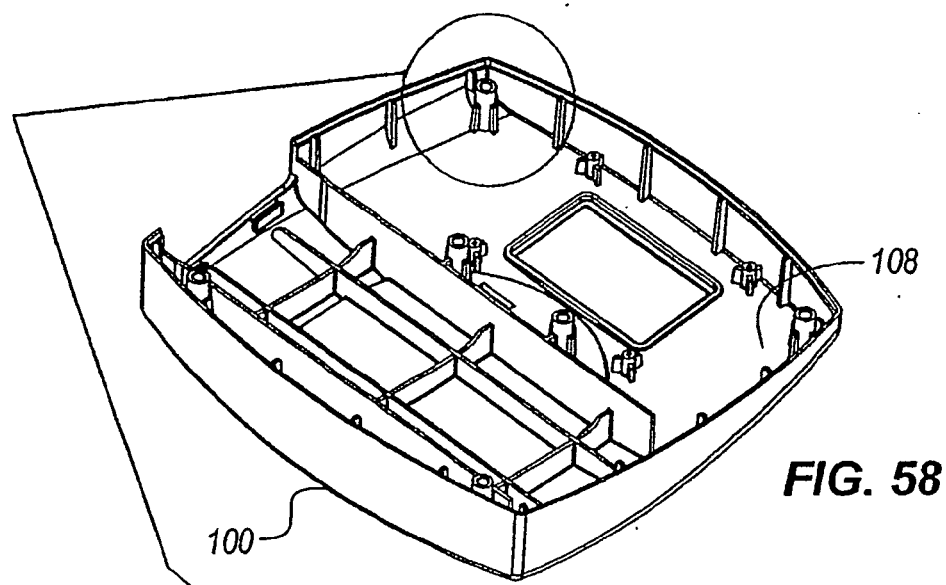
Figure 59:
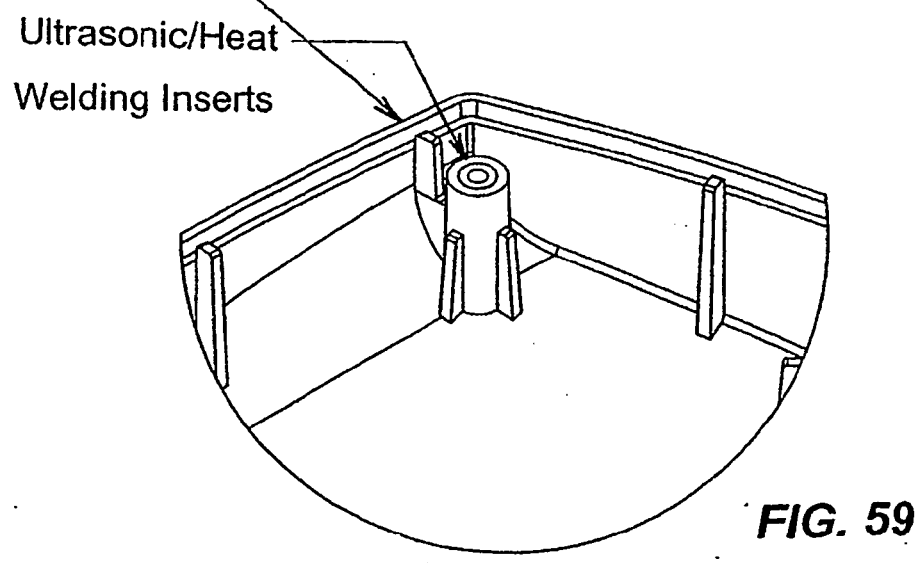
Figure 60:
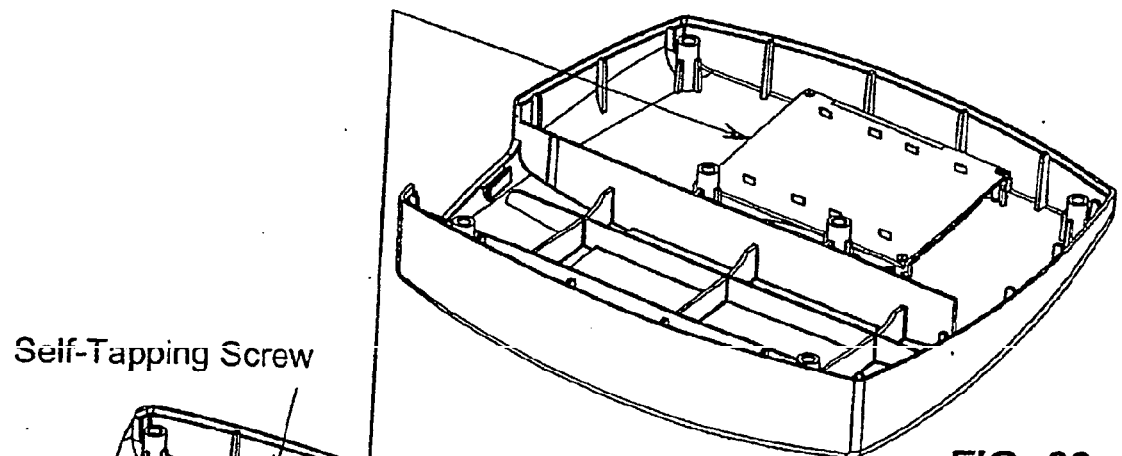
Figure 61:
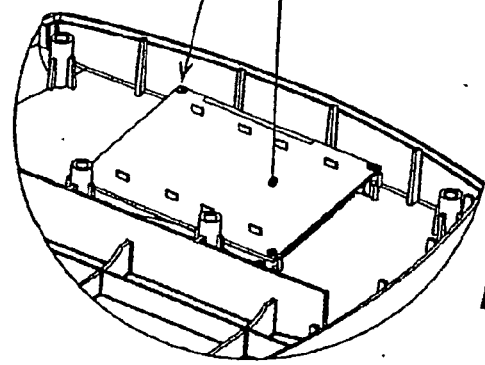
Figure 62:
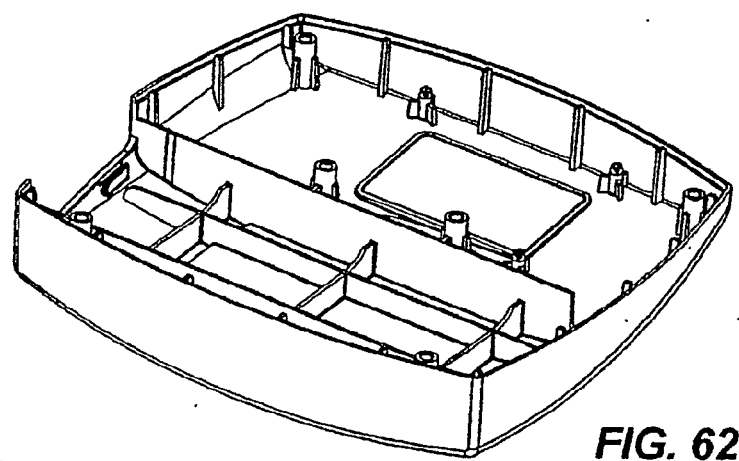
Figure 63:
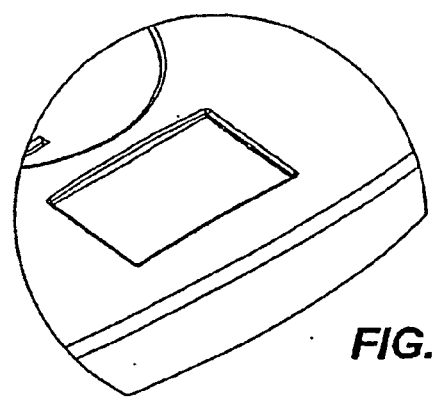
Figure 64:
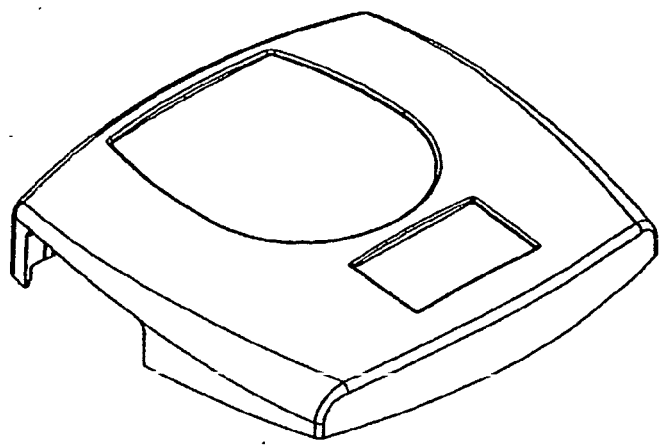
Figure 65:
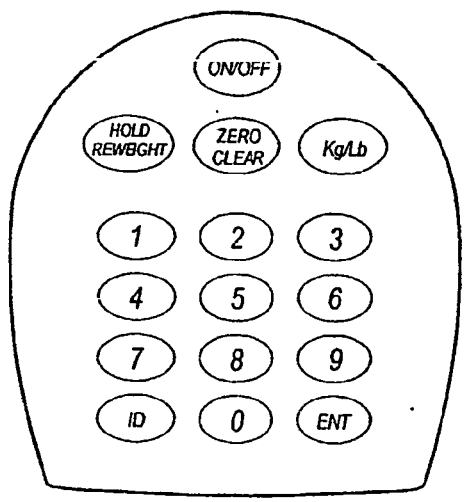
Figure 66:
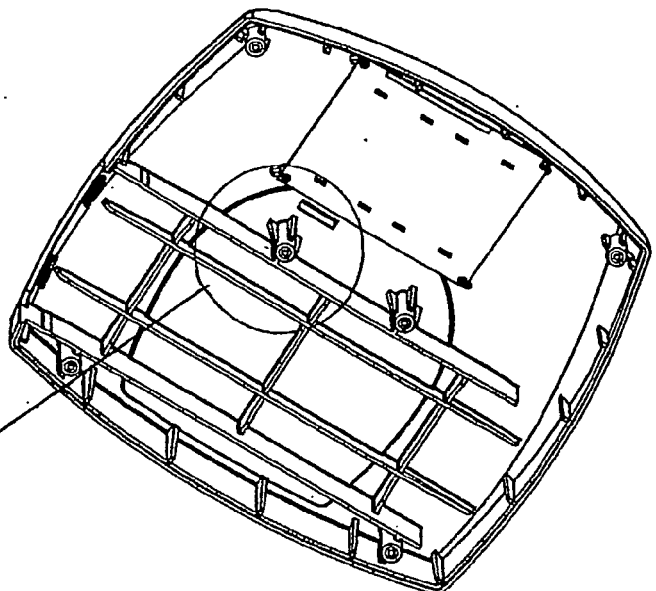
Figure 67:
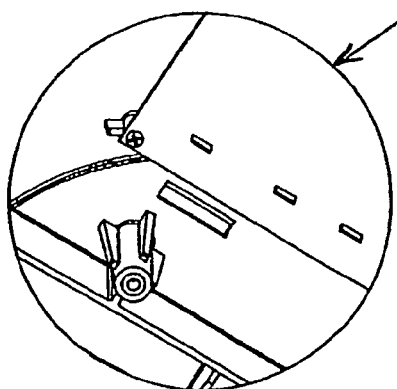
Figure 68A:
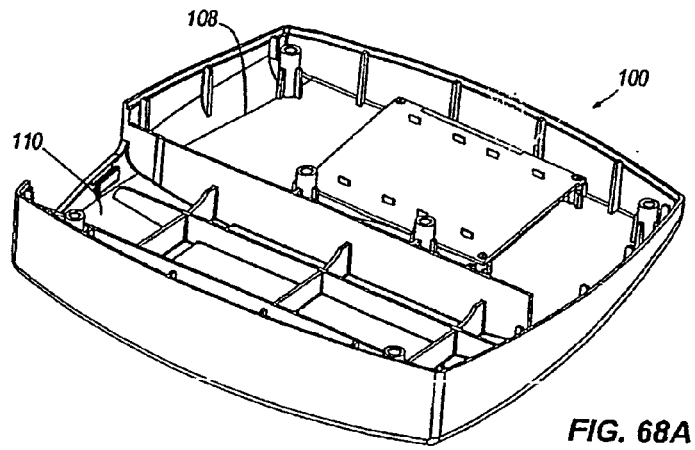
Figure 68B:
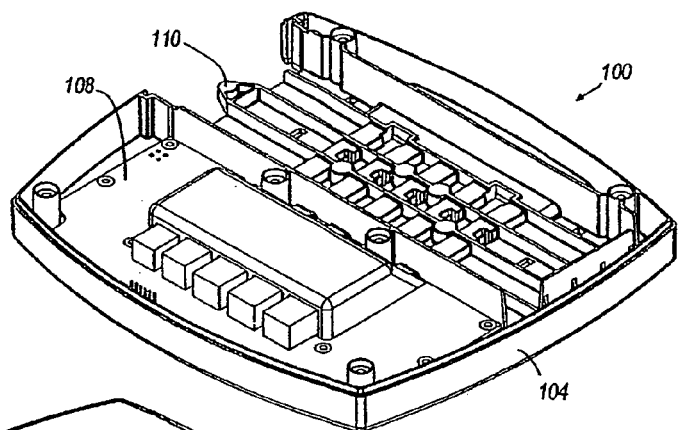
Figure 69:
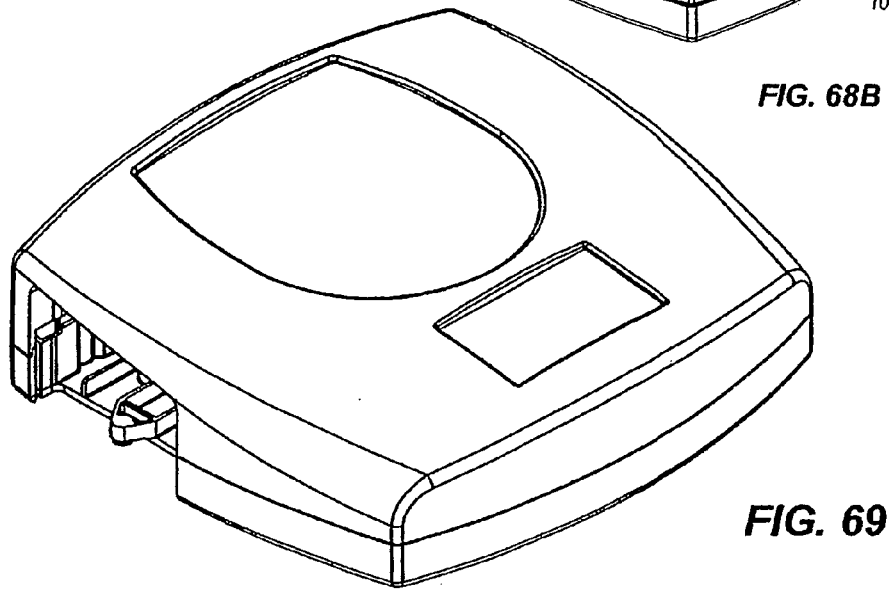
Figure 70:
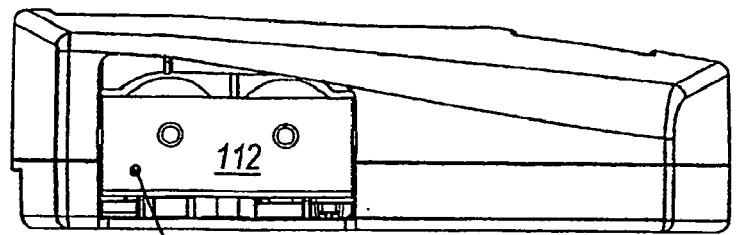
Figure 71:
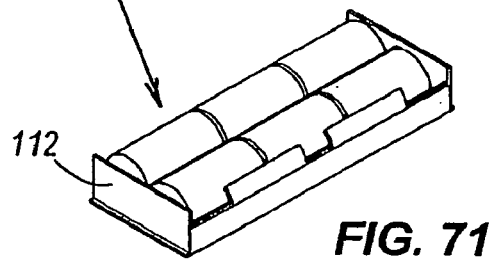
Figure 72:
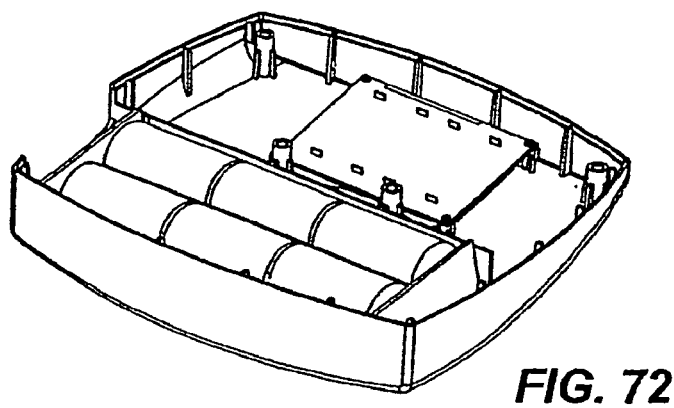

The shells 104, 106 of some embodiments can also be partitioned into smaller portions within the housing 100. For example, the upper shell 106 illustrated in FIG. 58 is partitioned into two main portions. The first portion 108 generally houses the electronics and circuitry of the interface 52. The second portion 110 is designed to receive batteries, which power the interface 52. The wall of this portion of the shell has a closeable opening, which allows the batteries to be inserted and removed as illustrated in FIGS. 70-73. The batteries can be inserted individually or together as part of a magazine 112 illustrated in FIG. 71. The magazine can have a locking step 114 that assures proper orientation of the magazine 112 within the housing 100 and a good electrical connection. The locking step 114 can include a male/female connection between a portion of the housing 100 and the magazine 112. The opening in which the batteries are inserted into the housing can be closed with a removable panel 116 as illustrated in FIGS. 73A-D. The panel 116 can be coupled to the housing in any conventional manner. The illustrated embodiment uses a threaded fastener in combination with an interference fit to secure the panel 116.

Some embodiments, interface 52 may be powered by external power sources, such as an electric cord connected with a power outlet, rather than by batteries. In such situations, the housing 100 would not necessarily need a portion 110 to house batteries. However, a battery back-up may be provided. The electrical cord could run from the outlet to any location on the scale 10. The electrical wires could then be hidden from sight and protected by running them within the base 14 and/or the pillars 18, as will be described in further detail.

Regardless of the power source, information must be communicated from the load cells 34 to the interface 52. Some embodiments communicate via radio frequency or other wireless connection. However, other embodiments utilize electrical connections. Electrical wires typically run between the load cells 34 and the interface 52 in such embodiments. The wires can be hidden from view and protected by running them through a conduit defined, for example, by at least one of the pillars 18. As discussed above, the pillars 18 connect to the base 14. Thus, wires can run underneath the base 14 and up the conduit within the pillar(s) 18 to the interface 52.

Figure 40:
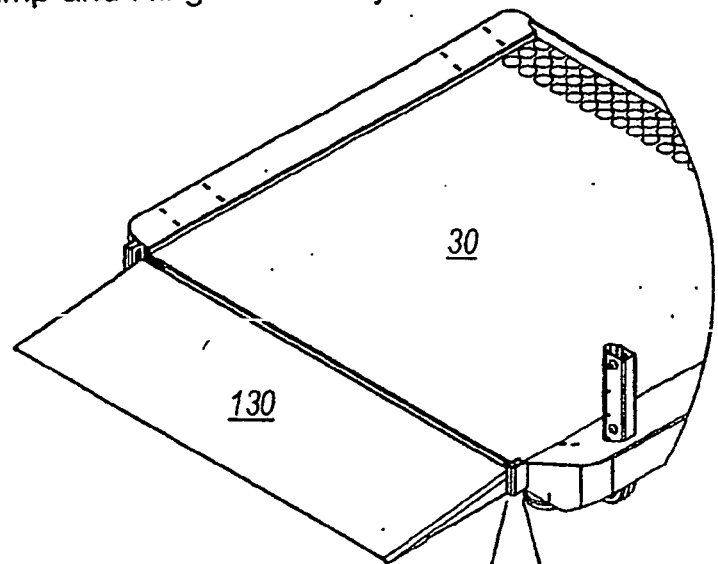
Figure 41:
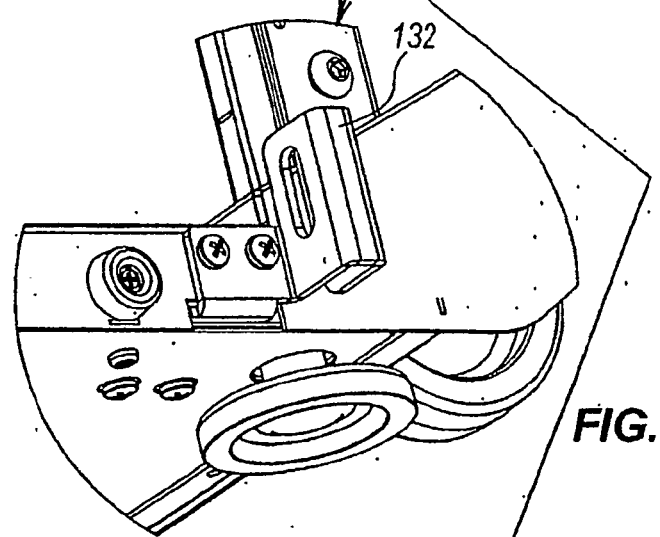
Figure 42:
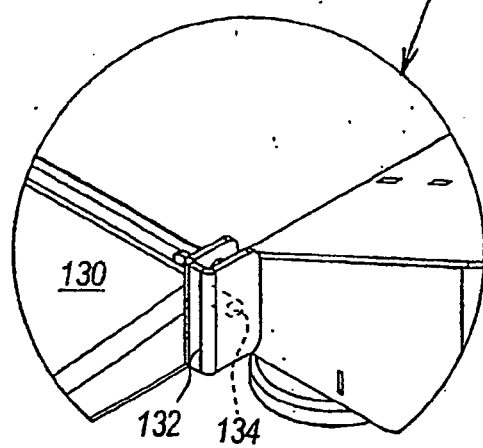

Some embodiments can also be equipped with additional features, such as a ramp 130 to allow easy access to a wheelchair bound person. The ramp can be connected to one of several sides of the base 14 via any conventional connection. In some embodiments, however, it is desirable for the ramp 130 to be hinged. Thus, any convention hinge may be used to connect the ramp 130 to the base 14. For example, the illustrated embodiment shows one type of hinge in FIGS. 40-42. This hinge generally comprises a bracket 132 having an aperture adapted to receive a pivot 134. A bracket 132 is coupled to the base 14 at each end/side of the ramp 130. In some embodiments, the aperture that receives the pivot 134 is a slot to allow some height adjustments.

Figure 43:
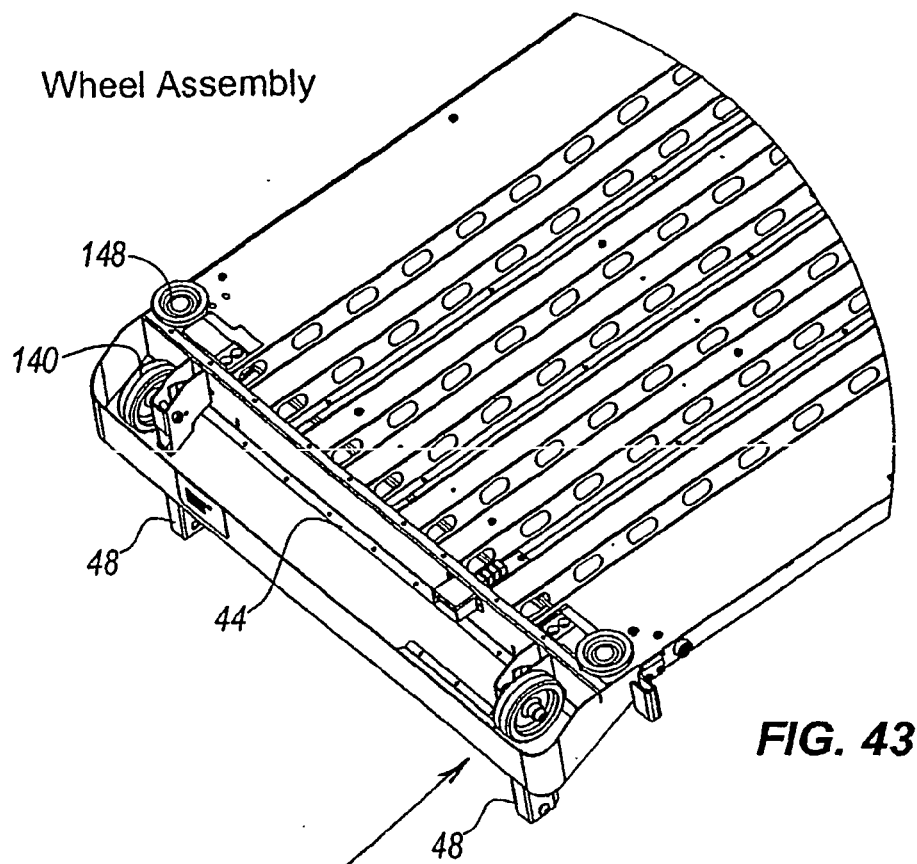
Figure 44:
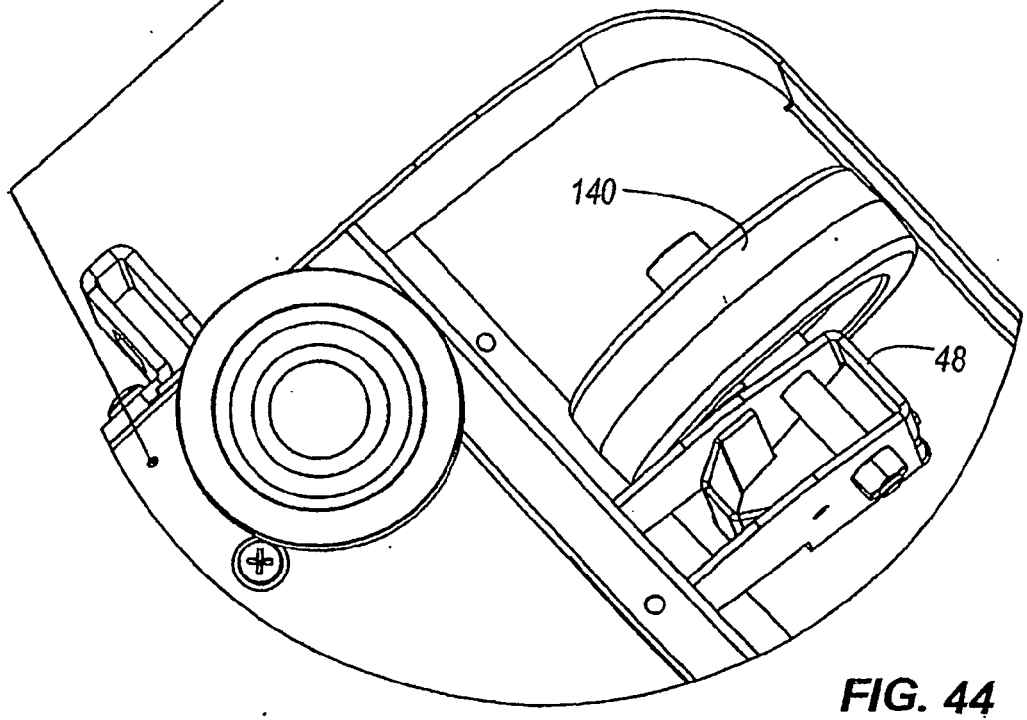
Figure 45:
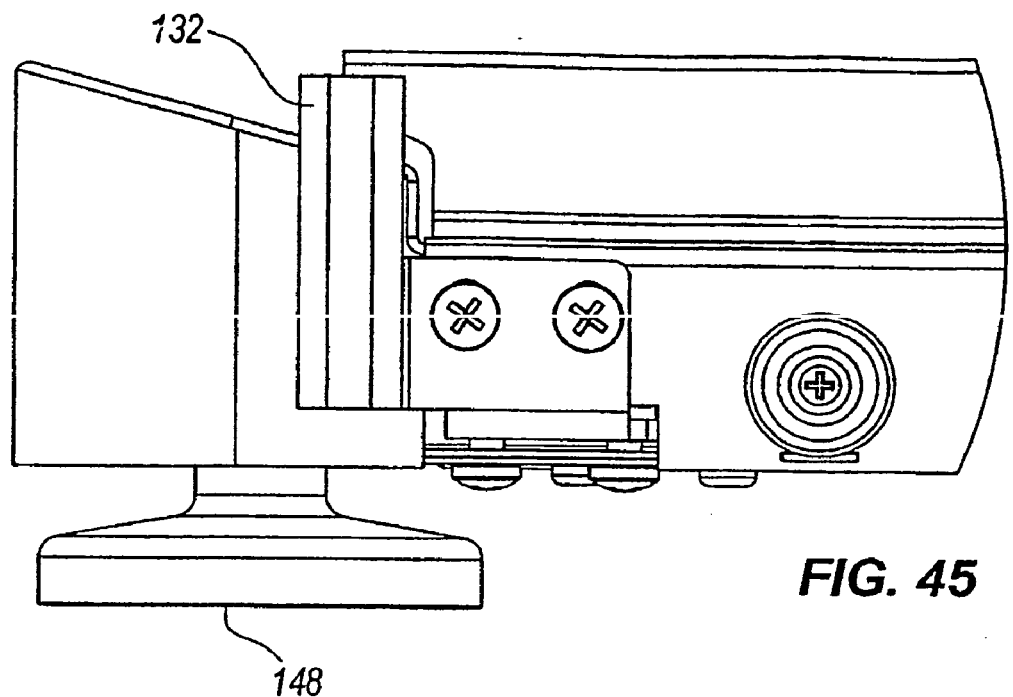
Figure 46:
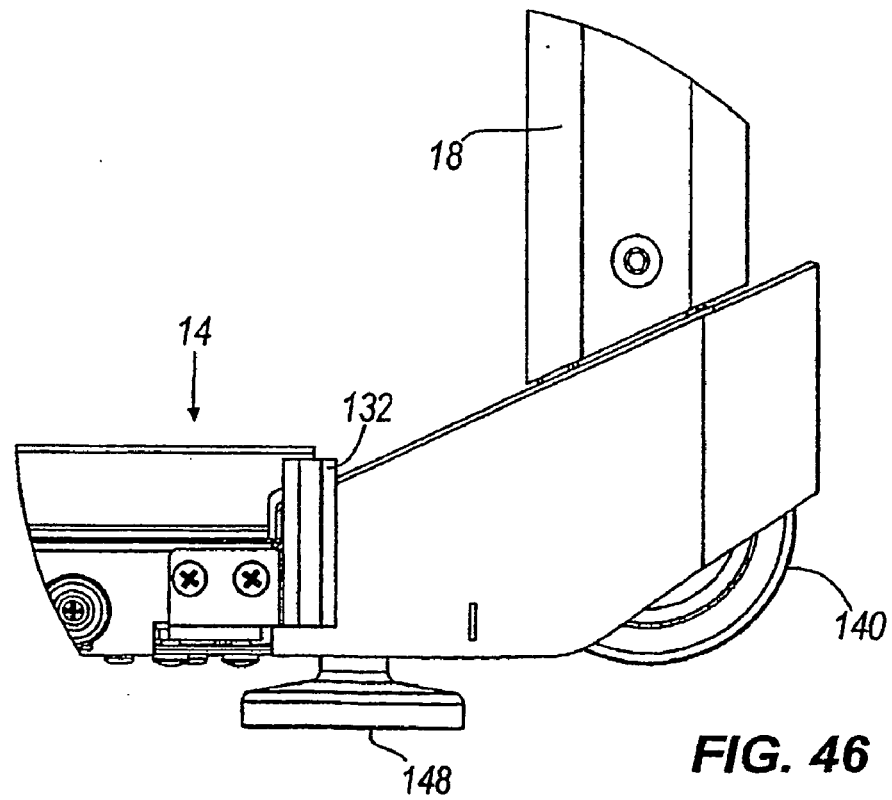
Figure 47:
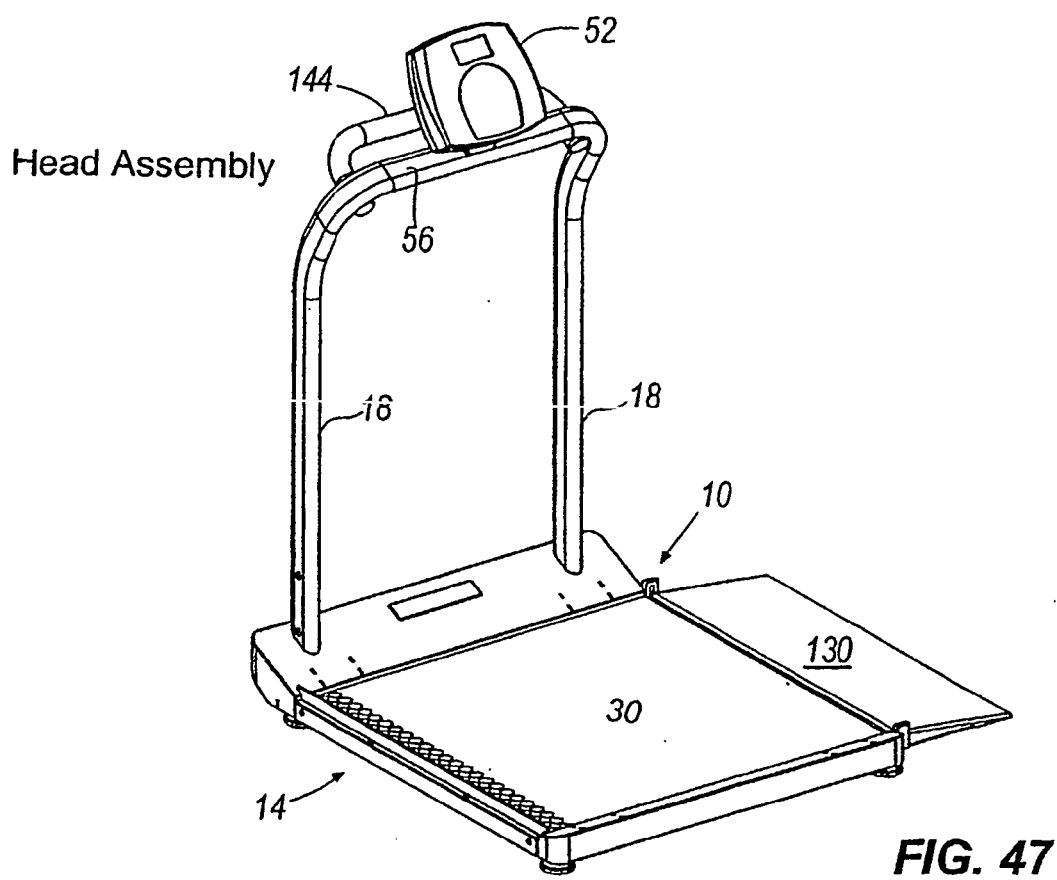
Figure 48:
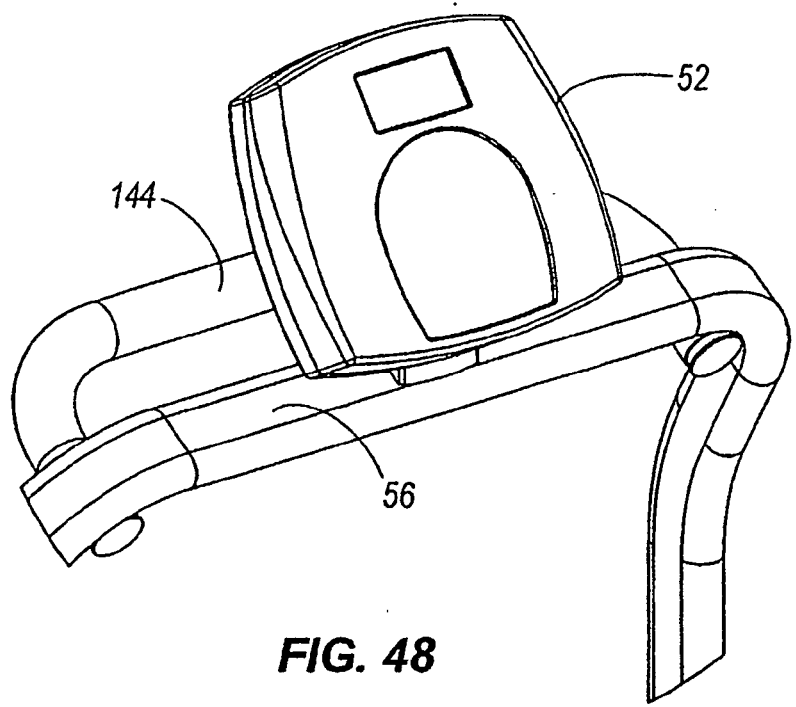
Figure 49:
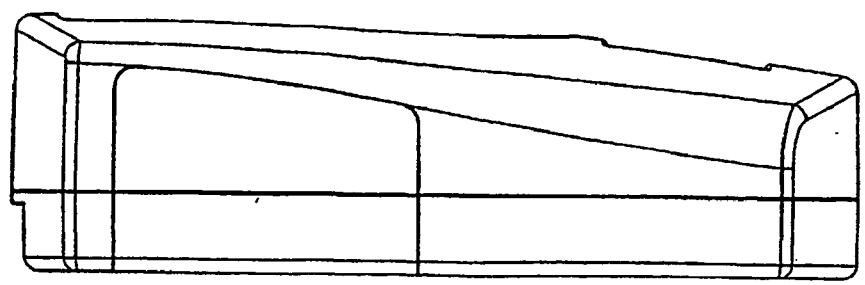
FIGS. 49-73D are views of an interface for a measuring device, such as a scale, embodying aspects of the invention.

In some embodiments, such as the one illustrated, the scale 10 also portable. As illustrated in FIGS. 43 and 44, a wheel 140 is connected to each pillar mounting support 48. Since the pillar mounting support 48 is located adjacent an edge of the base 14, the scale 10 merely needs to be tilted toward that edge to move the scale 10 by placing it on the wheels 140. Typically, one could grab the pillars 18 or a handle 144 coupled to the pillars 18 to tilt the scale 10 onto the wheels 140. As illustrated in FIGS. 45 and 46, the wheel 140 of the illustrated embodiment generally does not touch the ground when the scale 10 is in an operating position. A plurality of supports or feet 148 are designed to support the scale 10 with the wheels 140 above the ground. However, in other embodiments, one or more sets of wheels can be in contact with the ground while in operation. These embodiments can have other features to prevent the scale from moving such as, for example, wheel locks, spring biased supports for the wheels, and the like.

FIGS. 74-80 illustrate another embodiment of a scale 10A embodying aspects of the invention. Thus, like elements are given like reference numbers with "A." Additionally, like elements may not be discuss in detail. Generally, only the additional or different features of this embodiment will be described in detail.

The scale 10A illustrated in FIGS. 74-80 has a base 14A, spaced apart pillars 18A coupled to the base 14A, and an interface 52A coupled to the pillars 18A. Like the previous embodiment, this scale 10A is also portable. Thus, this scale 10A is equipped with wheels 140A and a handle 146A.

Figure 77:
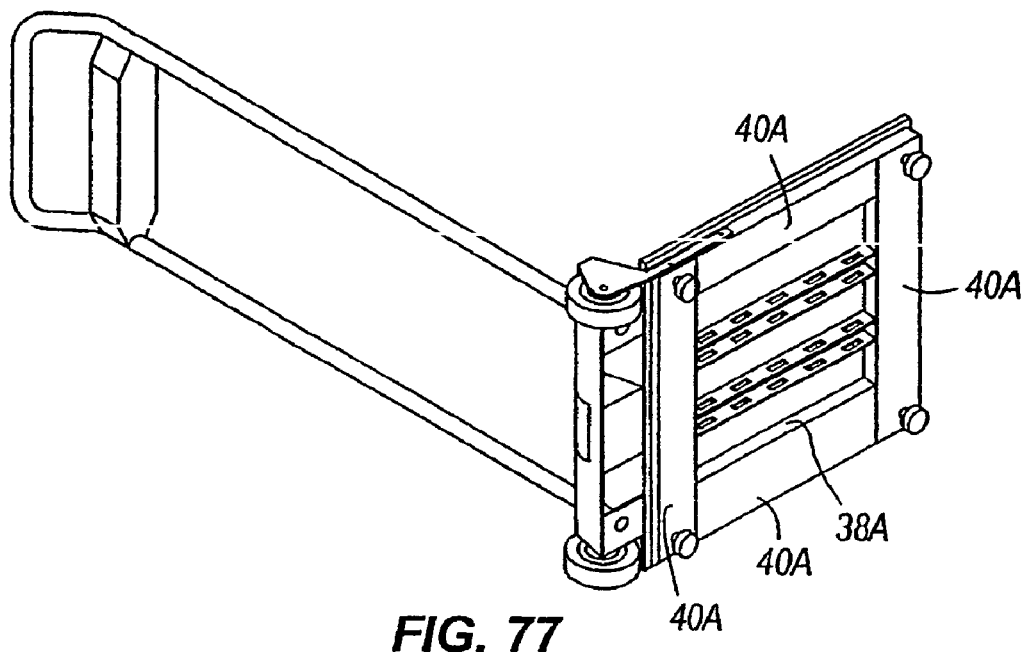
Figure 78:
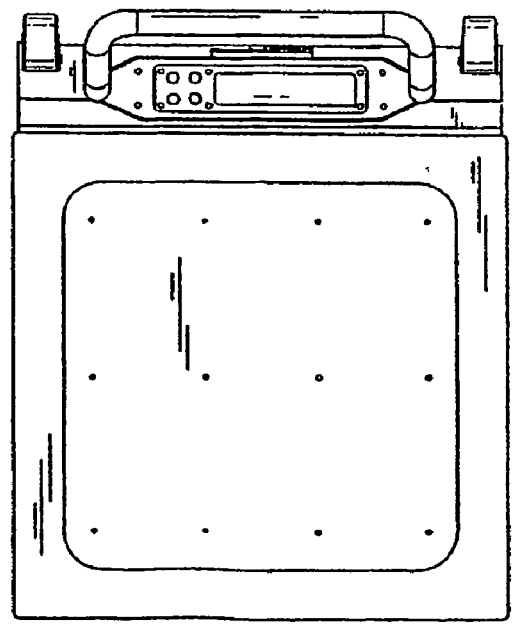
Figure 80:
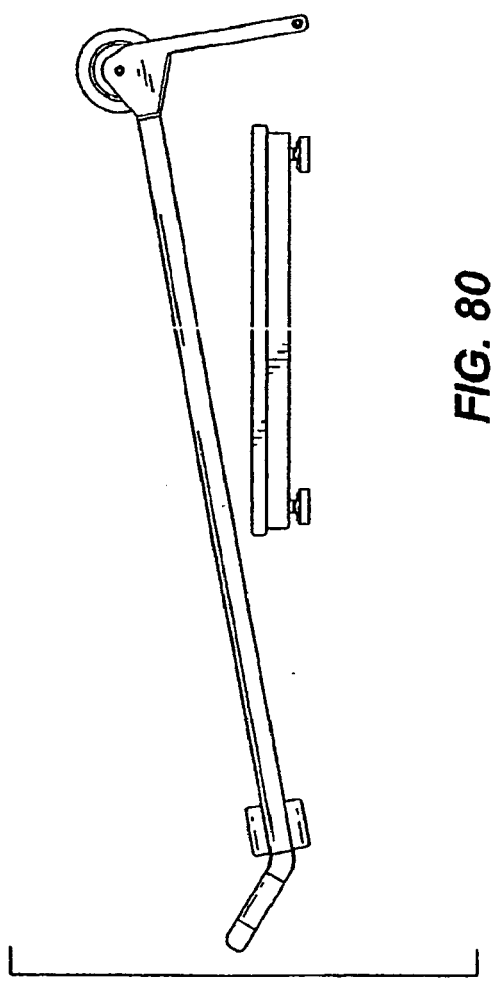
Figure 79:
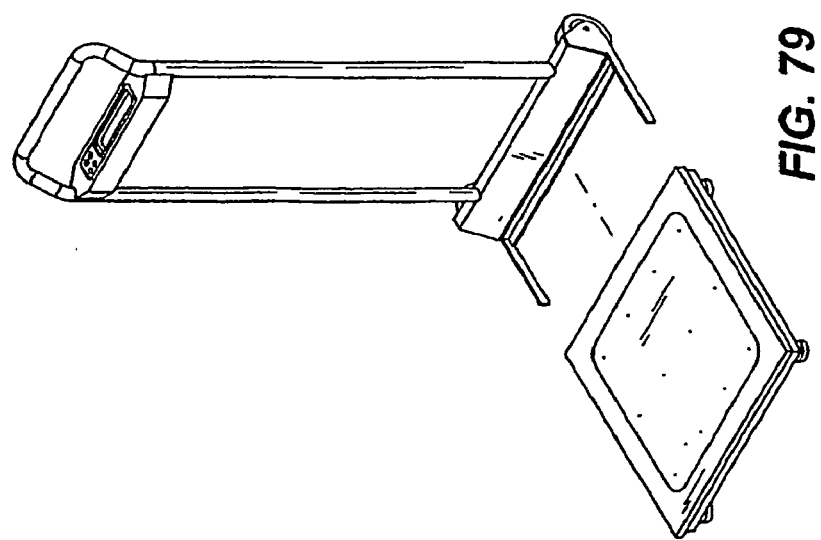
Figure 82:
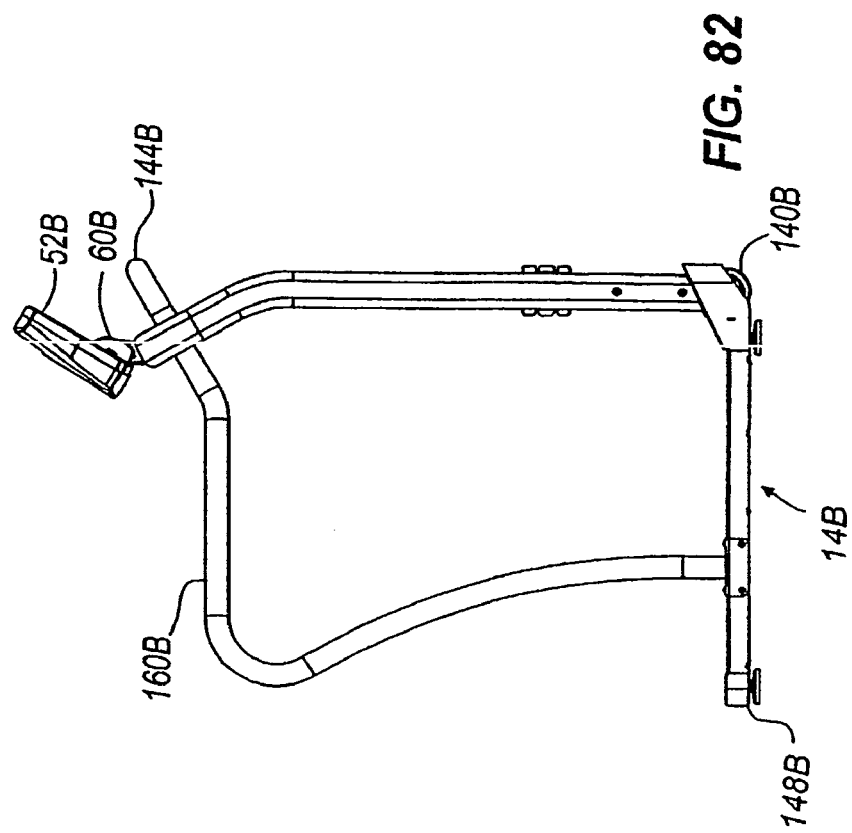
Figure 81:
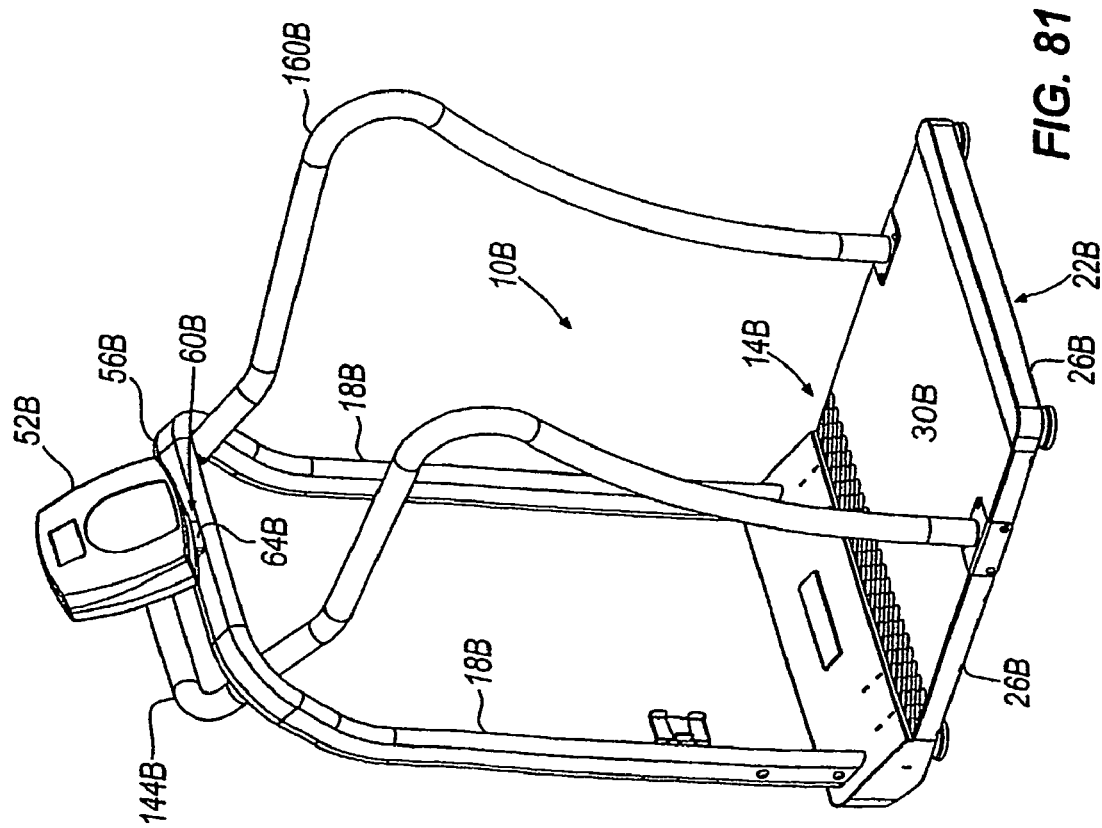
Figure 83:
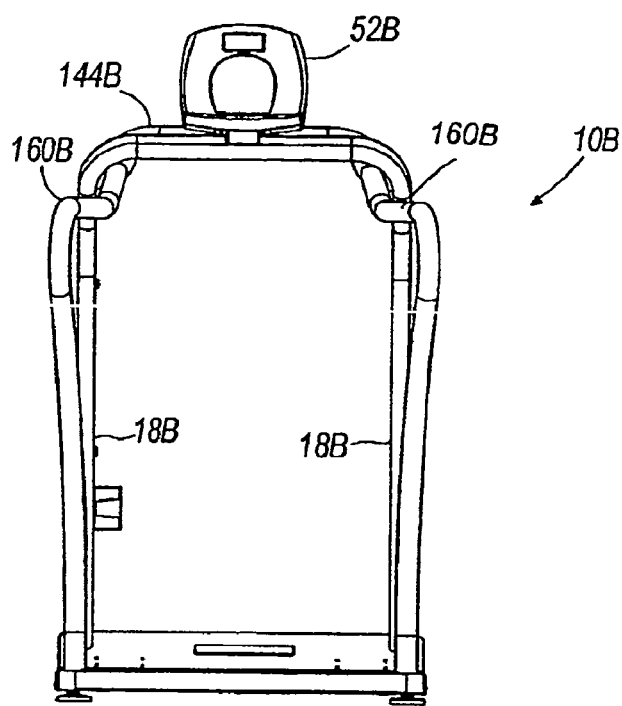
Figure 84:
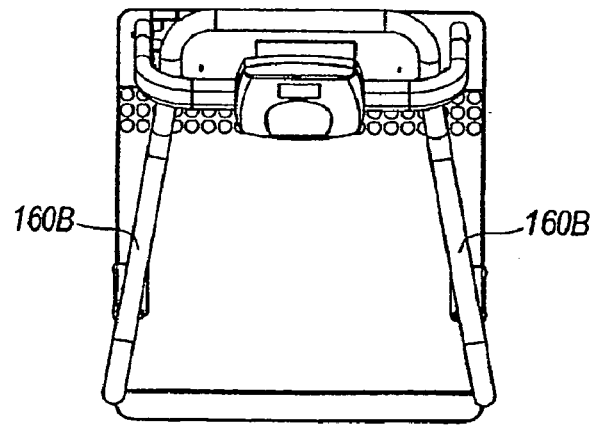
Figure 85:
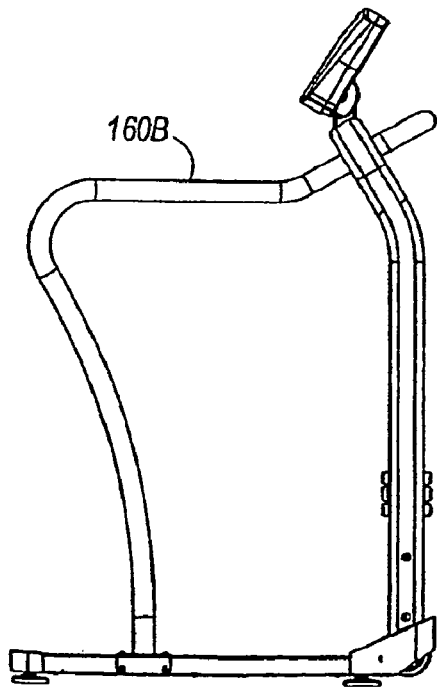

One difference between illustrated scale 10A and the scale 10 is the construction of the base 14A. FIGS. 77, 79, and 80 illustrate some of the differences. For example, FIG. 77 illustrates some of the support structure for the base 14A. This base 14A does not utilize as many center reinforcing members 38A as the previous embodiment. Specifically, the illustrated base 14A only has two center reinforcing members 38A. This embodiment may not need as many reinforcing members 38A because it utilizes more side reinforcing members 40A than the previous embodiment. Specifically, the previous embodiment only illustrated side reinforcing members 40A that ran parallel to the center reinforcing members 38A. The present embodiment illustrated in FIG. 77 also utilizes two side reinforcing members 40A that run perpendicular to the center reinforcing members 38A. The additional side reinforcing members 40A can provide additional support to the base 14A so that it can be separated from the pillars 18A and have sufficient strength to be a stand along structure.

As illustrated in FIGS. 79 and 80, the base 14A can be manufactured as a stand alone structure the can be attached to the pillars 18A and the pillar support structure as a module. The base 14A can use either wireless communication to convey information to the interface 52A, or it can have quick connect devices that can be easily plugged into the pillar support structure to allow communications via wires. The modular construction can have some advantages over other embodiments. For example, it allows the two portions to be shipped or stored separately to reduce space and/or prevent damage. Also, if one portion of the scale 10A were damaged or experiencing a malfunction, that portion could be easily removed, replaced with a temporary replacement module, and taken to a remote location to be serviced. This modularity also allows the scale 10A to be stored within less space. Additionally, it can allow the scale 10A to be moved through narrow spaces that a conventional scale of comparable size may not be able to pass through. In such a situation, the base of the scale 10A can be separated from the pillar support structure to be transferred through the narrow space.

Portions of the pillars 18A are also different with this embodiment. As described above, the pillars 18 of the previous embodiment had a cantilevered support surface 56 for the interface 52. Rather than resting on a cantilevered support surface, the interface 52A of this embodiment extends between two pillars 18A and is coupled to each pillar 18A as illustrated in FIGS. 74-80. Although the interface 52A is not supported on a cantilevered surface of the pillars 18A, the upper portion of the pillars 18A is bent to form a cantilevered portion (i.e., a portion that extends away from the remainder of the pillars 18A in a cantilevered manner). However, unlike the previous embodiment, this cantilevered portion extends away from the base 14A to form an integral handle 146A. Thus, this marks yet another difference from the previous embodiment. The scale 10 of the previous embodiment had a handle 144 that was not integral with the pillars 18. Rather, that handle 144 was separate from the pillars 18 and added during a secondary operation. The handle 146A of the present embodiment is preferably integral with the pillars 18A.

Finally, another difference can be seen with the interface 52A. The interface 52A is mounted directly to the pillars 18A in this embodiment. Furthermore, the interface 52A is fixed so that is does not generally swivel or pivot. In some embodiments, however, the interface 52A can be connected to both pillars 18A and yet pivot/swivel so that the display can be rotated about an axis extending between the two pillars 18A.

The differences discussed with respect to this embodiment are alternatives that could be incorporated into the previous embodiment or into subsequent embodiments. Additionally, not all alternatives are necessary for this embodiment. Rather the features can be used independently of others. Thus, a scale can be manufactured with the modularity of the embodiment shown in FIGS. 74-80 while maintaining the pillar and interface design of the embodiment illustrated in FIGS. 1-73. I should be understood that plenty of other combinations of elements are possible among the features of various embodiments. These and other modifications fall within the spirit and scope of the present invention.

FIGS. 81-91 illustrate another embodiment of a scale 10B. Thus, like elements are given like reference numbers. Additionally, like elements may be not discuss in detail. Generally, only the additional or different features of this embodiment will be described in detail.

The scale 10B illustrated in FIGS. 81-91 has a base 14B, spaced apart pillars 18B coupled to the base 14B, and an interface 52B coupled to the pillars 18B. Like the previous embodiments, this embodiment of the scale 10B may also be portable. Thus, this scale 10B is equipped with wheels 140B and a handle 144B. This embodiment has more visual similarities with the embodiment illustrated in FIGS. 1-73, and the discussion of the differences will be relative to the embodiment illustrated in FIGS. 1-73, unless otherwise indicated.

One of the main differences between the scale 10B illustrated in FIGS. 81-91 and the scale illustrated in FIGS. 1-73 is that this scale 10B has side railings 160B. As illustrated, the side railings 160B extend from the pillars 18B located at the front of the scale 10B along the sides of the scale toward the back of the scale 10B. Specifically, the railings 160B of the illustrated embodiment extend from just below the cantilevered support surface 56B of the pillars 18B. The railings 160B extend above and along a substantial portion of the sides of the base 14B. These railings 160B can help balance and support a person being weighed. Furthermore, they can help prevent a person having unstable balance from falling off the side of the scale 10B in all directions but one. Thus, another person can be positioned along the rear of the scale 10B to prevent a fall in this direction.

Figure 86:
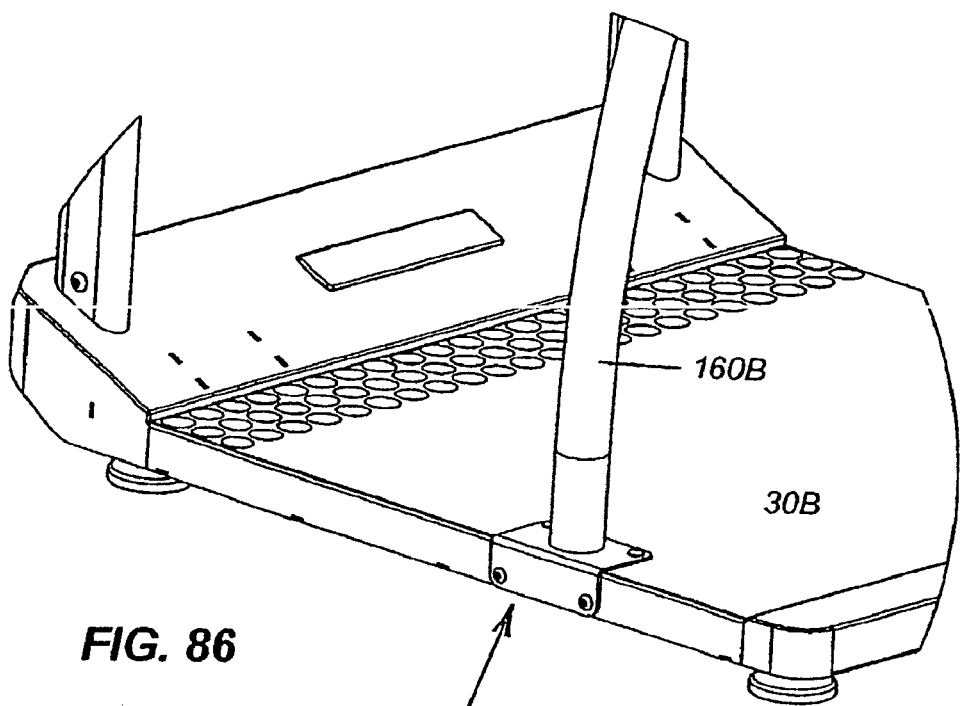
Figure 87:
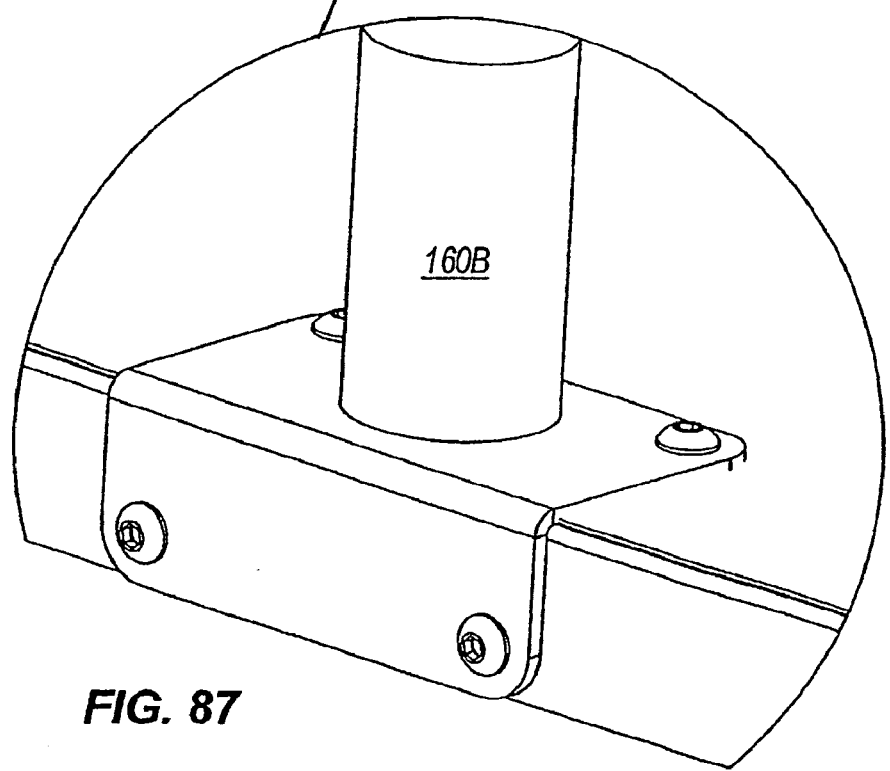
Figure 92:
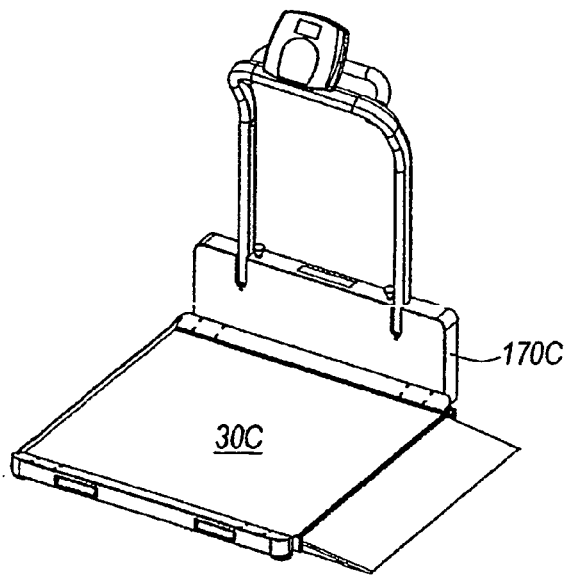
Figure 93:
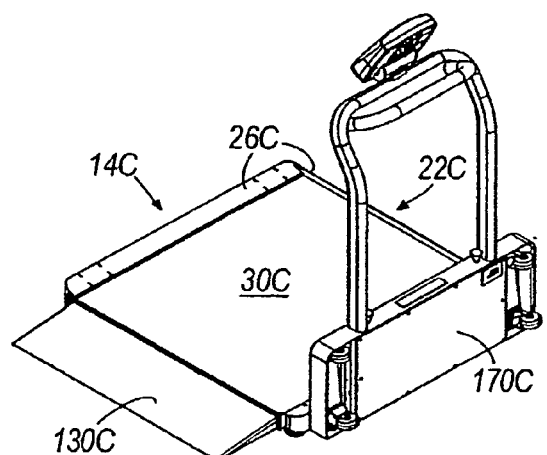
Figure 94:
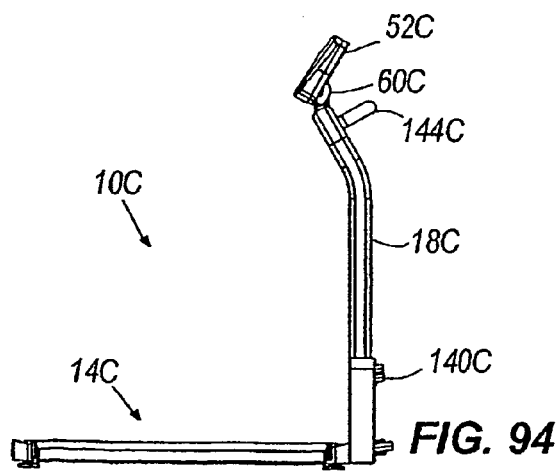
Figure 95:
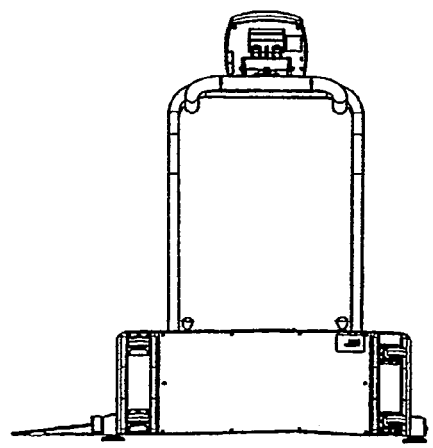
Figure 92A:
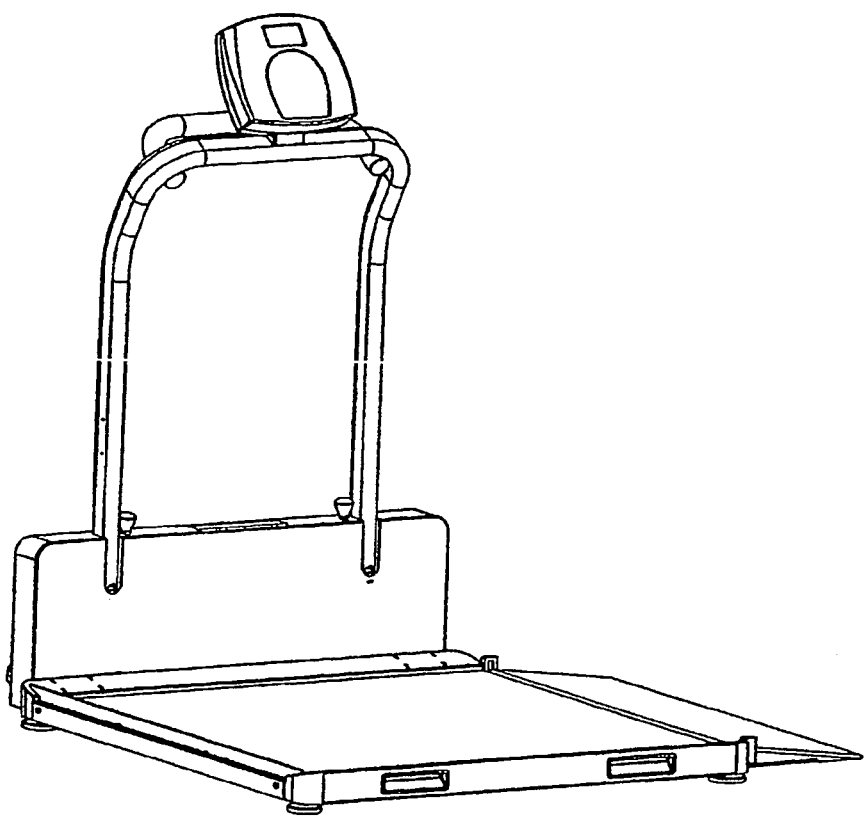
Figure 92B:
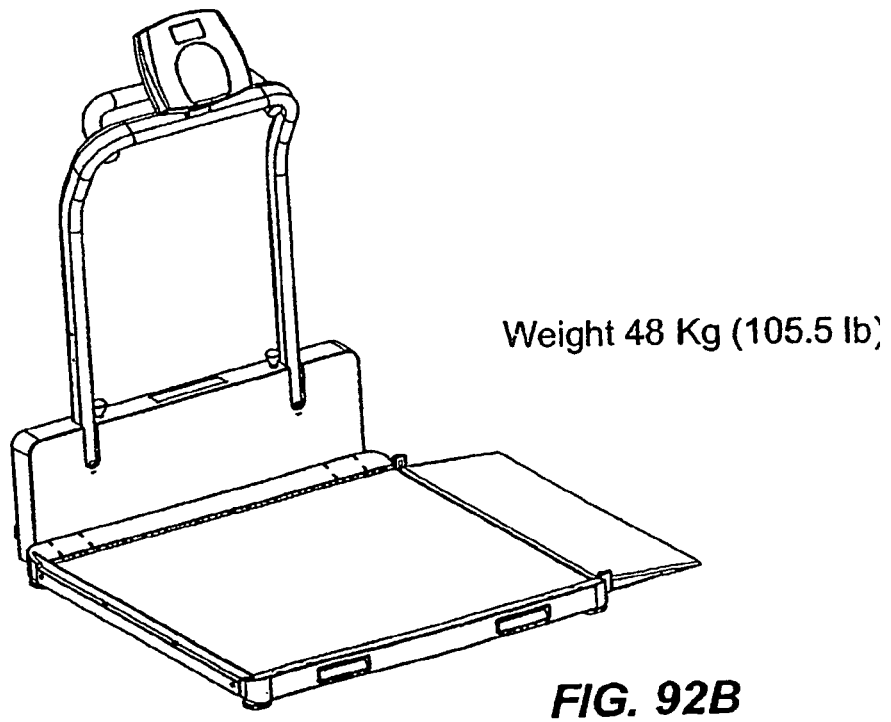
Figure 96:
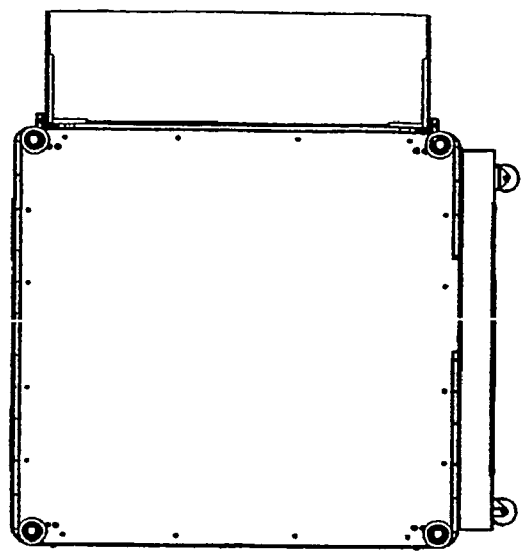
Figure 97:
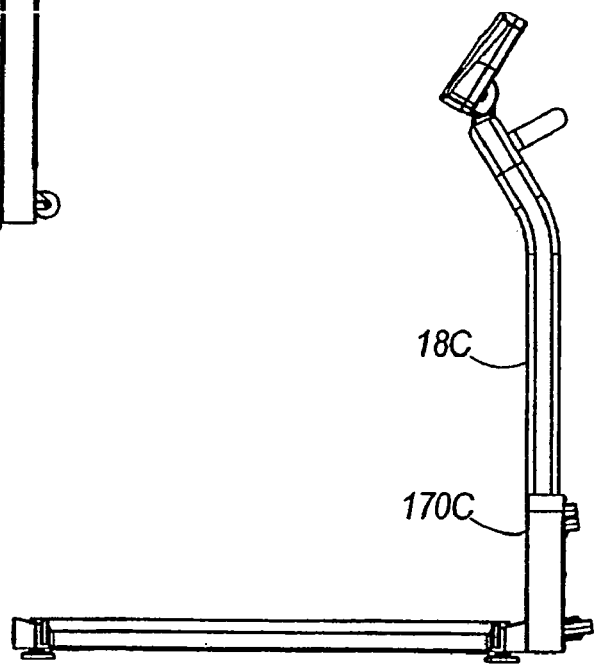
Figure 98:
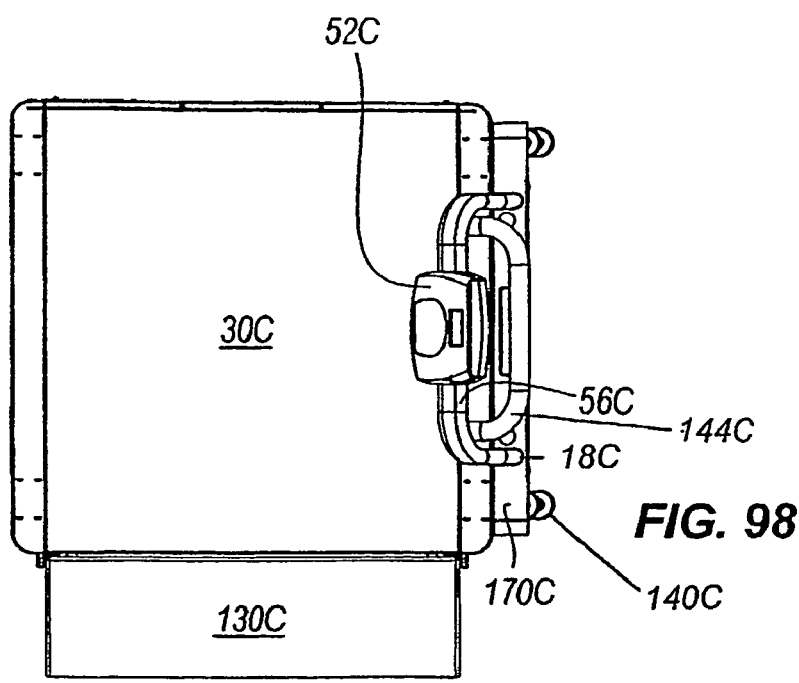

As illustrated, the rails 160B can extend from a raised position on the pillars 18B along the sides of the base and down towards the base 14B. In other words, the terminal end of each rail 160B is connected to the base 14B. Although FIGS. 86 and 87 show that the terminal end of each rail 160B is fastened to the base 14B, the rails 160B can be releaseably fastened such that the rails can be moved from one position to another. For example, in some embodiments (as will be discussed below), it may be desirable to pivot, rotate, or move the rails 160B toward each other or away from each other. One situation in which this may be desirable is during transport of the scale 10B between locations or storage of the scale when not used. One may want to disconnect the base (assuming it has a modular base) and rotate the rails inwardly to allow transport through narrow spaces. In other alternative embodiments, the base 14B may be pivotable toward a vertical position for transport or for storage. Again, with this alternative, it may be desirable to rotate the rails 160B inward to reduce the profile of the scale 10B. The rails 160B do not necessarily have to be disconnected from the base 14B for the rails 160B to move. Rather, if the base 14B were pivotable to a vertical position, the rails 160vB can be equipped with hinged portions to allow the rails 160B to fold into a stored, low-profile position.

As illustrated, the rails 160B may be continuous with the handle 144B. Thus, the handle 144B and the rails 160B can be integral. However, in some embodiments, it may be desirable to have a discrete handle and rails. For example, FIGS. 88-91 illustrate the connection between discrete rails 160B and the handle 144B. Specifically, the rails 160B have a recess that receives a projection from the handle 144B. The connection is then secured with a conventional fastener, such as an adhesive/cohesive bond, weld, threaded fastener, friction fit, interference fit and the like. Furthermore, although the illustrated embodiment positions the discrete elements to appear continuous, it may be desirable to position these elements to appear discontinuous. Regardless of whether the rails 160B and handle 144B are continuous and/or integral, they can be coupled to the pillars 18B with many conventional coupling techniques. In the illustrated embodiment, the handle 144B is coupled to the pillars 18B and the rails 160B are coupled to the handle 144B.

Since the scale 10B of this embodiment has rails 160B, the position of the ramp 130B (if used) would need to be moved relative to the location illustrated in the embodiment of FIGS. 1-73. The ramp in the previous embodiment was located along one side. The ramp 130B of the embodiment illustrated in FIGS. 81-91 should be located along the rear of the scale 10B.

The differences discussed with respect to this embodiment are alternatives that could be incorporated into the previous embodiments or into subsequent embodiments. Additionally, not all alternatives are necessary for this embodiment. Rather, features can be used independently of others. It should be understood that the vast combination of elements that are possible among the different embodiments disclosed. These modifications fall within the spirit and scope of the present invention.

FIGS. 92-108 illustrate another embodiment of the scale 10C. Thus, like elements are given like reference numbers. Additionally, like elements may not be discussed in detail. Generally, only the additional or different features of this embodiment will be described in detail.

The scale 10C illustrated in FIGS. 92-108 has a base 14C, spaced apart pillars 18C coupled to the base 14C, and an interface 52C coupled to the pillars 18C. This embodiment has more visual similarities with the embodiment illustrated in FIGS. 1-73 than with any other embodiment, and the discussion of the differences between embodiments will be relative to the embodiment illustrated in FIGS. 1-73 unless otherwise indicated.

Like the previous embodiments, this embodiment of the scale 10C is also portable. Thus, this scale 10C is equipped with wheels 140C and a handle 144C. However, certain features related to the portability of the present embodiment are different from the previous illustrated embodiments. Specifically, the base 14C can be positioned generally parallel to the pillars 18 for transport. A hinged connection 166C between the pillars 18C and the base 14C allow for this. In some embodiments, the hinged connection 166C allows the base 14C to be pivoted upwards toward the pillars for transport. In other embodiments, the pillars 18C can be pivoted toward the base 14C for transport, and the base 14C and the pillars 18C are then placed on end for transport. The illustrated embodiment represents the later situation.

As illustrated in FIGS. 92-108, the scale 10C of this embodiment has a housing 170C that is not illustrated in the previous embodiments. This housing 170C contains a plurality of wheels 140C, a hinge or pivot connection 166C, and a locking device. As illustrated, the housing 170C is positioned substantially perpendicular to the base 14C and the wheels at least partially extend from the housing 170C. The wheels 140C are oriented so that the axis of each wheel 140C is substantially perpendicular to the base. The pillars 18C are coupled to the housing 170C with the hinged connection 166C and extend from the housing 170C. During operation of the scale 10C, portions of the pillars 18C extend in a substantially parallel direction to the housing 170C. However, when the scale is pivoted for transport, the same portions of the pillars 18C are substantially perpendicular to the housing 170C.

A lock 174C can be used to prevent unwanted relative movement between the base 14C and the pillars 18C during operation. The lock 174C can be any type of lock. The illustrated lock 174C uses the engagement and disengagement of a projection and a recess to lock and unlock the pivoting action. As illustrated, a member 176C having one or more recesses can be coupled to the pillar 18C to rotate relative to the housing 170C, while an actuator 178C having a projection 180C can be coupled to the housing 170C. The illustrated member 176C has two apertures separated by about ninety degrees, which represents the operating position and the transporting position. In the operating position, the projection 180C aligns with a first aperture, and, in the transport position, the projection 180C aligns with the second aperture. The projection 180C can be actuated to engage the apertures in either position. Preferably, the projection is spring biased to engage the apertures. Thus, an operator would have to actuate the projection 180C to overcome the spring bias to change the scale 10C from one position to the next.

Figures 99, 100:
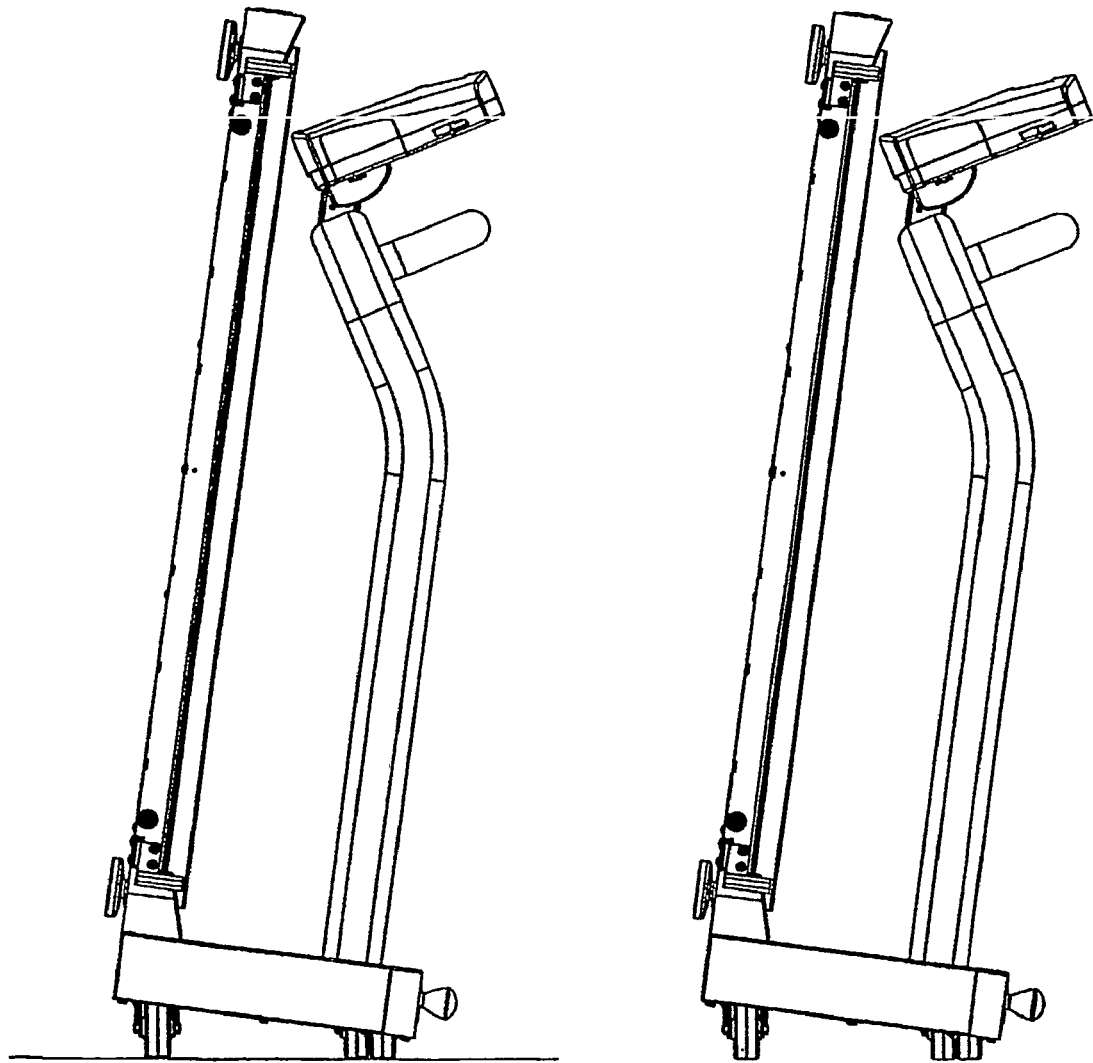
Figure 101:
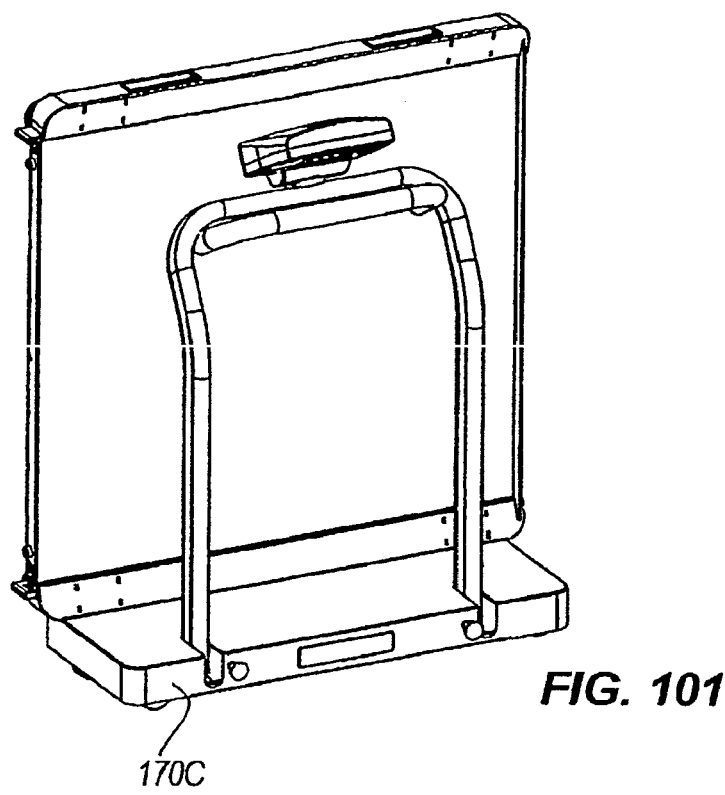
Figure 102:
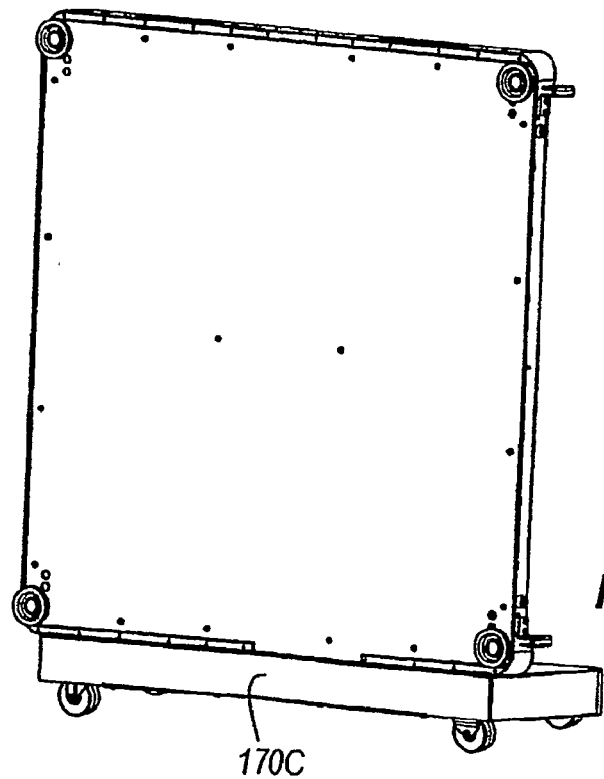
Figure 103:
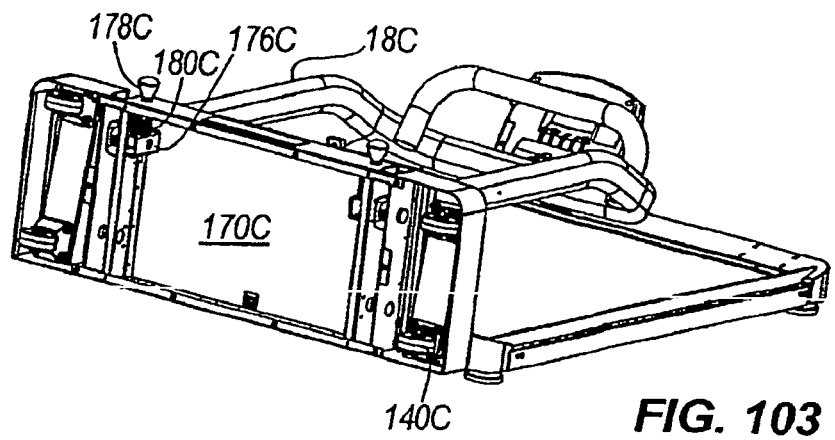
Figure 104:
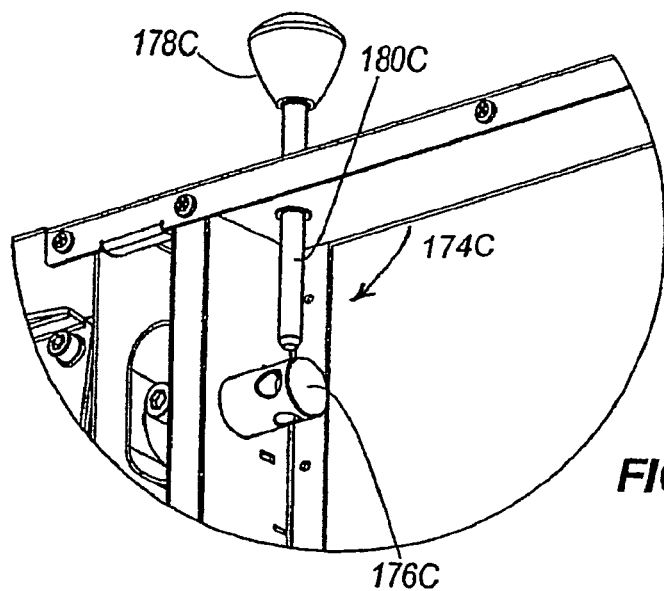
Figure 105:
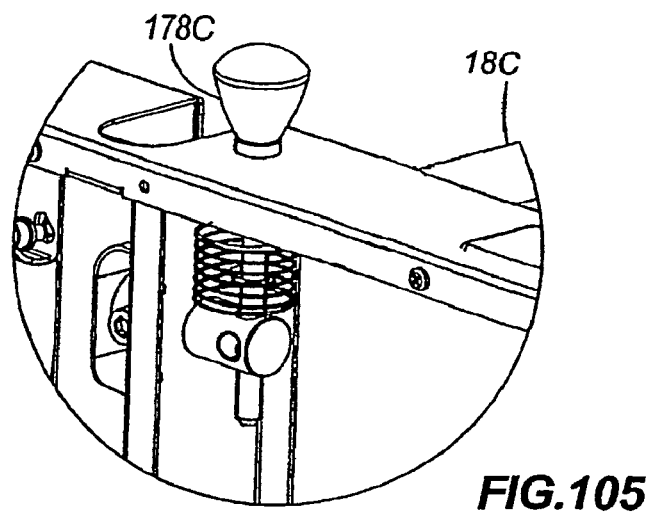
Figure 106:
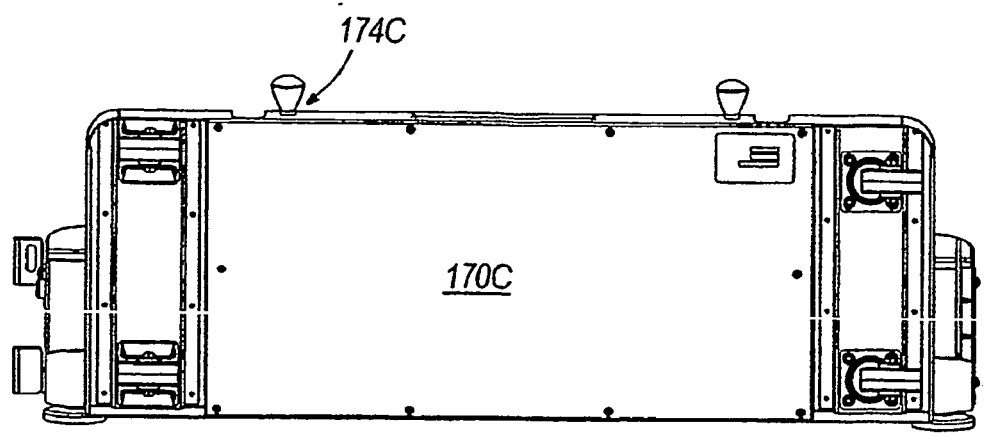
Figure 107:
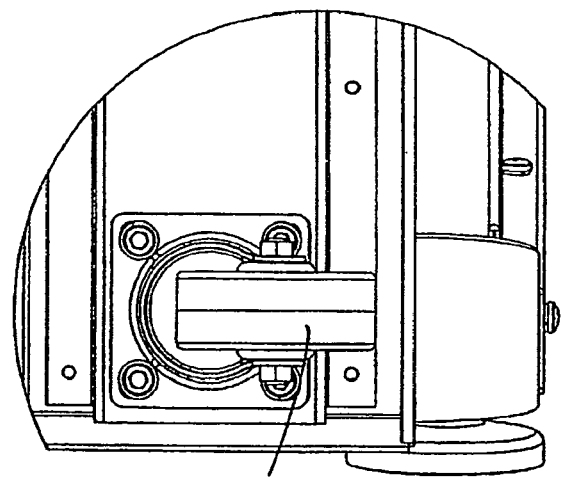
Figure 108:
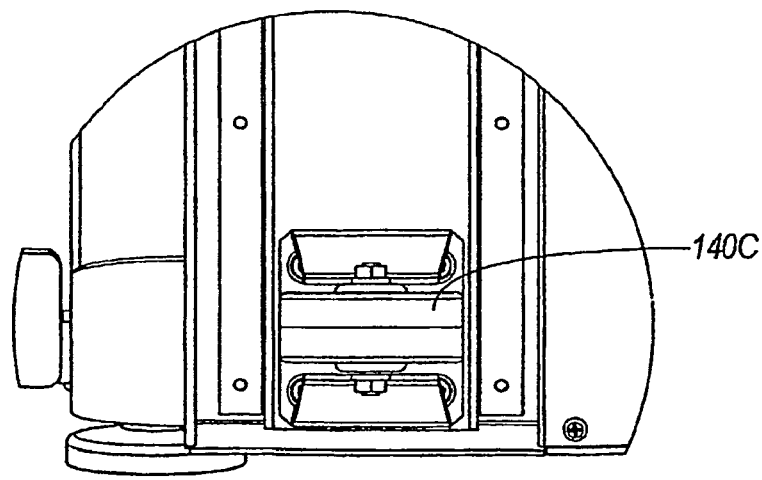

As described above, the pillars 18C of this embodiment fold towards the base 14C and then the entire scale 10C is tilted on end to place this scale in a position for transport. When the scale 10C is placed on the wheels 140C, the scale of some embodiments will appear to be slightly tilted, as illustrated in FIGS. 99 and 100. This is done in this embodiment to property position the center of gravity of the scale 10C over the wheel base. In some embodiments, this may not be necessary. The tilt can be provided in a variety of ways. For example, different size wheels can be used or the wheels can be mounted within the housing at different heights with respect to each other to provide this tilt. Finally, although the illustrated wheels 140C are castors other types wheels would also work.

The differences discussed with respect to this embodiment are alternatives that could be incorporated into the previous embodiments or into subsequent embodiments. Additionally, not all alternatives are necessary for this embodiment. Rather, features can be used independently of others. I should be understood that the vast combination of elements that are possible among the different embodiments disclosed. These modifications fall within the spirit and scope of the present invention.

FIGS. 109-138 illustrate another embodiment of a scale 10B. Thus, like elements are given like reference numbers. Additionally, like elements may not be discussed in detail. Generally, only the additional or different features of this embodiment will be described in detail.

Figure 109:
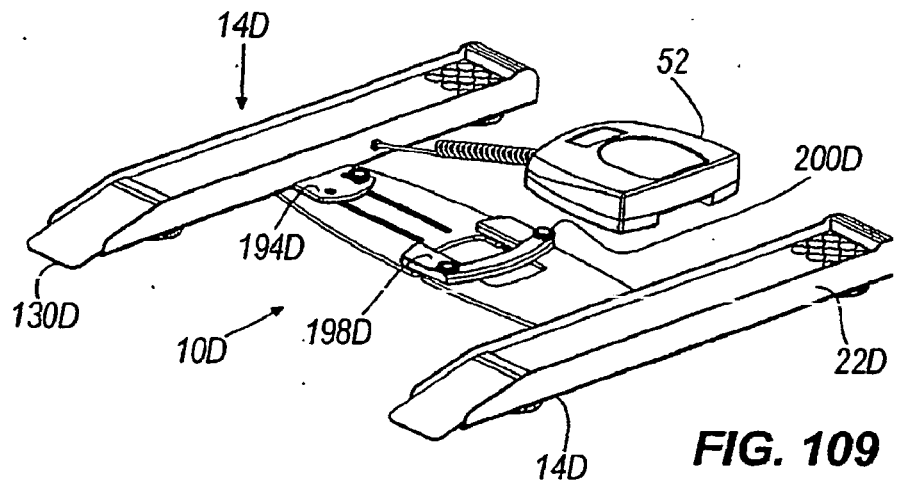
Figure 110:
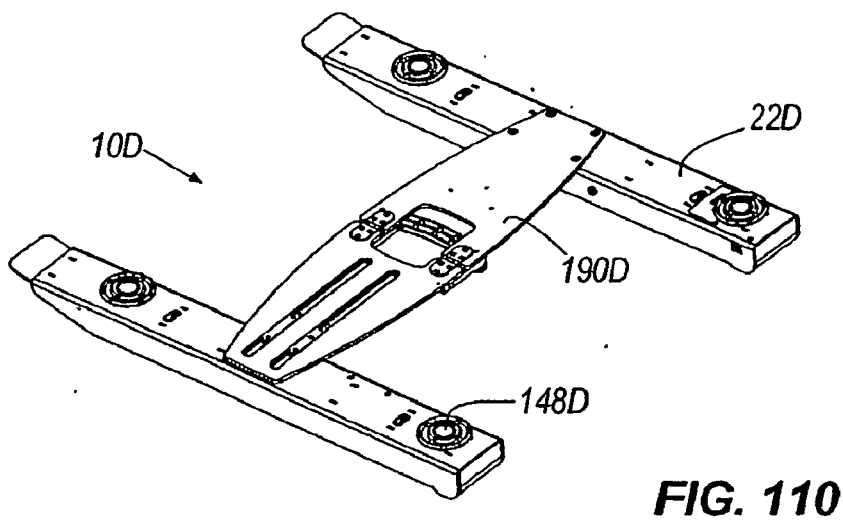

As illustrated in FIG. 109, this scale 10D has two spaced apart bases 14D. As will be discussed in grater detail below, the bases 14D can be spaced apart to aligned with and receive the wheels of a wheel chair (not shown). Each base 10D has a frame 22D that supports one or more load cells 34D within the base 10D. As illustrated, the frame 22D of the base is shaped like a channel, and the sides of the channel extend beyond the top 30D of the base 14D. These portions help direct the wheels onto the scale and prevent the wheels from inadvertently rolling off the sides of the base 10D. A second channel is inverted with respect to the first channel and centered within the first channel. This second channel supports the load cells 34D. The top 30D rests upon the load cells 34D and is coupled to the frame 22D. The far end of the top 30D has a lip to stop the wheels of the wheel chair. A ramp 130D is located at the other end of the top 30D. As illustrated in FIGS. 127-131, some embodiments of the scale 10D have additional support members 188D that support the load cells 34D and are coupled to the feet 148D of each base 14D.

As illustrated in FIGS. 109-112 and 132-138, the two bases 14D are connected together by a plate 190D. The bases 14D can be rigidly fixed to the plate 190D, or they can be adjustably connected. The illustrated embodiment has one fixed base and one adjustable base. The fixed base can be fixed by any conventional coupling mentioned above. The adjustable base is connected to one or more adjustment mechanisms 194D. As illustrated, the base is fastened to these adjustment mechanisms 194D, and the adjustment mechanisms 194D are moveably connected to the base. Specifically, the base 14D is rigidly attached to two slides 196D. The slides 196D are moveable within grooves of the plate 190D. When the slides 196D are properly located for the width of the wheelchair, they can be fastened to the plate 190D to prevent movement. Any type of releasable fastener can be used.

Figure 111:
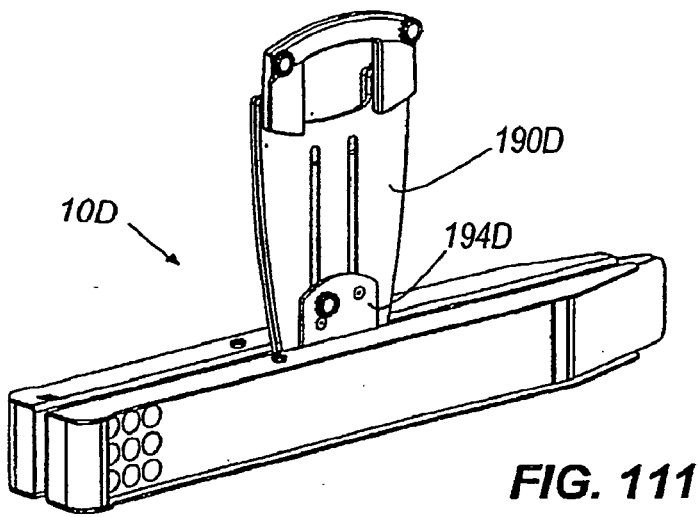
Figure 112:
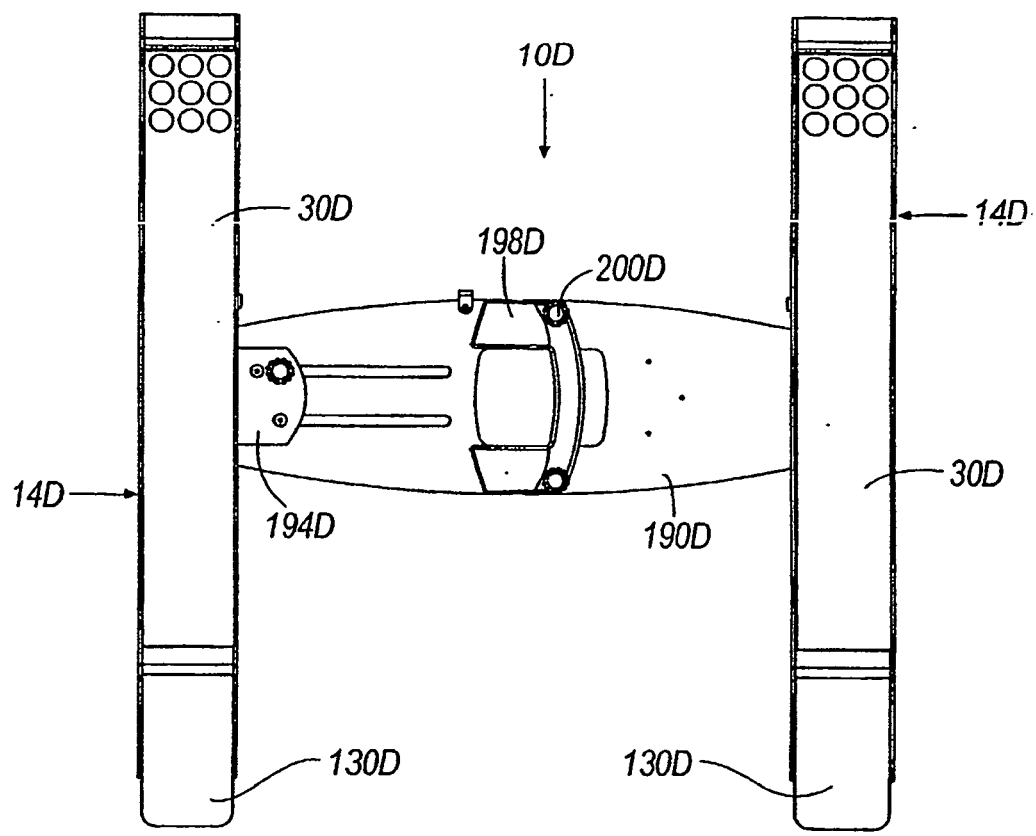
Figure 113:
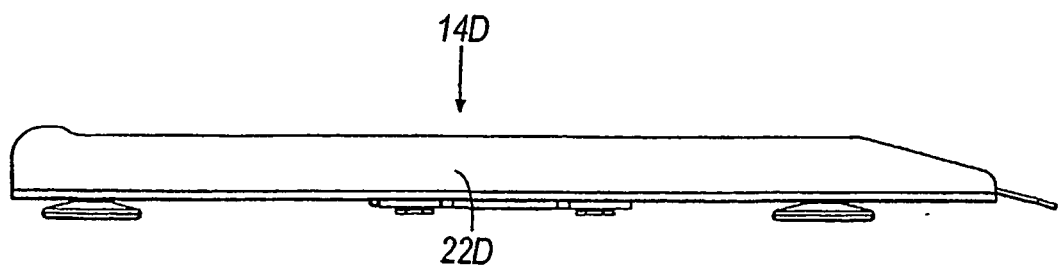
Figure 116:
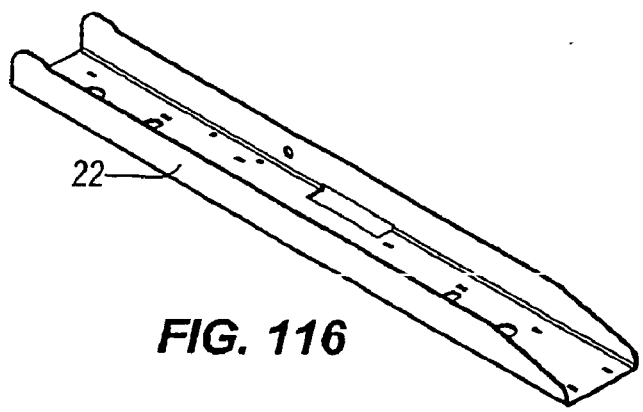
Figure 117:
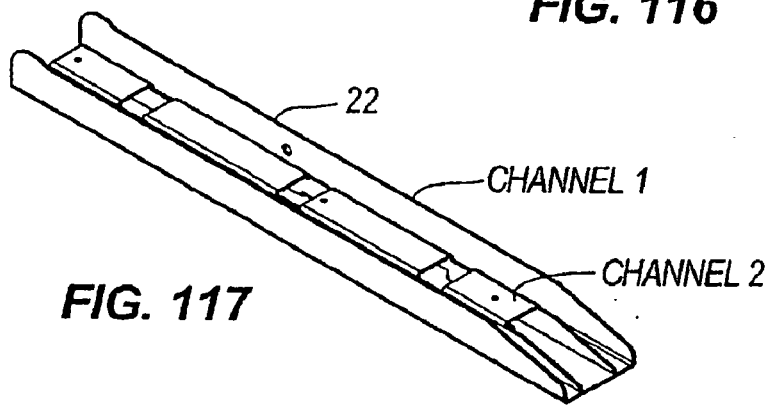
Figure 118:
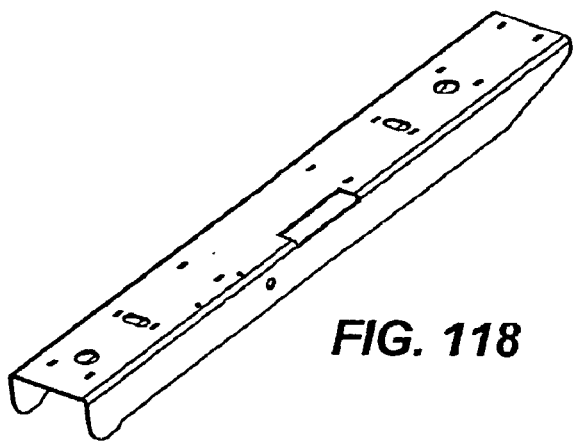
Figure 119:
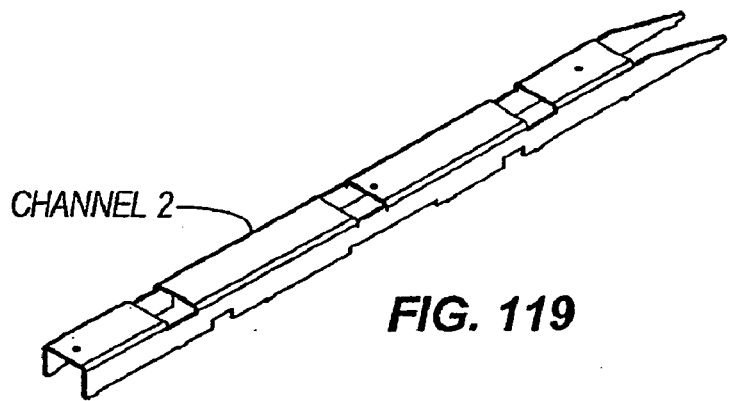
Figure 120:
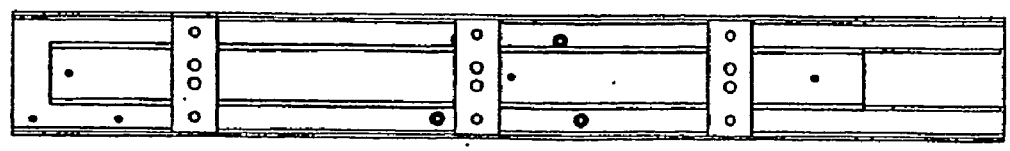
Figure 121:
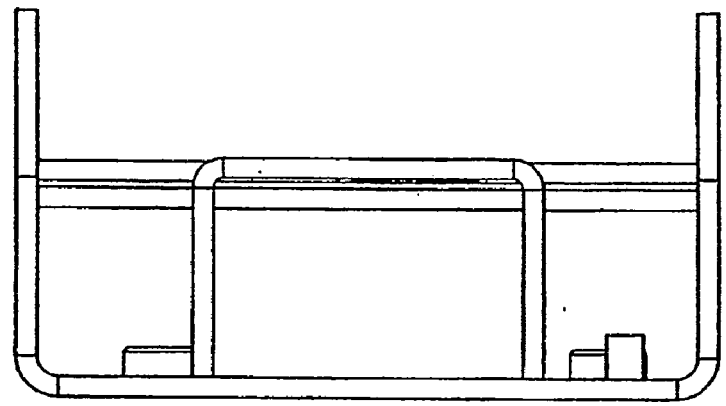
Figure 122:
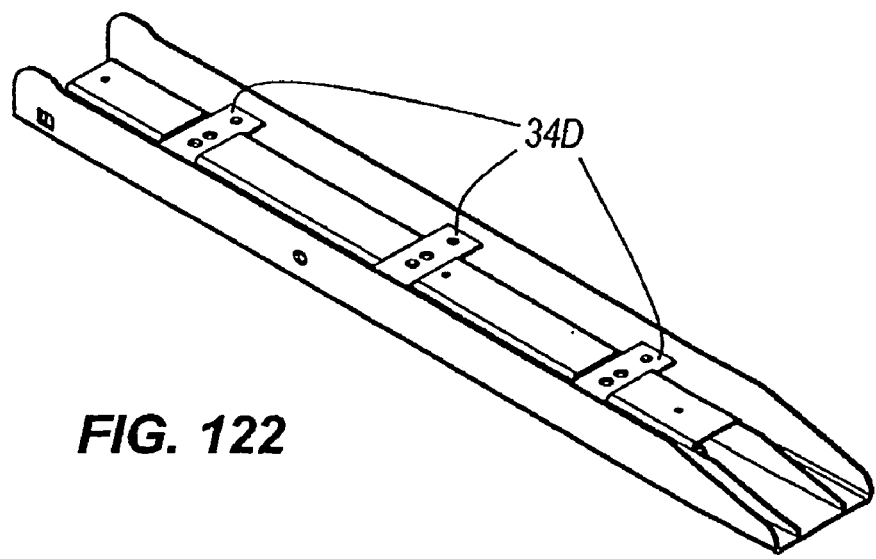
Figure 123:
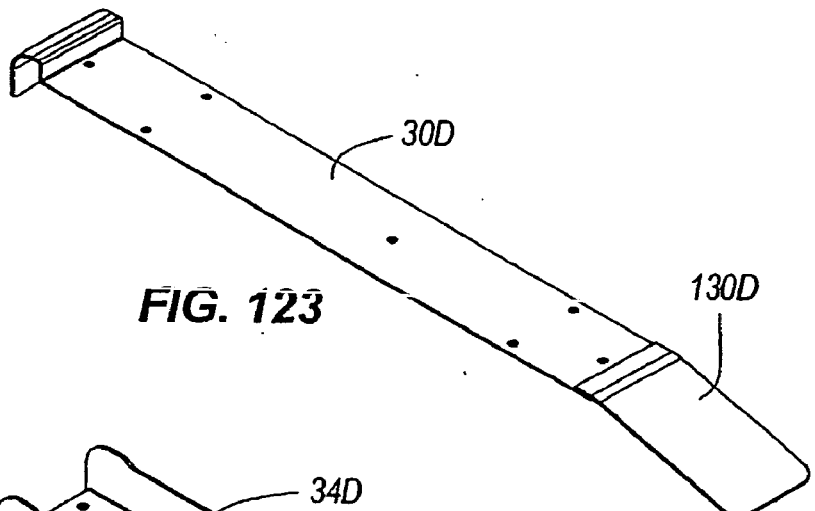
Figure 124:
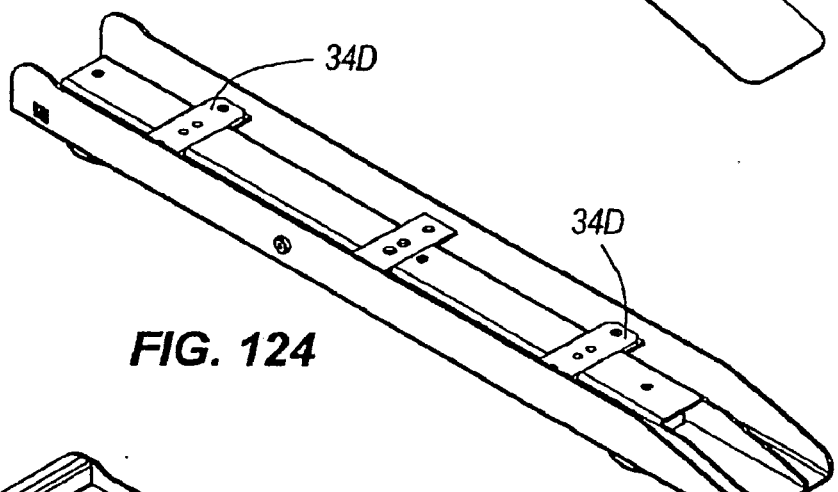
Figure 125:
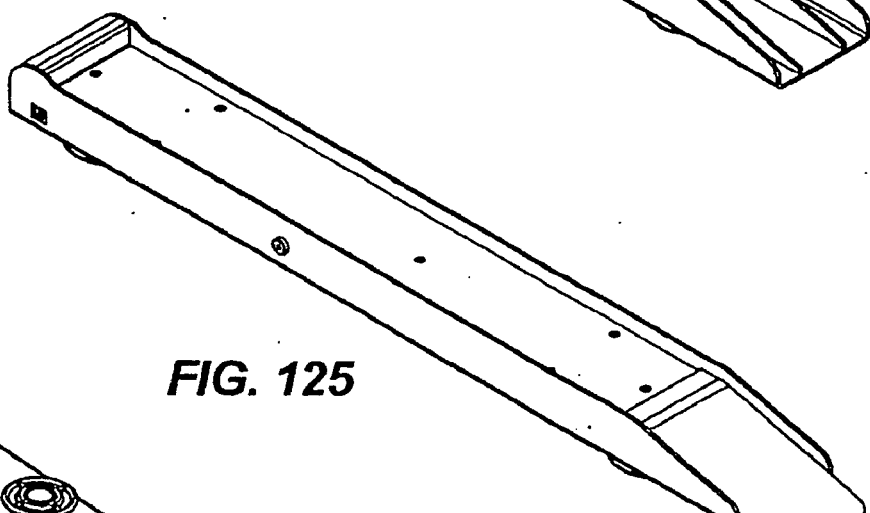
Figure 126:
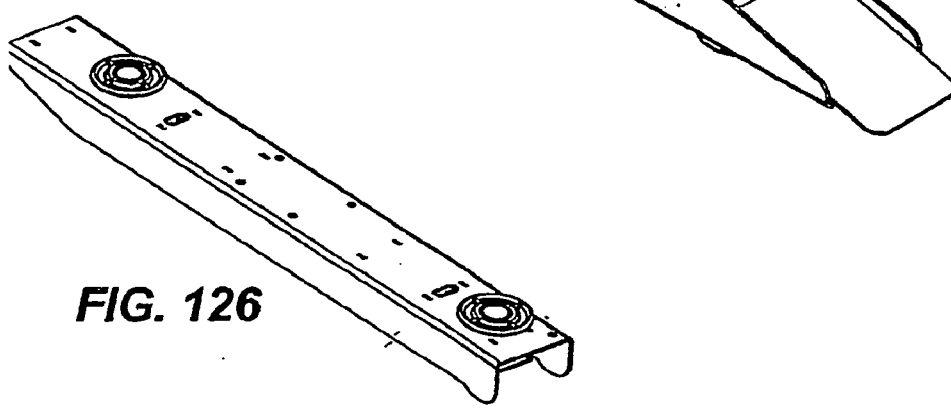
Figure 132:
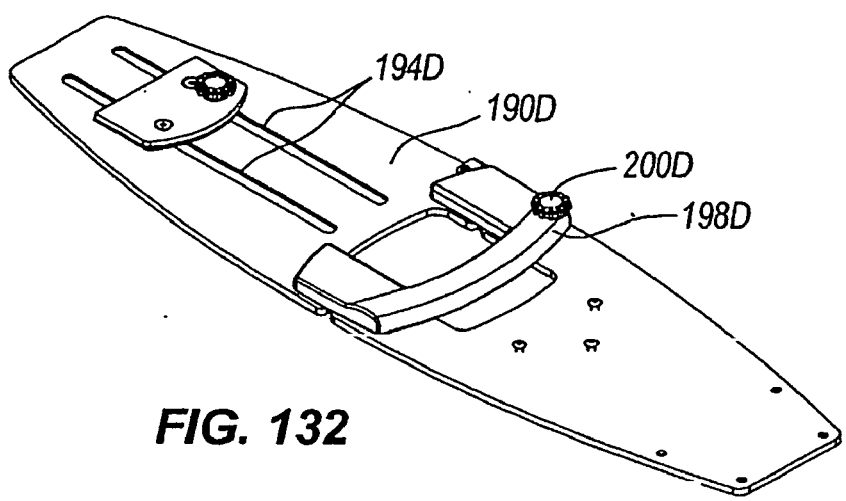
Figure 133:
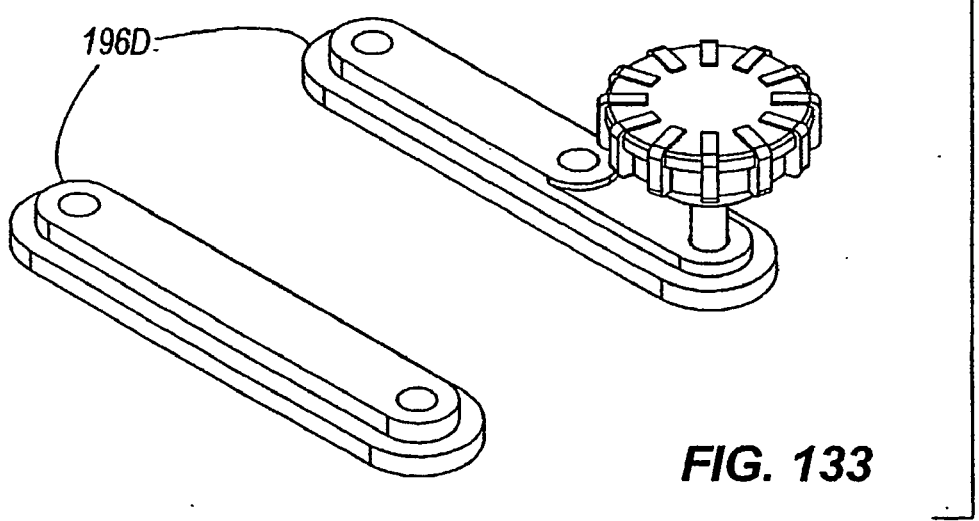
Figure 134:
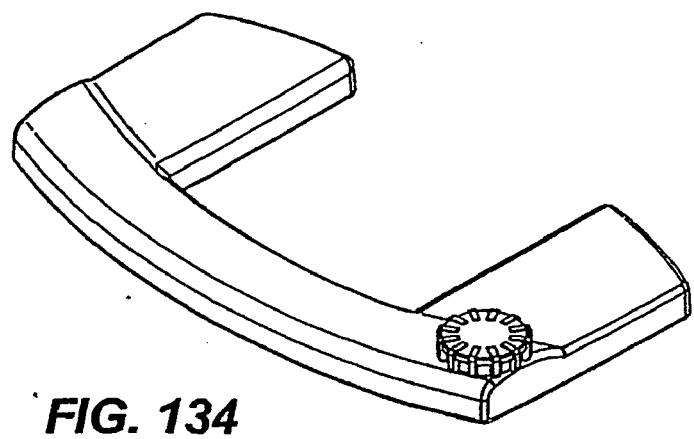
Figure 135:
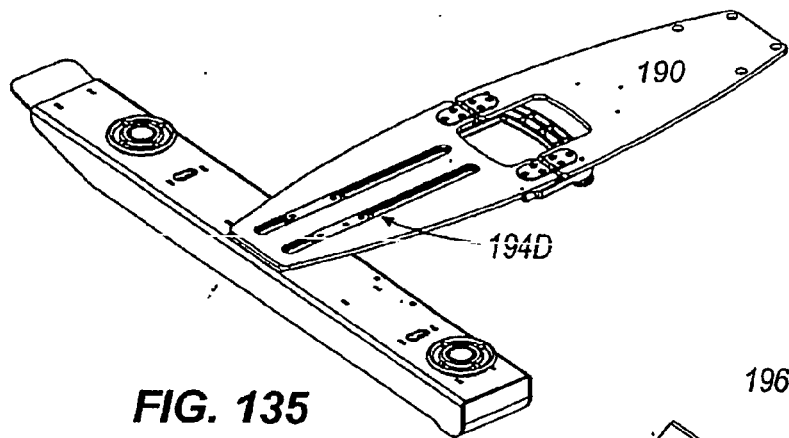
Figure 136:
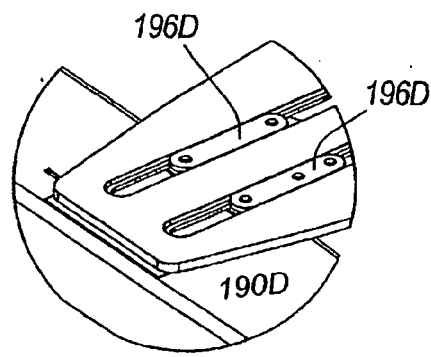
Figure 137:
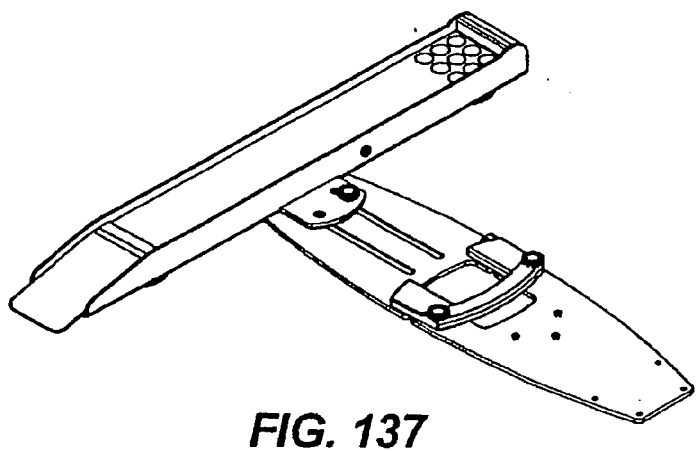
Figure 138:
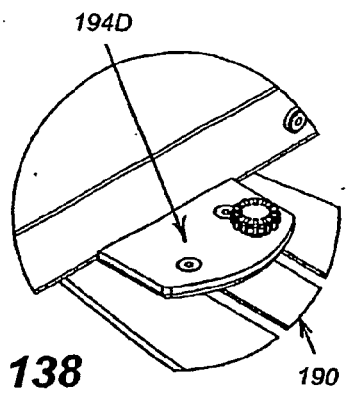

In some embodiments, the plate 190D can be hinged to allow the scale 10D to be pivoted or folded for transport or storage. For example, the illustrated plate 190D is hinged in the middle. This allows the plate 190D to be folded in half. Assuming the bases 14D are positioned symmetrically about the hinge, the folded scale 10D would appear as illustrated in FIG. 111. Some embodiments of the scale 10D also include a handle 198D coupled to the plate 190D. The handle 198D can provide a convenient location to grasp the scale 10D for transport. The handle 198D can also be equipped with a releasable fastener 200D. The base of the handle 198D can be fastened to the plate on one side of the hinge, and the fastener 200D can be positioned on a portion of the handle 198D that will be located on the other side of the hinge when the plate 190D is not pivoted or is in the operating position. The fastener can then engage the plate 190D to prevent the plate 190D from folding.

As illustrated in FIG. 109, the interface 52D can connect to the base 14D with a wire connection. If a cord is used for the connection, the cord can be releasable. However, in other embodiments, the interface 52D can be coupled to the base 14D with a wireless connection. Regardless of the connection, the interface 52D can be placed in a variety of positions. It can be located on the floor, attached to a wall or other structure, or be held in a person's hand during operation.

Figure 50:
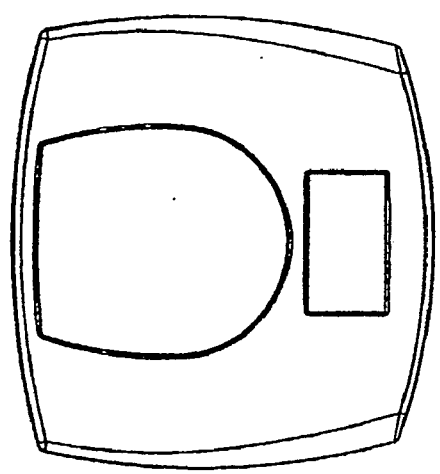
Figure 51:
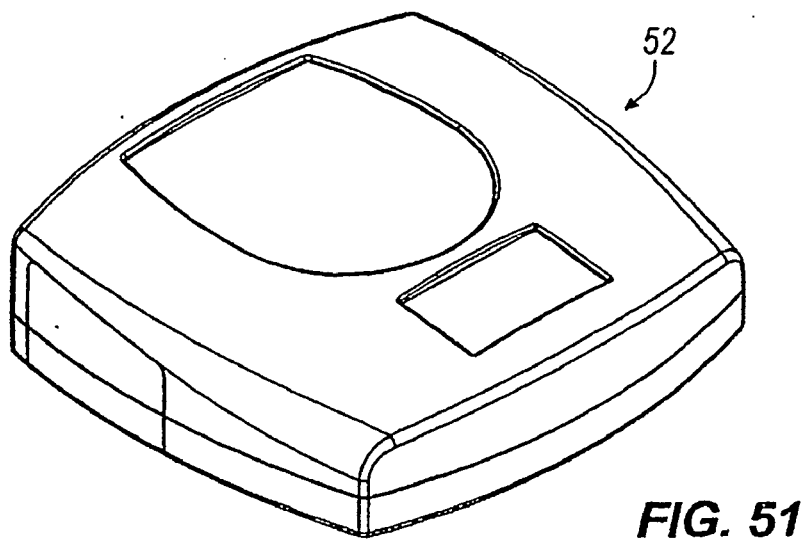
Figure 52:
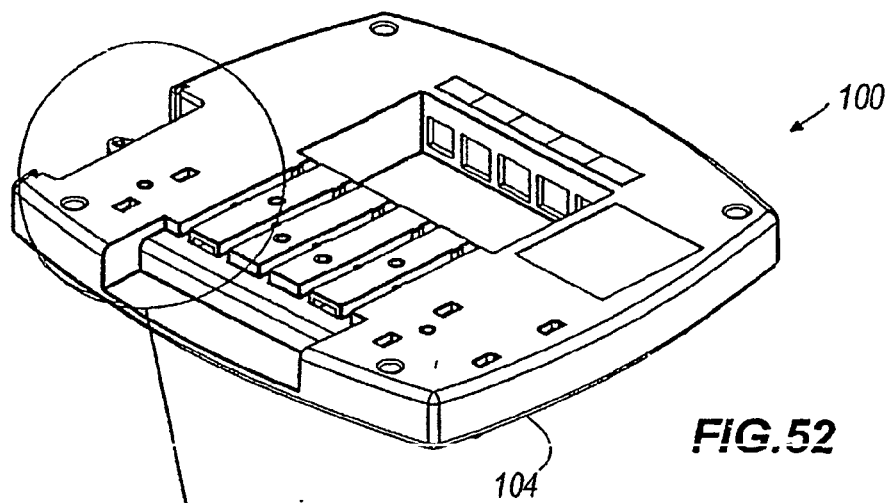
Figure 53:
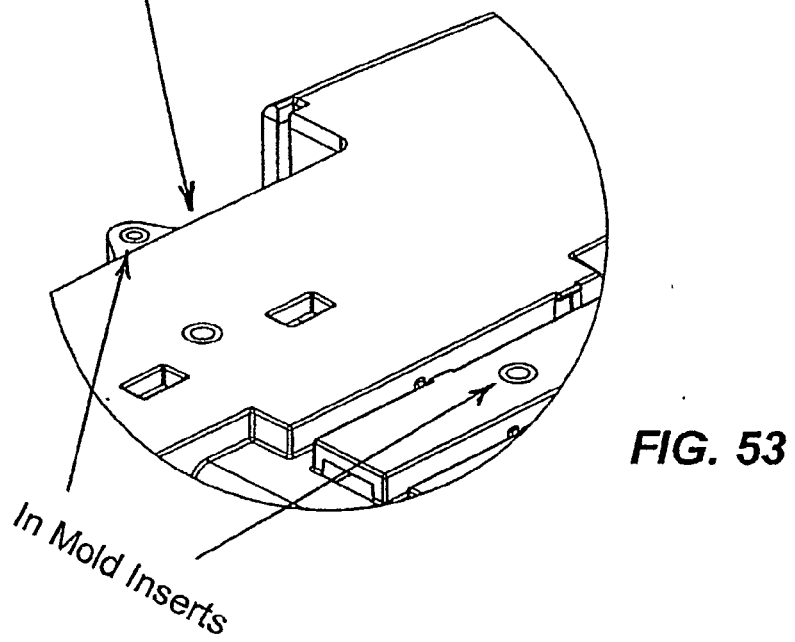
Figure 54:
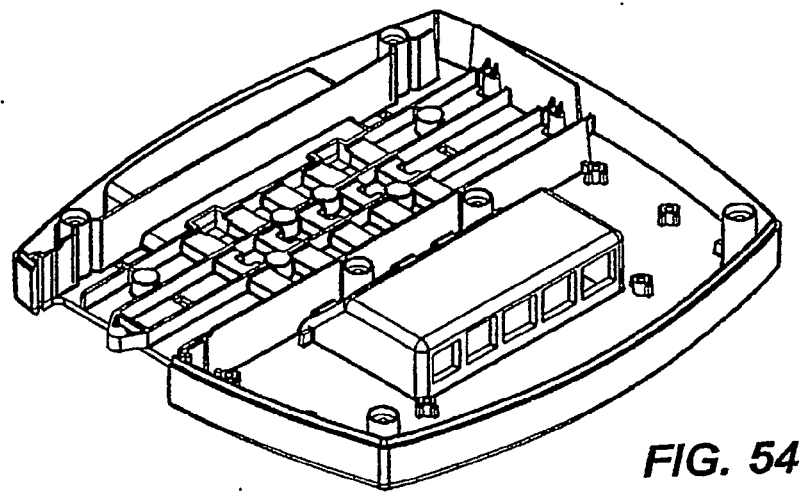
Figure 55:
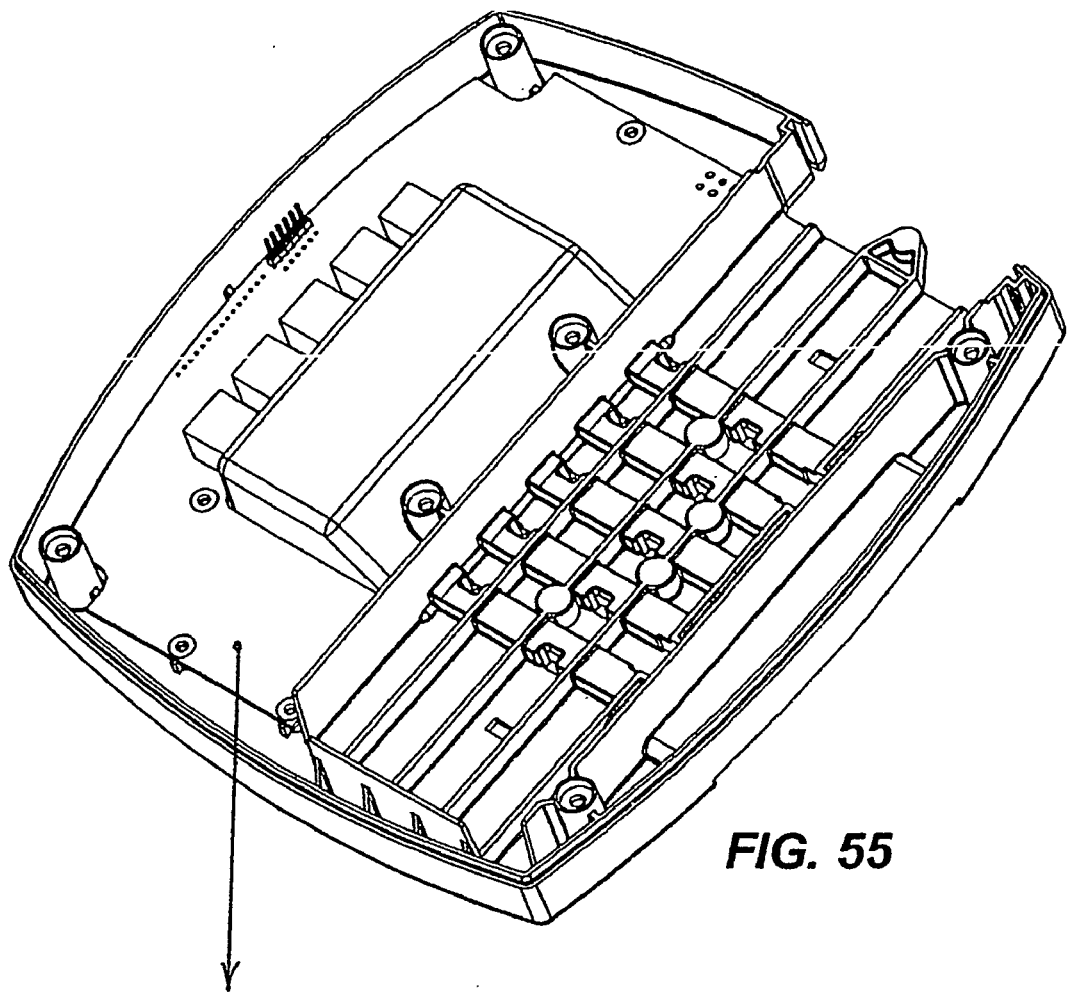
Figure 56:
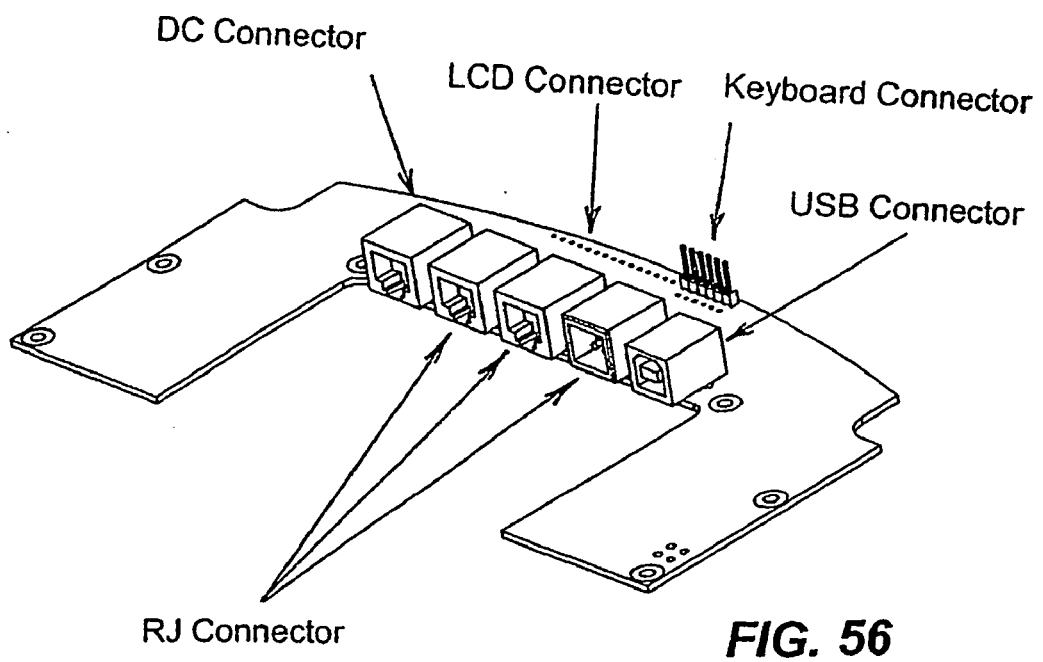
Figure 57:
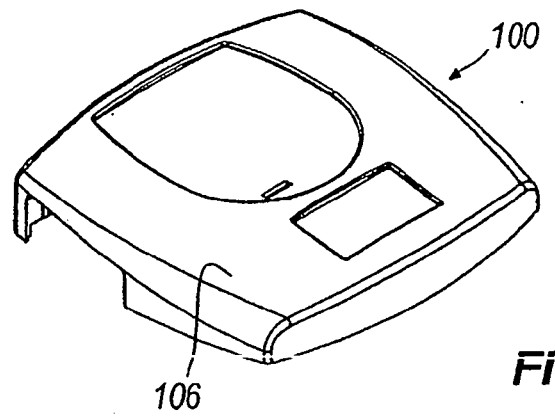
Figure 140:
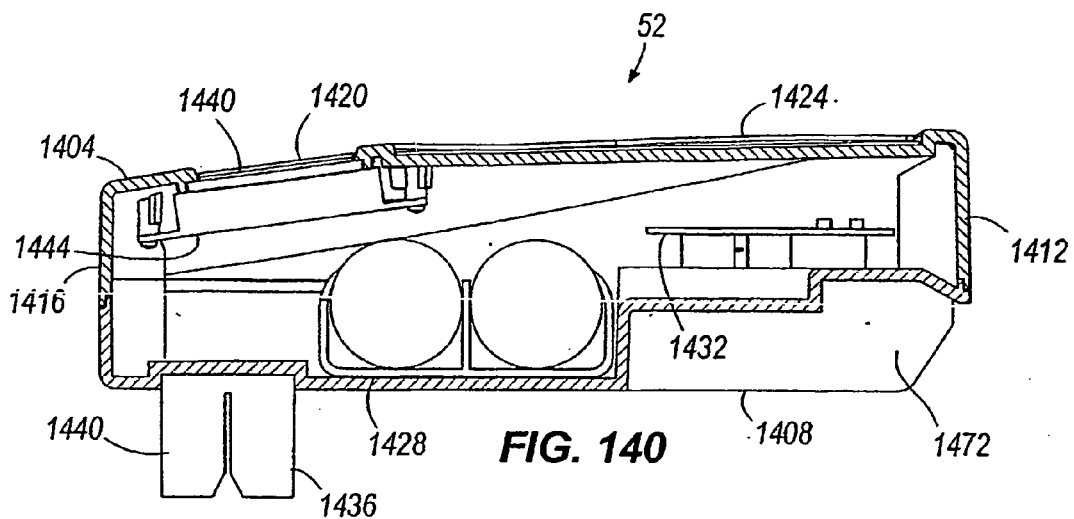
FIG. 140 shows a sectional view of an embodiment of the interface shown in FIG. 50 according to the present invention.

As described above, the scale 10 includes an interface 52 as shown FIG. 50. A cross section view of an exemplary interface 52 is shown in FIG. 140. As shown in FIG. 140, the interface 52 has an upper shell face 1404 having user interface devices thereon, a lower shell face 1408, a top side 1412, a bottom side 1416, a left side, and a right side. The interface 52 also includes user interface devices such as a display 1420 and a keypad 1424 both positioned on the upper shell face 1404, a power module 1428 accessible from the lower shell face 108, a peripheral device communication section 1432, and a scanner section 1436.

Figure 141:
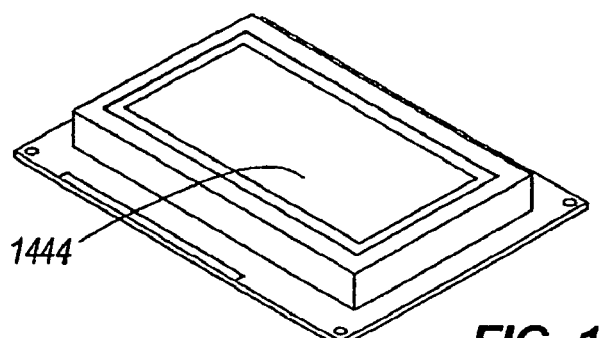
FIG. 141 shows a liquid crystal display ("LCD") of the interface according to the present invention.

In the embodiment shown in FIG. 140, the display 1420 is positioned near the top side 1412, whereas the keypad 1416 is adjacent to the display 1420 and near the bottom side 1416. However, other display/keypad position combinations such as having both the display 1412 and the keypad 1416 adjacent to the top side are also possible. In other embodiments, the display 1412 and the keypad 1416 are both located on a touch screen. In yet other embodiments, the display 1412 is located on a tablet whereas the keypad 1416 is in the form of a light pen. In such case, a user will select options on the tablet or the display 1412. The display 1420 generally includes a protection screen 1440, and a liquid crystal display ("LCD") 1444 as shown in FIG. 141. In the embodiment shown in FIG. 141, the LCD 1444 has a pixel resolution of 128×64, such as SM3227P LCD display from ShanTou, although other sizes and other resolution can also be used depending on needs. Furthermore, although the LCD 1444 used in the embodiment displays color text and graphics, other display type such as thin film transistor displays or monochrome LCDs can also be used as a display in the interface 52.

The keypad 1424 is a form of communication between the user and the scale 10. The keypad 1424 generally includes a variety of keys such as numbers, up and down keys. The keypad 1424 also includes an ON/OFF that turns the scale 10 on and off, and a ZERO/CLEAR key that sets the value on the display 1420 to zero or tare out a certain weight. The ZERO/CLEAR key is also used as a way to navigate between menus and to get out of certain menu options. If the ZERO/CLEAR key is pressed (or when the user used the swipe card to set a TARE or if the user enters the TARE through the menu options, which will be described hereinafter), a TARE indicator is shown on the display 1420. The keypad 1424 also includes a HOLD/RELEASE key that holds the value of the weighed load on the display 1420 until the user presses the HOLD/RELEASE key again thereby clearing the value. The keypad 1424 also includes a Kg/LB key that switches between the metric and constitutional systems. The keypad 1424 also includes an identification key that is used to enter a patient identification into the scale 10. The patient identification will be stored with all the measurements made until a different patient identification is stored, or the patient identification is cleared. The keypad 1424 also includes an ENT or enter key enter values into the scale 10. After the user has changed a value, the ENT key is pressed to effectuate the entry.

Figure 142:
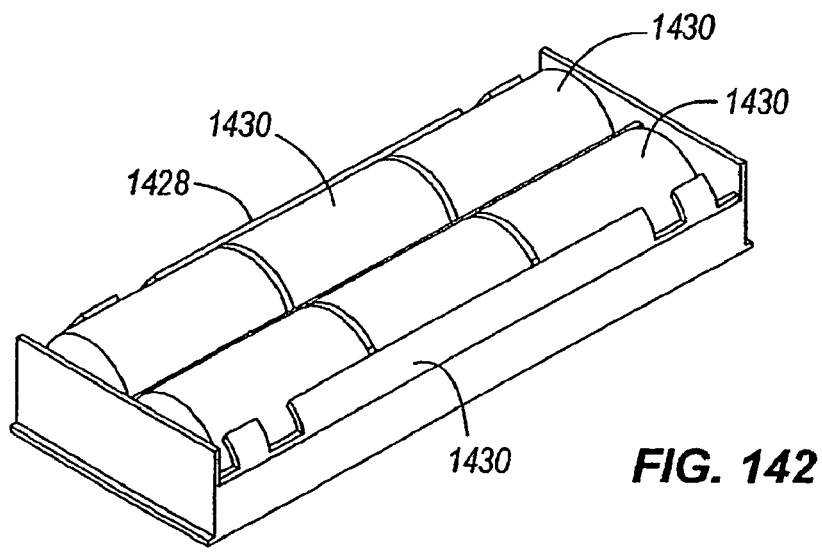
FIG. 142 shows a power module of the interface according to the present invention.
Figure 143:
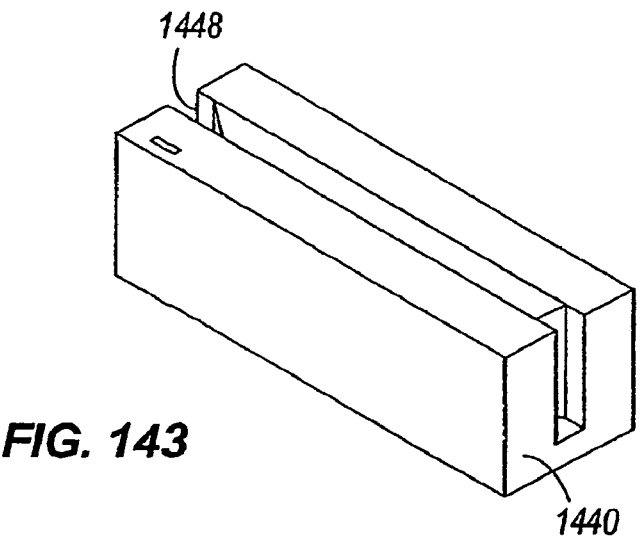
FIG. 143 shows a perspective view of the embodiment of the scanner section shown in FIG. 140 according to the present invention.
Figure 144:
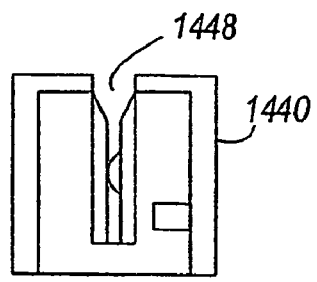
FIG. 144 shows a sectional view of the embodiment of the scanner section shown in FIG. 140 according to the present invention.
Figure 145:
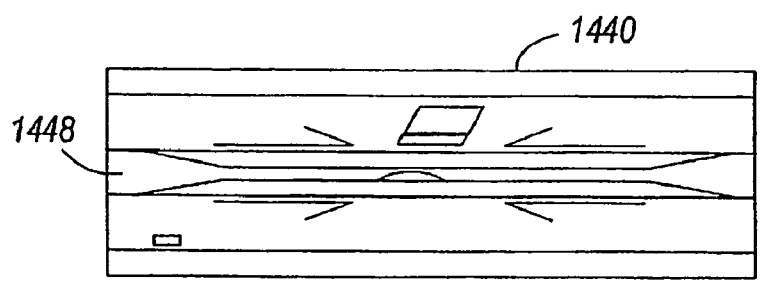
FIG. 145 shows a top view of the embodiment of the scanner section shown in FIG. 140 according to the present invention.

FIG. 140 also shows that the power module 1428 is nearly centered and sitting inside the interface 52 on top of the lower shell face 1408. An exemplary power module 1428 is shown in FIG. 142. The power module 1428 generally includes a plurality of batteries 1430 for supplying power to the display 1420, the keypad 1424, the scanner section 1436, and the like of the interface 52. However, it would be appreciated that other forms of power supply such as transformers that are configured to transform utility power to power required by the interface 52 can also be used. The extruded scanner section 1436 includes a swipe card scanner 1440 (a perspective view, a sectional view and a top view are shown in FIGS. 143, 144, and 145 respectively) configured to read information from a magnetic card swiped across a swipe channel 1448 of the scanner 1440.

Figure 146:
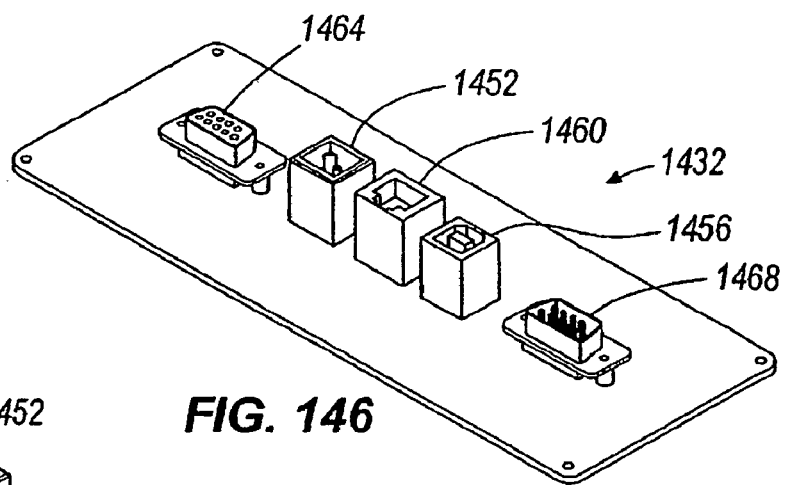
FIG. 146 shows an embodiment of a peripheral device communication section of the embodiment of the interface shown in FIG. 140 according to the present invention.
Figure 147:
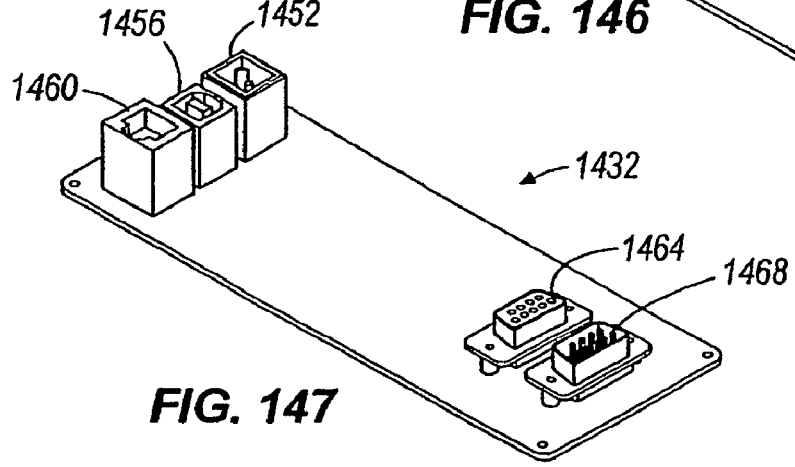
FIG. 147 shows a second embodiment of the peripheral device communication section shown in FIG. 146.
Figure 148:
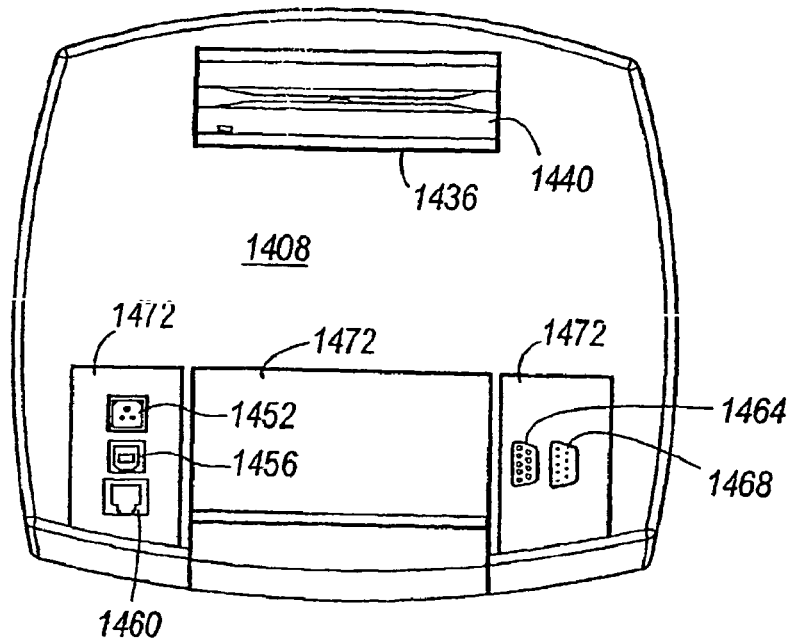
FIG. 148 shows a perspective view of the embodiment of the interface shown in FIG. 140 according to the present invention.
Figure 149:
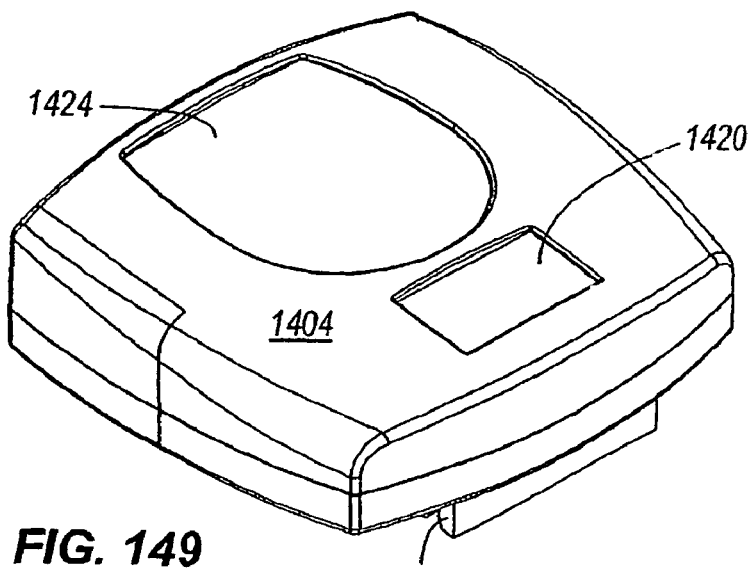
FIG. 149 shows a bottom view of the embodiment of the interface shown in FIG. 140 according to the present invention.
Figure 150:
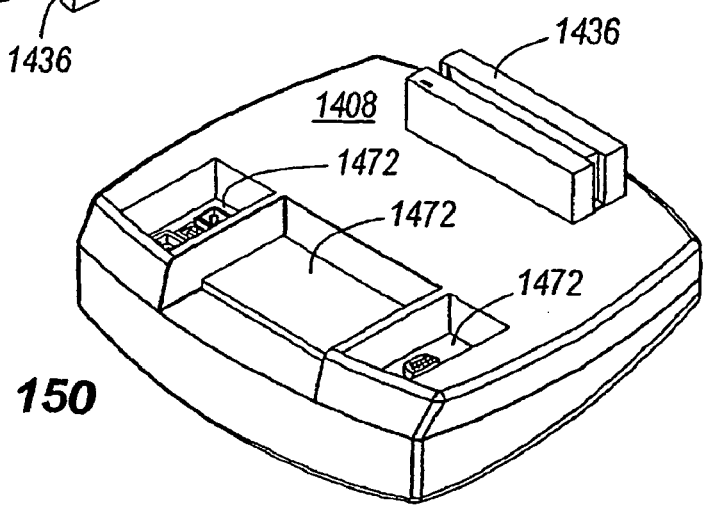
FIG. 150 shows a top view of the embodiment of the interface shown in FIG. 140 according to the present invention.

An embodiment of the peripheral device communication section 1432 is shown in FIG. 146. The peripheral device communication section 1432 includes a 3-pin power jack 1452, a universal serial bus ("USB") port 1456, a printer port 1460, a personal computer ("C") serial female port 1464, and a PC serial male port 1468. A second embodiment of the peripheral device communication section 1432 is shown in FIG. 147, wherein like parts are identified with like reference numerals. Referring back to FIG. 140, the peripheral device communication section 1432 is generally located near the bottom side 1412 on the lower shell face 1408 and is accessible at a lower shell face opening 1472. The peripheral device communication section 1432 communicates with other peripheral devices such as a laptop or a PC via the PC female port 1464 or the USB port 1456. The peripheral device communication section 1432 receives power from the 3-pin power jack 1452 during software upgrade or maintenance, detailed hereinafter. A bottom view, a top perspective view, and a bottom view of the embodiment shown in FIG. 140 are shown in FIGS. 148, 149, and 150, respectively.

Figure 151:
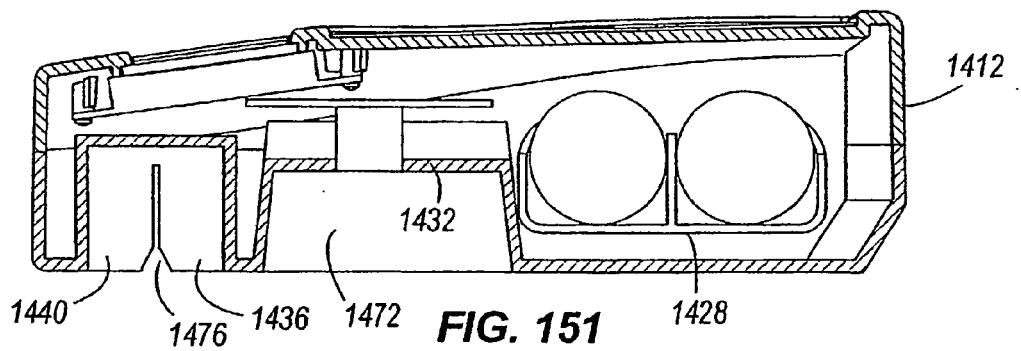
FIG. 151 shows a sectional view of another embodiment of the interface shown in FIG. 50 according to the present invention.
Figure 152:
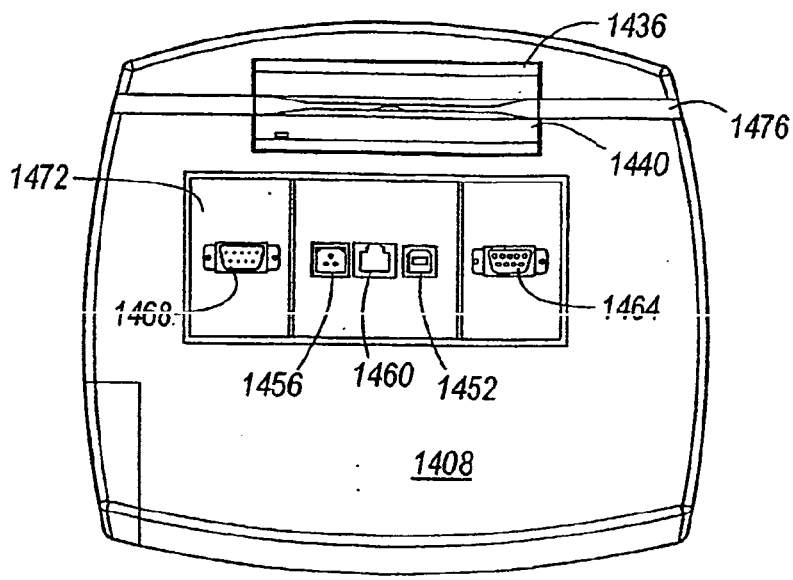
FIG. 152 shows a perspective view of the embodiment of the interface shown in FIG. 151 according to the present invention.
Figure 153:
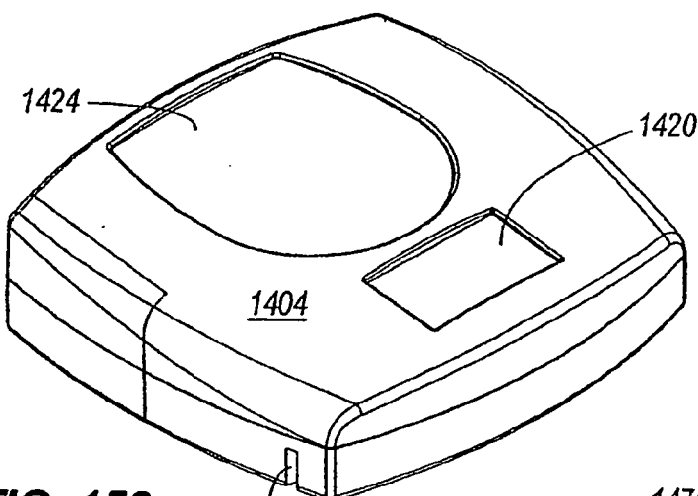
FIG. 153 shows a bottom view of the embodiment of the interface shown in FIG. 151 according to the present invention.
Figure 154:
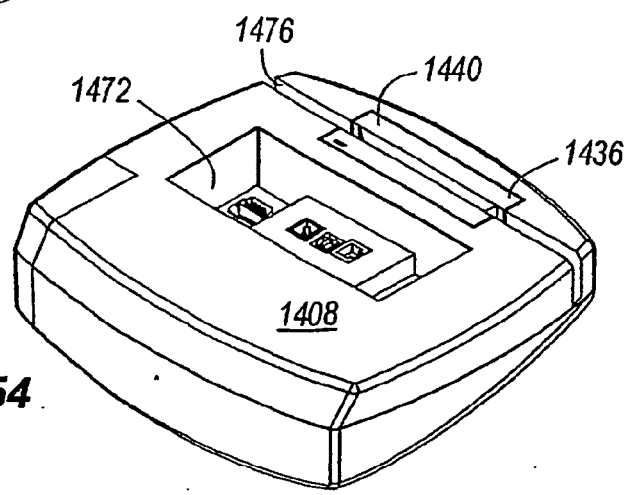
FIG. 154 shows a top view of the embodiment of the interface shown in FIG. 151 according to the present invention.

A sectional view of another embodiment of the interface 52 is shown in FIG. 151, wherein like parts are identified with like reference numerals. For example, FIG. 151 shows that the scanner section 1436 is positioned in an indentation in the lower shell face 1408 of the interface 52, instead of extending from the lower shell face 1408 as shown in FIG. 140. The scanner section 1436, in this embodiment, is accessible via a channel opening 1476. The lower shell face opening 1472 and the peripheral device communication section 1432 is also moved adjacent to the scanner section 1436. The power module 1428 is accordingly moved near the bottom side 1412. A bottom view, a top perspective view, and a bottom view of the embodiment are shown in FIGS. 152, 153, and 154, respectively.

Figure 155:
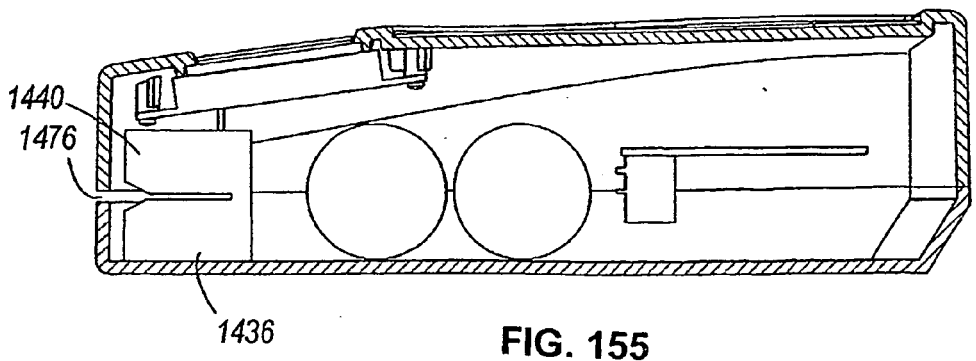
FIG. 155 shows a sectional view of another embodiment of the interface 52 shown in FIG. 50 according to the present invention.
Figure 156:
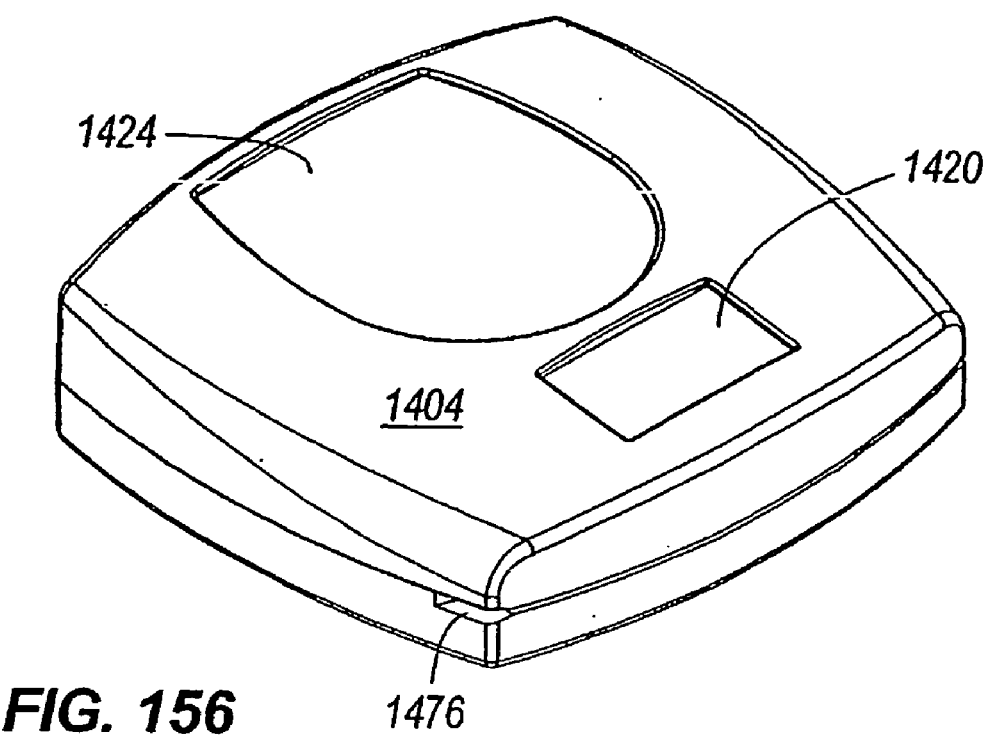
FIG. 156 shows a perspective view of the embodiment of the interface shown in FIG. 155 according to the present invention.
Figure 157:
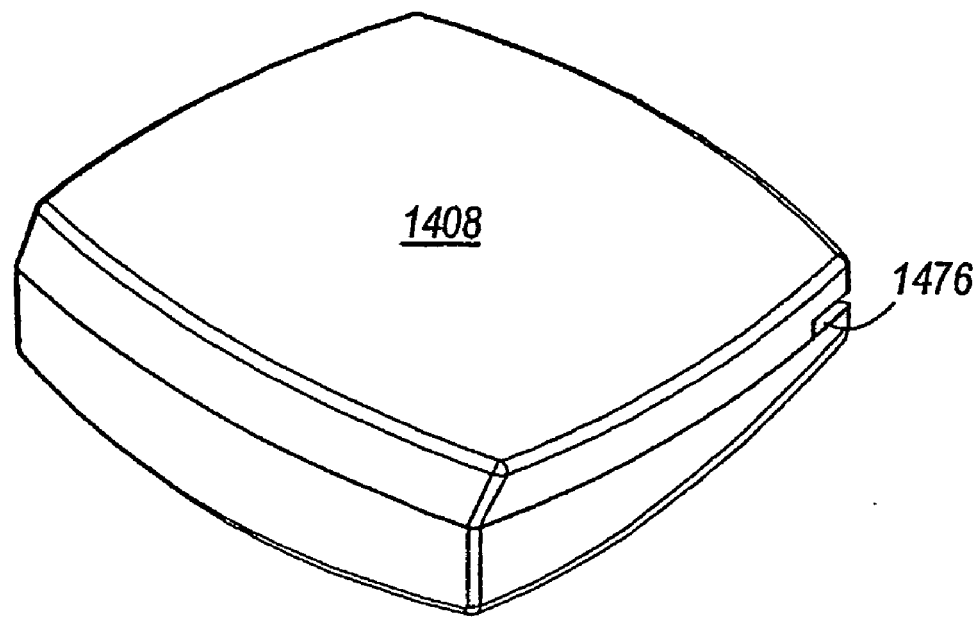
FIG. 157 shows a top view of the embodiment of the interface shown in FIG. 155 according to the present invention.

Similarly, FIG. 155 shows a sectional view of yet another embodiment of the interface 52, wherein like parts are identified with like reference numerals. FIG. 155 shows that the scanner section 1436 is embedded in the top side 1416 of the interface 52 and is accessible through the channel opening 1476. A top perspective view, and a bottom view of the embodiment are shown in FIGS. 156, and 157, respectively. The embodiment shown in FIGS. 155, 156, and 157 does not include the opening 1472 for accessing the peripheral device communication section 1432. However, the embodiment shown also provides an option of accessing the peripheral device communication section 1432 by opening up the lower shell face 1408, which can be, for example, attached to, screwed onto or latched onto the interface 52. In other embodiments, the interface 52 does not provide any peripheral device communication section options.

Figure 158:
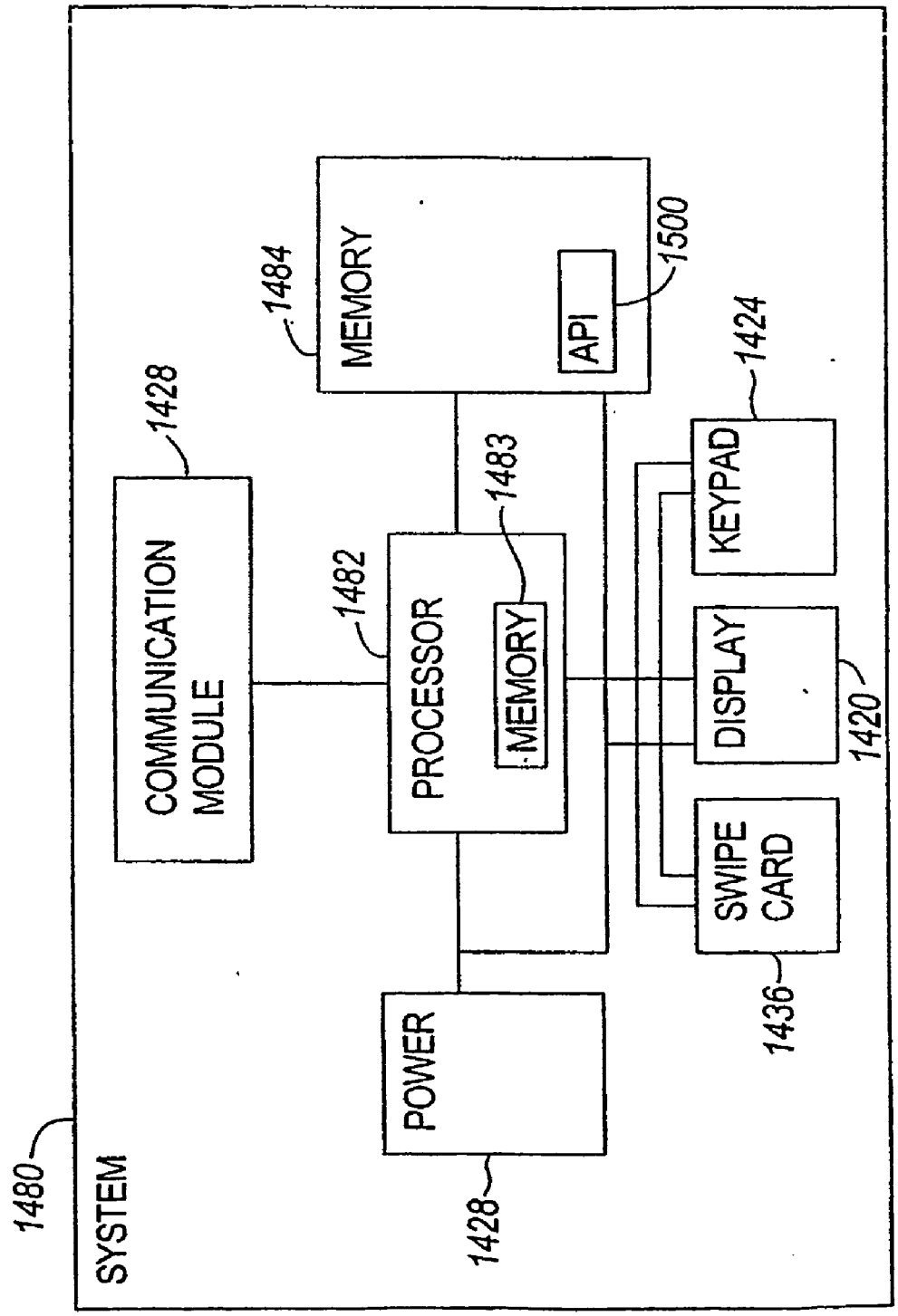
FIG. 158 shows a block diagram representing a medical scale interface system according to the present invention.

FIG. 158 shows a block diagram representing a medical scale interface system 1480 according to aspects of the present invention. The medical scale interface system 1480 includes a processor 1482 that is powered by the power module 1428. The processor 1482 shown is a low power embedded processor with a memory 1483 such as ST μPSD3254A from ST Microelectronics, or Intel 8051 micro-controller. The processor 1482 is also configured to run at different clock speeds such as 11.0 MHz when low battery life has been detected, or 24 MHz when powered by the USB port 1456. However, other processors such as a microprocessor like Motorola 6811, field programmable gate array ("FPGA"), and application specific integrated circuit ("ASIC") can also be used. The medical scale interface system 1480 may include an external memory 1484. Control software for the system 1480 is generally stored in the internal memory 1483, or in the external memory 1484. The control software is detailed hereinafter. The system 1480 also includes a communication subsystem 1486 that is coupled to the processor 1482. The communication subsystem 1486 generally includes the communication module 1432. The processor 1482 is also coupled to a plurality user interface devices such as the scanner module 1436, the display module 1420, and the keypad module 1424.

Figure 159:
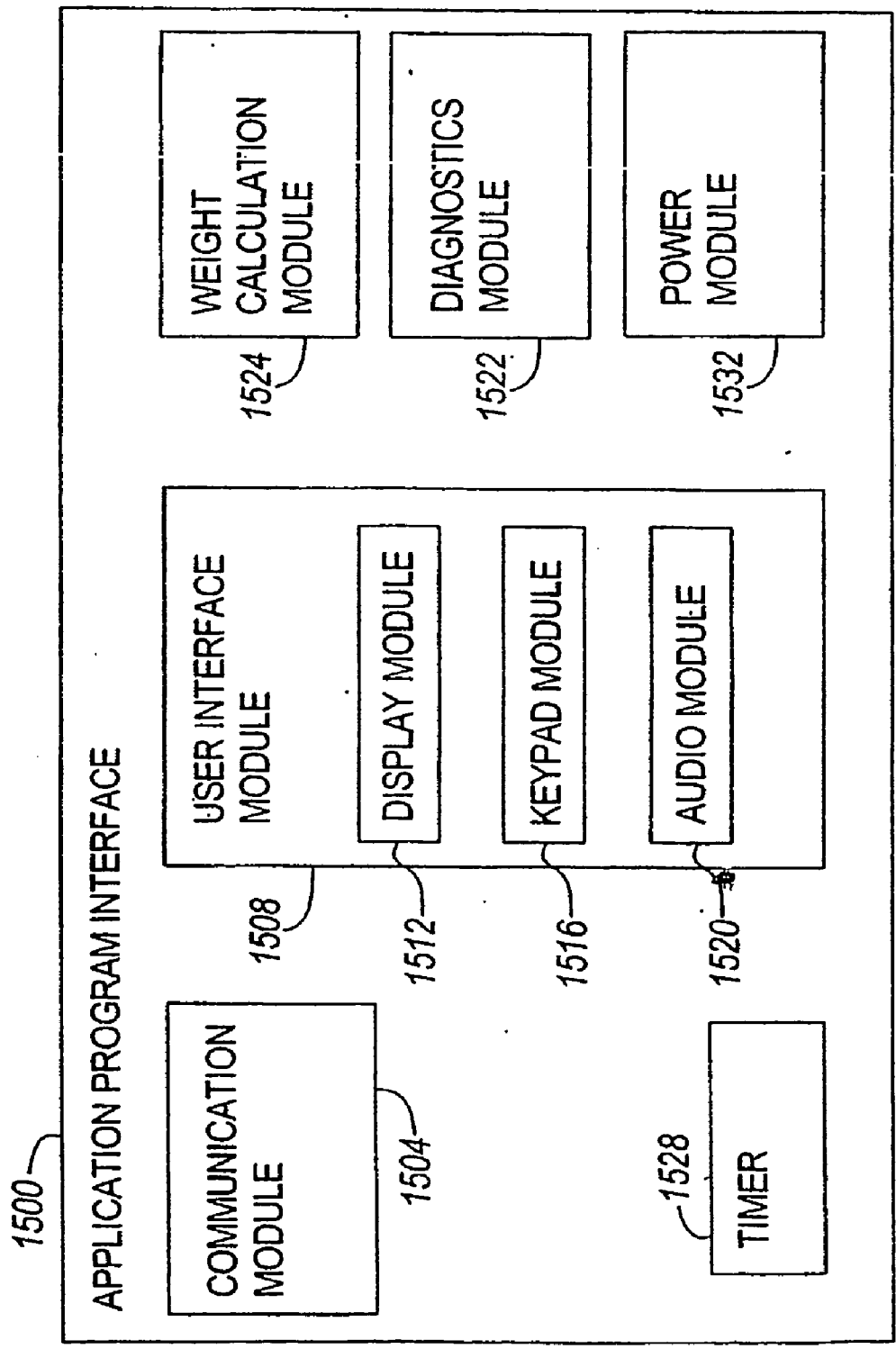
FIG. 159 shows an exemplary application program interface according to the present invention.

Furthermore, the scale 10 includes a software stored in either the internal memory 1483, or in the external memory 1484. The software manages the operations of the scale 10. For example, the software allows the scale 10 to be maintainable and upgradeable. The software also includes an application program interface ("API") that controls functions and operations of the scale 10. FIG. 159 shows an exemplary API 1500 of the scale 10 according to the present invention. Specifically, the API 1500 specifies how devices such as the display 1420, the keypad 1424, load cells and communications are accessed, manages resources and devices such as display, memory, timeouts, and peripheral devices, and supports user interface devices and functions such as screens, menus, user events and the like.

To ease the maintainability and upgradeability of the scale 10, the API 1500 is configured to communicate with peripheral devices using a peripheral device communication module 1504 via a network or a communication line and the peripheral device communication section 1432. In addition to receiving upgrade information, the peripheral device communication module 1504 can also transmit information to the peripheral devices using the network or the communication line and the peripheral device communication section 1432. The peripheral device communication module 1504 also includes functions that set up the peripheral devices for communication using the USB port 1456, a printer port 1460, the PC serial female port 1464, and the PC serial male port 1468. Once the communication between the peripheral device communication module 1504 and the peripheral devices are set up, the scale 10 can be prepared for software upgrade, for example. Specifically, the peripheral device communication module 1504 reads incoming messages that include software updates, and writes the software updates to the memory 1483, 1484. Although a PC communication port is used in the embodiment discussed, other communication types such as wireless communication can also be used.

More specifically, to retrieve and set values and parameters used on the scale 10, the peripheral device communication module 1504 provides functions that allows a user to communicate with the scale 10. For example, the peripheral device communication section 1432 can be connected a Windows® based PC via the serial port 1464 or the USB port 1456. Although the interface 52 is configured to communicate with Windows® based systems, the interface 52 can also be configured to communicate with other operating systems such as Linux, and MacOS. The API 1500 is also programmable to allow communications between other peripherals and the scale 10. For example, the peripheral device communication module 1504 can be programmed to provide scale information from the scale 10 to an peripheral device, and to receive new scale information from the peripheral device to the memory 1483, 1484 of the scale 10. After the scale information has been received, firmware of the scale 10 is updated. The interface 52 will then perform a system diagnostic to determine if there is any hardware problem on the scale 10.

For example, after a user has been weighed, the user can select to transfer his weigh to a connected PC. Specifically, the weight of the user is sent to the PC over a communication line. Along with the weight of the user, other information of the user can also be sent to the PC. For example, the user of the interface 52 can program the processor 1482 to send information such as patient identification, patient height, tare weigh, patient body mass index, and measurement unit. This data is generally stored in the memory 1483, 1484 to future retrieval purposes. Further, the interface 52 also allows a remote user over a network to retrieve information from a connected scale. When the remote user wants to retrieve the information stored in the scale memory 1483, 1484 via a remote PC, the remote PC will need to send out a data request command. When the data request command has been validated, patient information such as mentioned above will be sent over the network to the remote PC. If there is no data is stored in the scale 10, an error message is sent back to the remote user, or no patient information will be displayed.

The API 1500 also includes a user interface module 1508. The user interface module 1508 includes a soft display module 1512 that controls display functions of the display module 1420 of the scale 10. Particularly, the soft display module 1512 can control how the display 1420 is updated. For example, the display module 1512 can update by writing to the display 1444 one pixel at a time, one byte at a time (8 pixels), or the whole display 1444 at once. The soft display module 1512 can also clear the display 1444, control brightness of the display 1420, and format information to be displayed such date, time, weight, and data, using a selected preset format.

Further, the user interface module 1508 also includes a soft keypad module 1516 that controls user inputs such as the keypad 1424. When a key is pressed or released on the keypad 1424, a software event is generated with a parameter signifying which key has been pressed. There are different keycodes for pressing and releasing each key. The soft keypad module 1516 also allows the scale 10 to have a soft power on and a soft power down. Specifically, the scale 10 can be powered down using software by sending a keycode representing a power down event. Similarly, the scale 10 can be powered up using software by sending a keycode representing a power up event. The user interface module 1508 also includes an audio module 1520 that controls audio functions of the scale 10. For example, the audio module 1520 can control a speaker embedded in or connected to the interface 52 in pitch and loudness. If the speaker is already playing, the pitch and loudness will be changed to the new values. The audio module 1520 also allows the user to mute the speaker by stop transmitting signals to the speaker.

Figure 5:
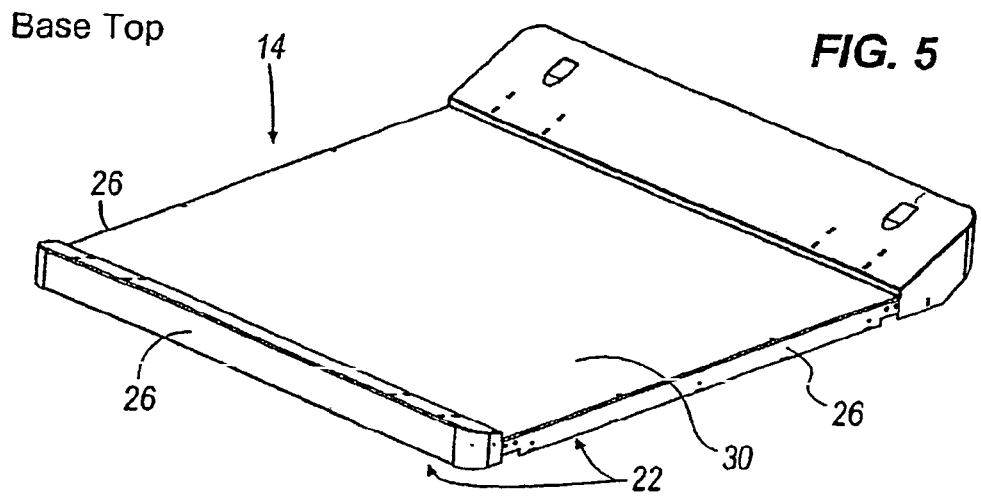
Figure 7:
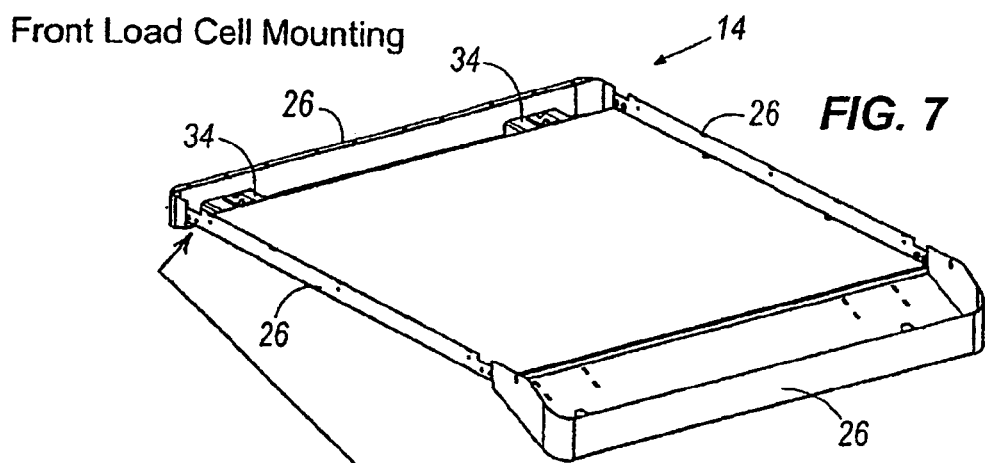
Figure 6:
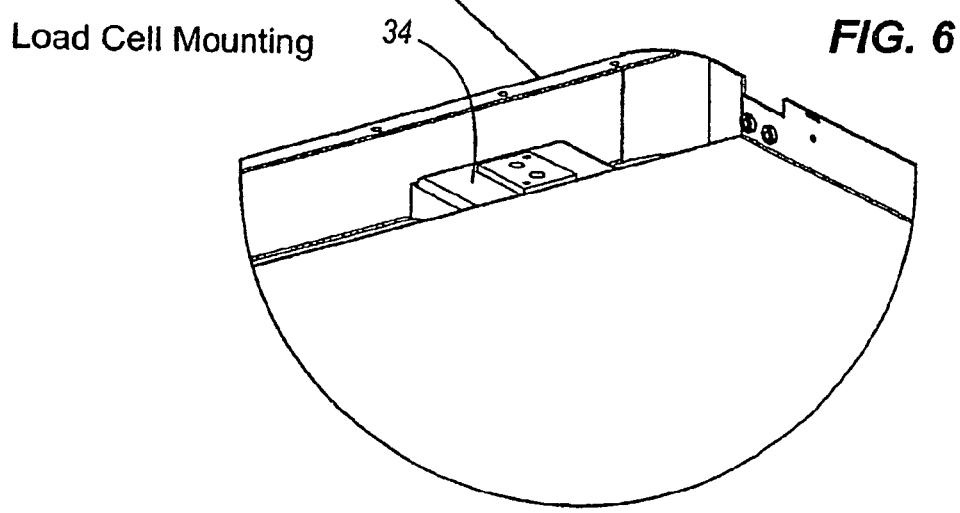

The load cells 34 of FIG. 5 are generally tested in a diagnostic module 1522. Specifically, each individual load cell 34 will be tested sequentially. If a particular load cell 34 fails the diagnostic test, a keycode representing a load cell failure will be sent to the display 1444. Otherwise, a keycode representing an okay load cell will be generated. When the load cells 34 are defective, the user can replace the defective load cells 34 with new load cells. The system 1480 will subsequently calibrate the newly installed load cells as detailed hereinafter.

To calculate a weight read or sensed by the load cells 34 (of FIG. 5), data representative of the weight sensed by the load cells 34 are polled using an software interrupt listener of a weight calculation module 1524. More specifically, the weight calculation module 1524 uses a weight function to respond to a plurality of periodic timer events (e.g. every 50 ms). The weight function reads data from each of the load cells 34 individually and sequentially. Thereafter, calibration of the load cells 34 is adjusted, and motion detection is performed, if necessary. Once calibration and motion detection has been performed, the weight calculation module 1524 will generate a validation signal that indicates when the data is valid or not. When a valid weight reading is available, it is written to the memory 1483, or 1484. The weight calculation module 1524 also generates a display refresh signal at this point, if necessary. The read data is sent to the user interface module 1508.

The user interface module 1508 also includes a plurality of miscellaneous modules such as a soft timer module 1528, and a soft power module 1532, among other things. In general, the soft timer module 1528 determines or obtains data representing current time, date, and year from the processor 1482 (of FIG. 140), and sets a system clock to the current time data. The soft timer module 1528 also includes a timer function that effectuates a timed event at a pre-determined time. The soft timer module 1528 also defines a virtual timer that will call a particular timed function repeatedly in specific time increments. An exemplary timed event is enter the interface 52 into a sleep mode. Once the soft timer module 1528 generates a keycode representative of interface sleep, the soft power module 1532 will valid the keycode. When the keycode has been validated, the processor 1482 will cause the interface 52 to enter a sleep mode. The soft power module 1532 also allows a user to set to run a specific interface function when the interface 52 is powered up.

Figure 160:
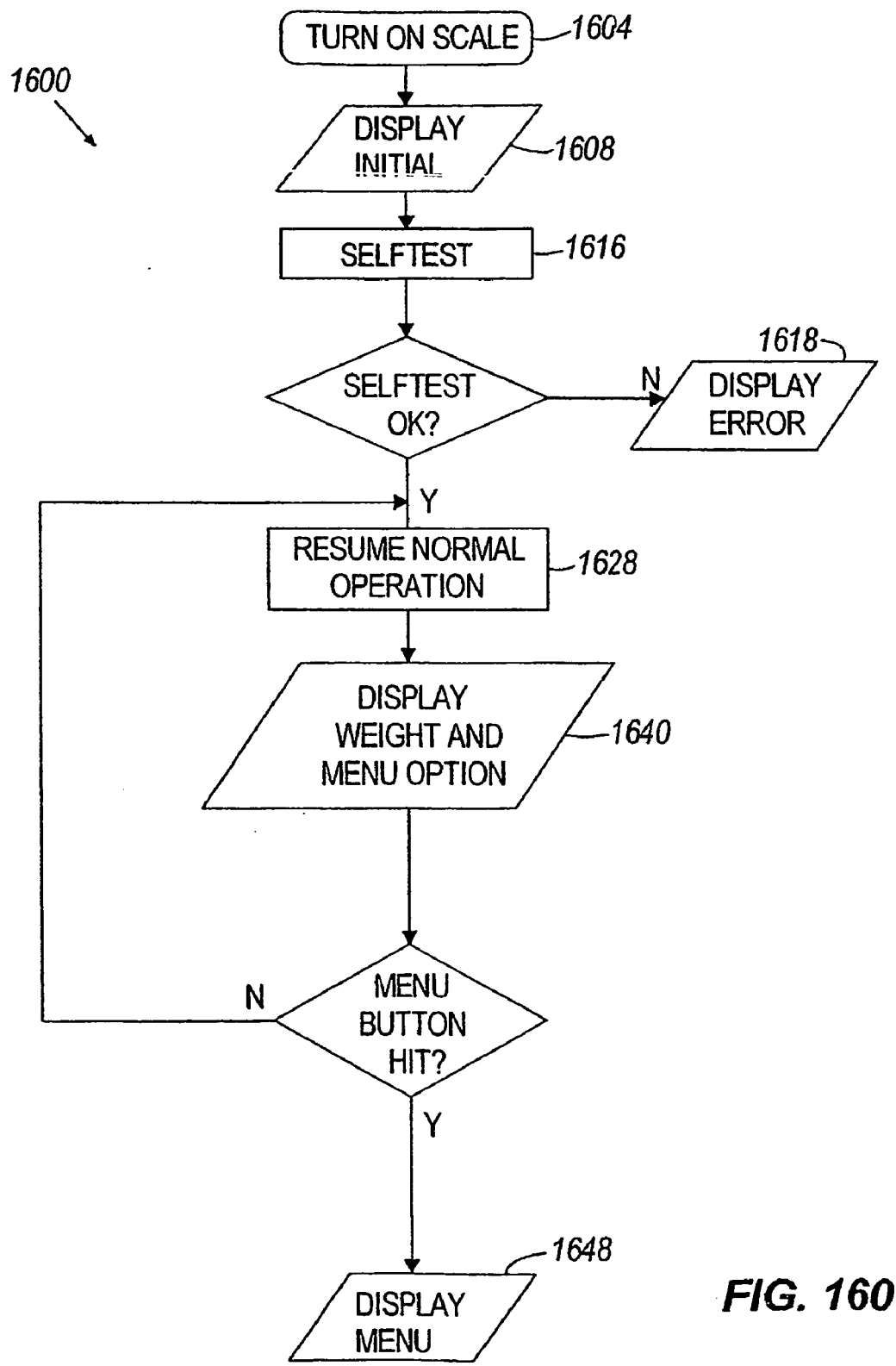
FIG. 160 shows a functionality flowchart of the medical scale according to the present invention.
Figure 161:
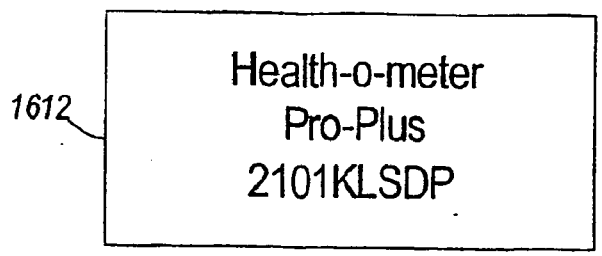
FIG. 161 shows an initial screen of the medical scale according to the present invention.

FIG. 160 shows a functionality flowchart 1600 of the scale 10 according to aspects of the present invention. After the interface 52 of the scale 10 is turned on at block 1604, the display 1420 displays an initial screen at block 1608. The initial screen is also displayed after the interface 52 has been left on for a period of time. An exemplary initial screen 1612 is shown in FIG. 161. Although the initial screen 1612 shows only the model and series numbers of the scale, the initial screen 1612 can be configured to show other information such as a time when the scale 10 was last used.

Figure 162:
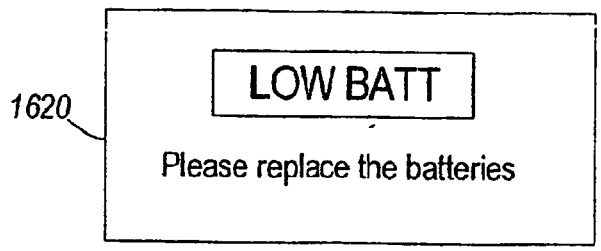
FIG. 162 shows a low power message screen of the medical scale according to the present invention.

While the initial screen 1612 is still being displayed, the interface 52 or the system 1480 will enter a self test mode at block 1616. The self test can be configured to perform a variety of diagnostic tests such as a battery life test, and a load cell test. The battery life test determines if the batteries 1430 have enough power left to operate the scale 10 without crashing. If the batteries 1430 do not have enough power left to properly operate the scale 10, the display 1420 will display messages alerting the user that the interface 52 is operating under low battery power at block 1618. An exemplary low power message screen 1620 is shown in FIG. 162. The system 1480 then turns off the scale 10, or has an option of allowing the user to operate the scale 10 under low operating power and unwarranted conditions.

Figure 163:
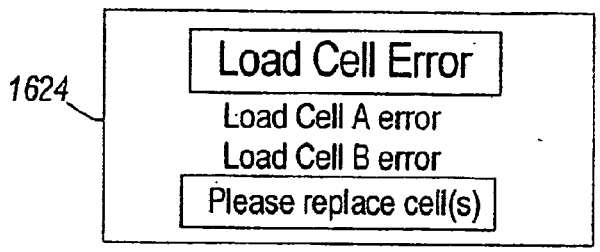
FIG. 163 shows a load cell error message screen of the medical scale according to the present invention.

Similarly, the load cell test will test each load cell 34 in sequence. If there is a defect with one or more of the load cells 34, the display 1420 will display messages alerting the user that one or more of the load cells 34 are defective at block 1618. An exemplary load cell error message screen 1624 is shown in FIG. 163. In particular, the load cell error message screen 1624 also indicates which of the load cells 34 needs to be replaced. For example, if all the load cells 34 are labeled, and each label corresponds to a load cell 34 of a particular location, the load cell error message screen 1624 can simply display the label of the defective load cell. Alternatively, the load cell error message screen 1624 can also be configured to display graphically a load cell map that shows locations of the load cells 34. Thereafter, the load cell error message screen 1624 will indicate which of the load cells 34 is defective by flashing an area of the load cell map that represents the defective load cell. The user then can simply locate the defective load cell 34 using the load cell map, or the label. If any of the load cells 34 is defective, the system 1480 will not operate until the defective load cell 34 is replaced. Furthermore, the load cells 34 are also individually replaceable. For example, when the load cell self test has determined that one or more of the load cells 34 are defective, the user can replace only the defective load cells 34 with new load cells. The newly installed load cells will be automatically detected. The detected load cells are then calibrated by the system 1480 with the diagnostic module 1522 of the API 1500. It will be appreciated that the system 1480 can also be configured to optionally require all the load cells to be replaced if one or more of the load cells are defective. In this way, the system 1480 has the options of requiring only the defective load cells to be replaced, and all the load cells to be replaced.

Figure 164:
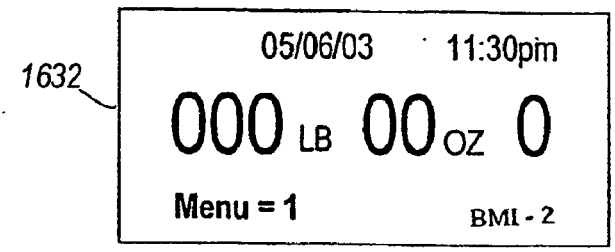
FIG. 164 shows an initial weight screen of the medical scale according to the present invention.
Figure 165:
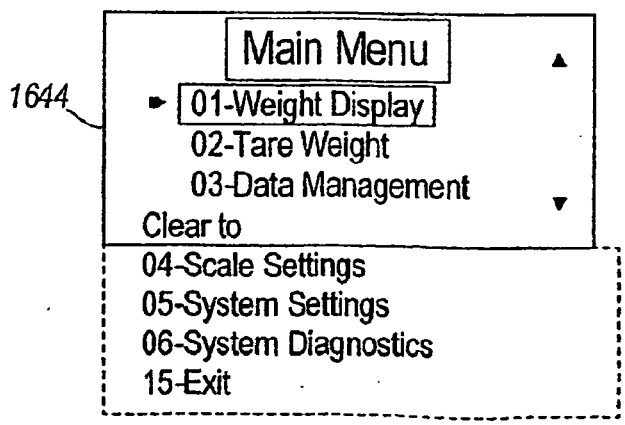
FIG. 165 shows a menu option screen of the medical scale according to the present invention.

When the self test has been performed, and there is no problem reported by the self test, the system 1480 will enter a normal operation mode at block 1628. Thereafter, the display 1420 will display an initial weight screen 1632 (see FIG. 164) or a menu option screen 1636 (see FIG. 165) at block 1640 depending on whether the interface 52 has just been activated. If the interface 52 has just been activated, the interface 52 is configured to display the initial weight screen 1632. The initial weight screen 1632 (as shown in FIG. 164) displays date and time of the weighing session, although the user has the options of turning the date and time display off, and of changing the date and time fonts. Other information such as BMI can also be displayed. When the user first gets on the scale 10, zeros will be displayed or flashed. When the system 1480 determines that the weigh is stable, the flashing will stop, and the weigh will be displayed.

After the initial weight screen 1632 has been displayed and a menu button has been selected on the keypad 1424, the system 1480 will enter a menu display mode, and displays a scrollable main menu screen 1644 (see FIG. 165) at block 1648. The main menu screen 1644 provides the user a numbered option list. For example, the user can set his preferences on the scale 10, or specify where the patient data to be stored. The user can scroll up and down to navigate within the menu screen 1644 using an up ("↑" or "▲") and a down ("⇓" or "▼") key on the keypad 1424, or by entering the option number corresponding to the options provided. The selected option will be highlighted. When the user continues to press the up key at the top of the option list, the menu screen 1644 will roll over to the bottom of the option list. Similarly, when the user continues to press the up key at the bottom of the option list, the menu screen 1644 will roll over to the top of the option list. The system 1480 can also be configured to stop at either the top of the option list or at the bottom of the option list even when the user continues to press the up or the down key.

Specifically, the menu screen 1644 is configured to provide a list of seven options, although any other number of options can also be displayed if desired. For example, the user can select to enter a weight display mode, to enter a tare weight, to configure data management, to set scale settings, to specify system settings, to perform system diagnostics, or to exit the menu screen 1644. The menu screen 1644 also provides a selection indicator 1652 indicating a selected option, while the selected option is also highlighted.

Figure 166:
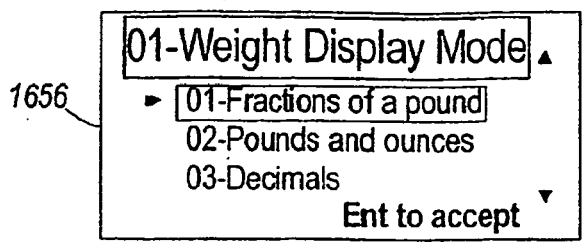
FIG. 166 shows a weight display mode screen 1656 of the medical scale according to the present invention.
Figure 167A:
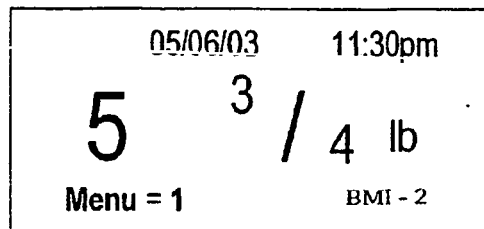
FIG. 167A shows a screen displaying the weight in pound according to the present invention.
Figure 167B:
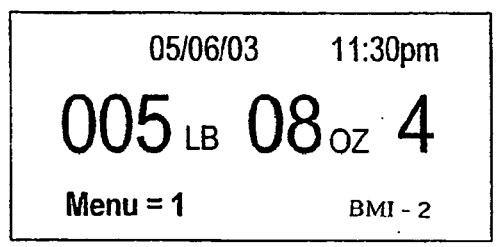
FIG. 167B shows a screen displaying the weight in decimals according to the present invention.
Figure 168:
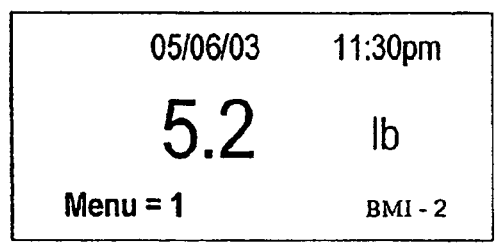
FIG. 168 shows a screen displaying the weight in pounds and ounces according to the present invention.

Once the weight display mode has been selected, the user can set the display 1420 to display different presentation styles of constitutional values from a weight display mode screen 1656 as shown in FIG. 166. For example, the display 1420 can be configured to display the weight in fraction of a pound, in decimals, or in pounds and ounces (see FIGS. 167A, 167B, and 168, respectively). If the display has been configured to display metric values, the options are generally not available. Once the style has been selected, the display 1420 will display the selected style throughout all screens. Furthermore, when the user enters a value, the value is generally entered from left to right. The value to be changed will also flash with an underline cursor to indicate the value is being changed. If there are more than one row of displayed data, the user can jump from a line to a next line by pressing an ENT key for forward jumps, or the CLEAR key for backward jumps. The user can also move from a value to a next value by pressing the up or down keys.

Figure 169:
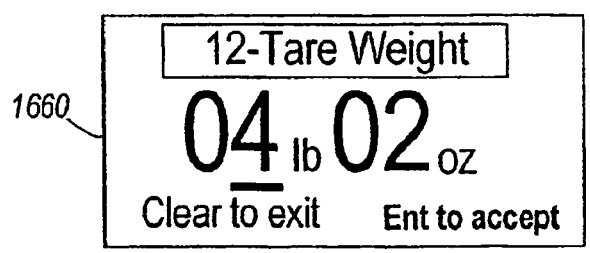
FIG. 169 shows a tare weight screen according to the present invention.
Figure 170:
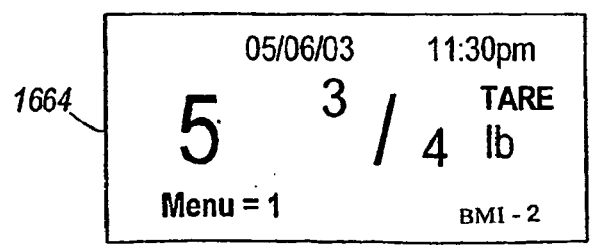
FIG. 170 shows a TARE indicator on a screen according to the present invention.

When the tare weight option has been selected in screen 1644, the display 1420 will display a tare weight screen. The user has an option of manually entering a tare weight such as a wheelchair weight, if necessary. The tare weight can also be entered using a swipe card (detailed hereinafter). If there is no weight on the scale base platform 14, there is no tare, and the weight is therefore zero. If the user presses a ZERO or a CLEAR key, the tare weight screen will be displayed to prompt the user to enter the tare weight using the keypad 1420 or the swipe card. After the tare weight has been entered, the scale 52 returns to normal operation. The tare weight is generally in memory 1483, or 1484 until it is changed or cleared. An exemplary tare weight screen 1660 is shown in FIG. 169. Once a tare weight has been entered, any weight measured will be adjusted or tarred out based on the tare weight, and the display 1420 will also indicate with a TARE indicator 1664 that the weight displayed is a tarred out weight, as shown in FIG. 170. However, there is a tare weight limit associated with the scale 10. For example, the tare weight should exceed a quarter of the capacity of the scale 10.

Figure 171:
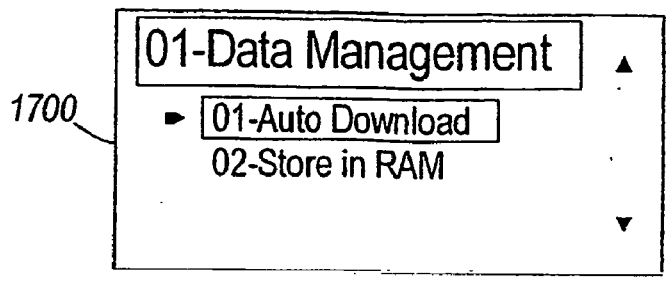
FIG. 171 shows a data management screen according to the present invention.

When the data management option has been selected in screen 1644, the display 1420 will display a data management screen 1700, as shown in FIG. 171. The data management screen 1700 provides a plurality of data transfer and storing options. For example, as shown in FIG. 171, the data management screen 1700 allows the user to automatically download or transfer a patient weight and its optional data to a connected PC via a selected port such as the USB port 1456. The data management screen 1700 also allows the user to store the patient weight and the optional data in the memory 1483, or 1484. When the user selects to automatically download or transfer the data, the data is transferred to the connected PC as soon as the user steps off the scale 10, or when the user presses a release button if the data has been kept stable using a HOLD function. However, if no PC is connected to the interface 52, the data is generally not stored or transferred, and will be lost after the weight is removed from the base 14.

Figure 172:
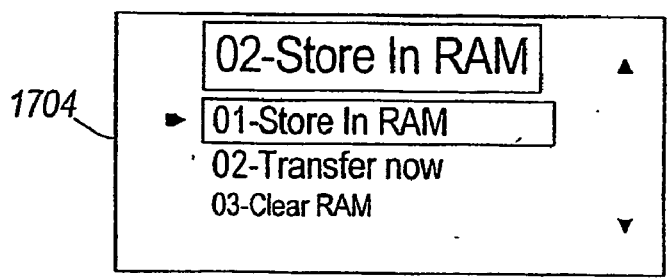
FIG. 172 shows a secondary storage screen according to the present invention.
Figure 173:
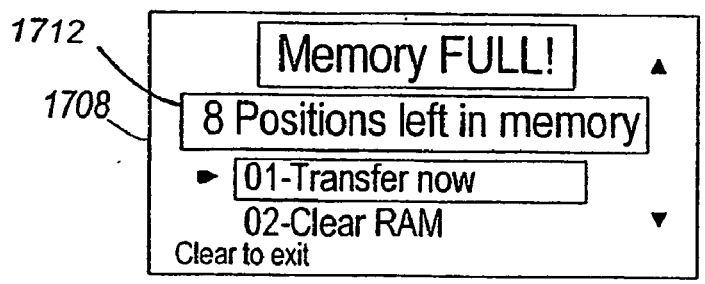
FIG. 173 shows a memory error screen according to the present invention.

However, when the user selects to store the data in memory, a secondary storage screen 1704 is displayed, as shown in FIG. 172. In this way, the data can be stored in memory for later download to peripheral devices such as a PC. The data management screen 1700 can be configured to store a variety of patient information in memory, information such as patient identification, patient weight, patient height, date in which the patient is weighed, time at which the patient is weighed, patient BMI, and the like. If the memory 1483, 1484 is full or close to full, a memory error screen 1708 is displayed, as shown in FIG. 173. The memory error screen 1708 will indicate that the memory is full or close to full. The memory error screen 1708 will also indicate an amount of available memory left in message area 1712. The amount will indicate how many positions are left in the memory. If no memory is left, the user will not be able to store new readings in the memory and these values will be lost after the weight is removed from the base 14.

Figure 174:
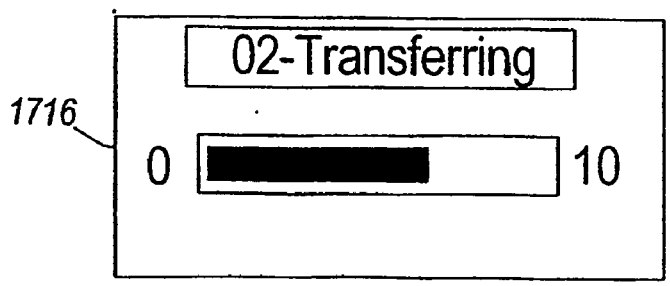
FIG. 174 shows a transfer status screen according to the present invention.
Figure 175:
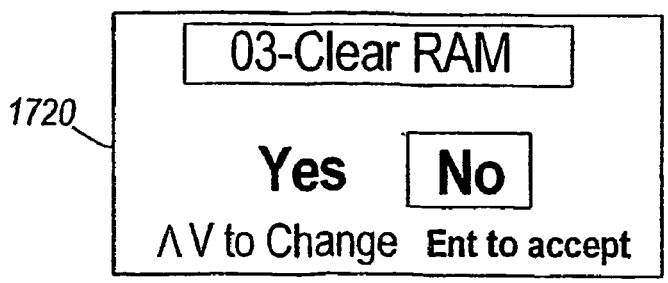
FIG. 175 shows a memory clearing screen according to the present invention.

However, the secondary storage screen 1704 provides an option of transferring all stored data to a peripheral device such as a PC (option 02), and an option of clearing all memory (option 03) such that new data can be stored in the memory. When the user selects the transfer option, the display 1420 will display a transfer status screen 1716, as shown in FIG. 174. All data stored in the memory will be transferred to the peripheral devices. After the data has been transferred, the memory is cleared. If the transfer was unsuccessful, the data is kept in the memory until the system 1480 can successfully transfer the data them, or until the memory is cleared via the clearing option. An exemplary memory clearing screen 1720 is shown in FIG. 175, the user is prompted to verify to clear the memory.

Figure 176:
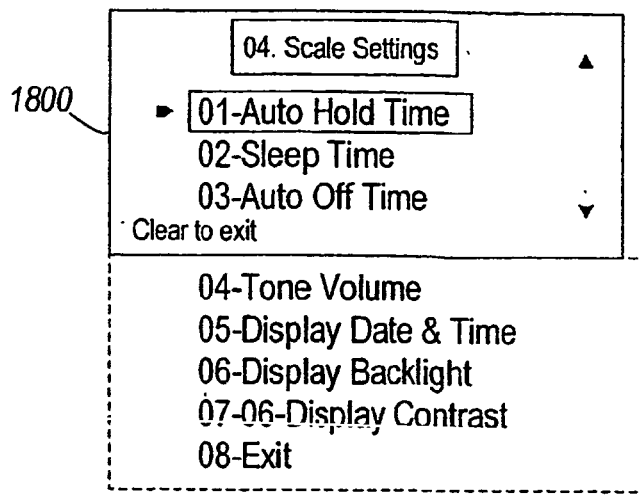
FIG. 176 shows a scale setting screen according to the present invention.
Figure 177:
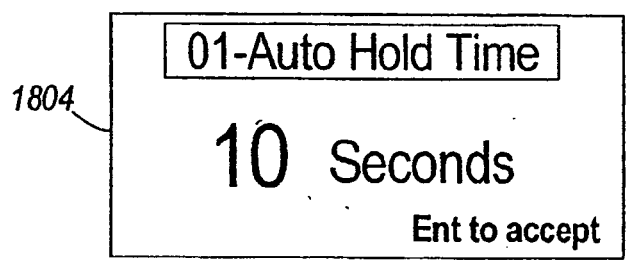
FIG. 177 shows a hold time screen according to the present invention.
Figure 178:
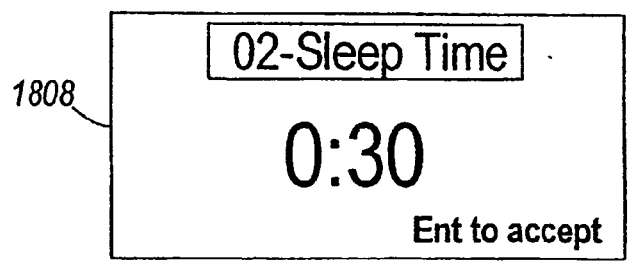
FIG. 178 shows a sleep time screen according to the present invention.

In a scale settings screen 1800 as shown in FIG. 176, the user are provided with a variety of options to change settings of the system 1480 such as automatic data hold time, sleep timer, tone volume, data and time display, display backlight, display contrast, and the like. When the user select to adjust the automatic data hold time, the user can adjust how long the system 1480 will hold the measurement data for. For example, the user can change the hold time from a default maximum of 20 seconds to a default minimum of 1 second in a hold time screen 1804, as shown in FIG. 177. The user can also adjust a time elapsed before the scale 10 goes into a sleep mode in a sleep time screen 1808, as shown in FIG. 178. The time elapsed is set to a default of 30 seconds, with a maximum of 10 minutes, although other values can also be substituted. When the scale 10 goes into the sleep mode, the scale 10 will clear the hold value on the display 1420.

Figure 179:
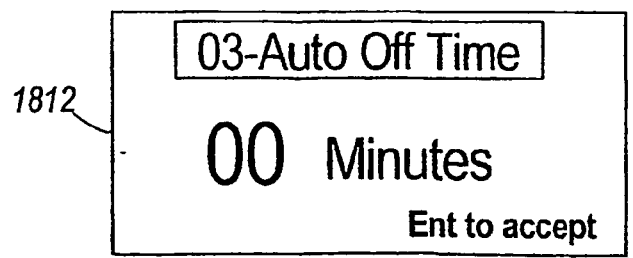
FIG. 179 shows an automatic time off screen according to the present invention.
Figure 180:
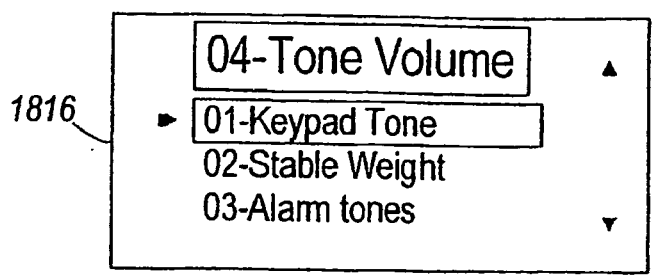
FIG. 180 shows a tone volume according to the present invention.
Figure 181:
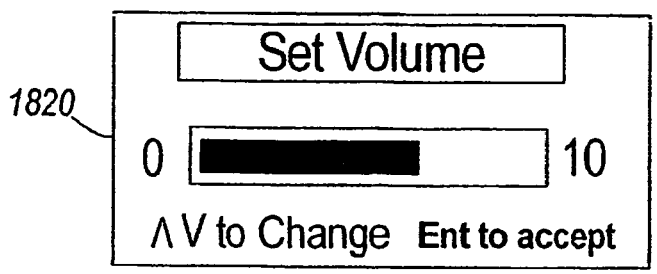
FIG. 181 shows a set tone volume screen according to the present invention.

The user can also adjust an automatic time off in screen 1812 of FIG. 179. In screen 1812, the user can determine how long the scale 10 remains active before turning off automatically. While a default of two minutes is configured, other amount of time can also be used. For example, if the amount of time is set to zero, the automatic time off function is disabled. The user can also adjust a tone volume in screen 1816, as shown in FIG. 180. For example, in screen 1816, the user has an option of enabling or disabling a beeping tone of the scale 10. The beeping tone will set off when the scale 10 has finished measuring the weight on the base 14, when a key on the keypad 1424 is pressed, when the sleep mode sets in, or when the scale 10 is turned off. Particularly, the user will have to set the tone volume in screen 1820 of FIG. 181. When the tone volume is adjusted, a beep is sound to indicate the set volume level.

Figure 182:
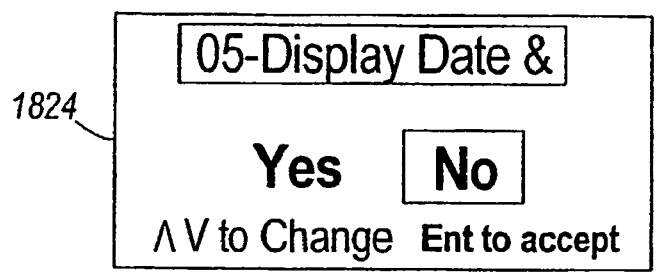
FIG. 182 shows a prompt screen according to the present invention.
Figure 183:
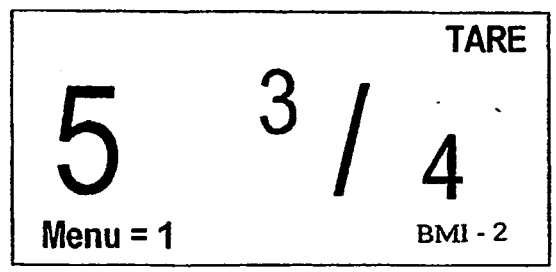
FIG. 183 shows a display with larger font characters according to the present invention.
Figure 184:
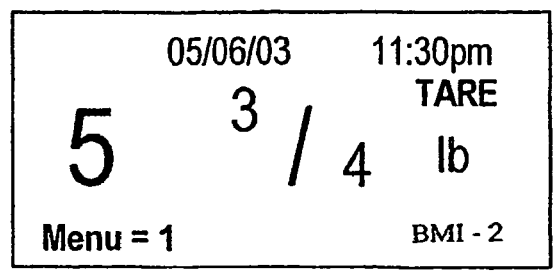
FIG. 184 shows a display with regular font characters according to the present invention.
Figure 185:
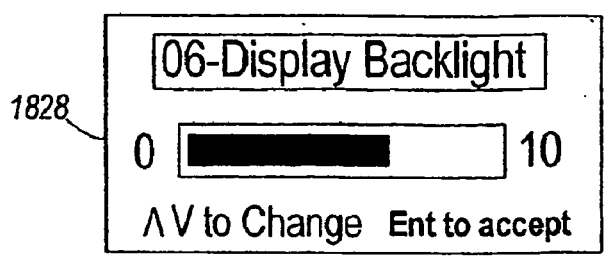
FIG. 185 shows a brightness setting screen according to the present invention.
Figure 186:
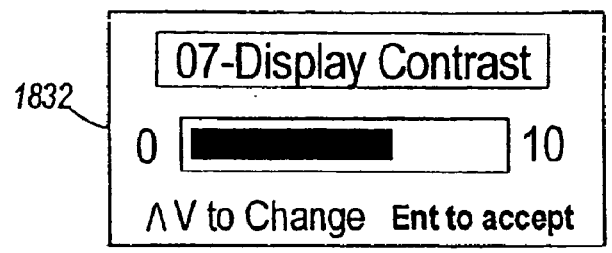
FIG. 186 shows a contrast setting screen according to the present invention.

Furthermore, the user can also choose to turn off or turn on the date and time displayed on the display 1420. Specifically, screen 1824 of FIG. 182 first prompts the user to verify the clearing command. If the user chooses to turn off the date and time display, the display 1420 will display information in larger fonts, as shown in FIG. 183. Otherwise, the fonts will remain the same as shown in FIG. 184. The user can set the brightness and the contrast of the display 1444 in screens 1828 (of FIG. 185) and 1832 (of FIG. 186), respectively.

Figure 187:
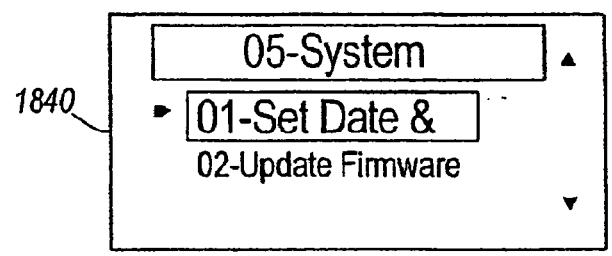
FIG. 187 shows a system setting screen according to the present invention.
Figure 188:
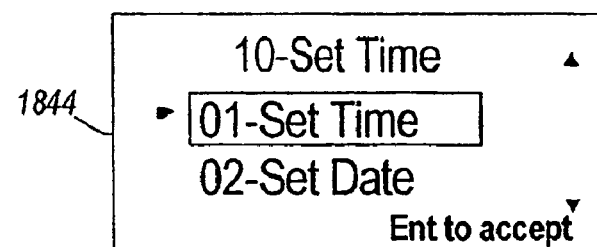
FIG. 188 shows a time setting screen according to the present invention.
Figure 189:
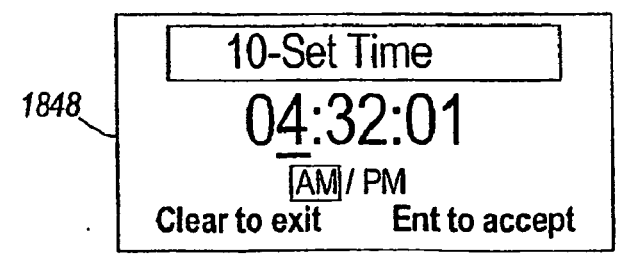
FIG. 189 shows a AM/PM setting screen according to the present invention.
Figure 190:
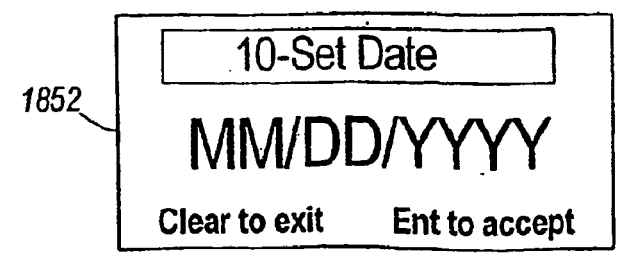
FIG. 190 shows a date setting screen according to the present invention.
Figure 191:
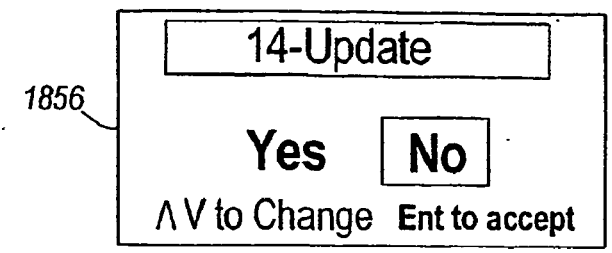
FIG. 191 shows an update screen according to the present invention.
Figure 192:
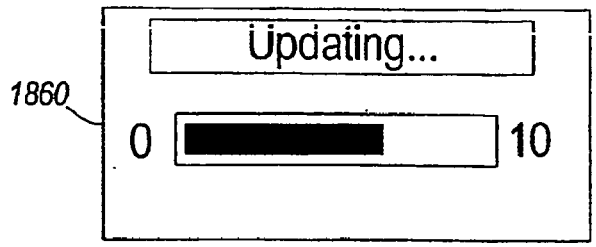
FIG. 192 shows an update status screen according to the present invention.

To adjust the system setting, the user will select the system setting option of screen 1644. Once selected, the system 1480 will display a system setting screen 1840, as shown in FIG. 187. When option 01 of screen 1840 is chosen, the user can set the time using the keypad 1424 in screen 1844 (FIG. 188). To set the time, the user will select option 01 of screen 1840. The user will then be allow to move between hours, minutes and seconds of a first line using the up and down keys in screen 1848 (FIG. 189). The user will then enter the values on the keypad 1424. The user will press the enter key once to jump to toggle between AM and PM located in a second line, and make the selection with the up and down keys. To move back to the first line, the user presses the clear key on the keypad 1424. Similar operations are used to set a date for the system 1480 in screen 1852 of FIG. 190. To update system firmware, the user will select option 02 of screen 1840. In screen 1856 of FIG. 191, the user will have an option of updating the system firmware when an update is available. When the user selects to update the system firmware, the system 1480 will prompt the user to provide the update via the USB port 1456 from peripheral devices. Once the system 1480 has determined that the update is of correct hardware and software type via the USB port 1456, an update status screen 1860 is displayed, as shown in FIG. 192. Thereafter, the update process will commence.

Figure 193:
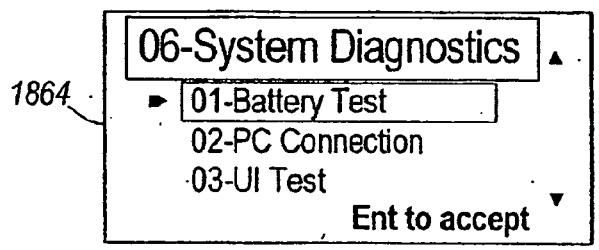
FIG. 193 shows a system diagnostics screen according to the present invention.
Figure 194:
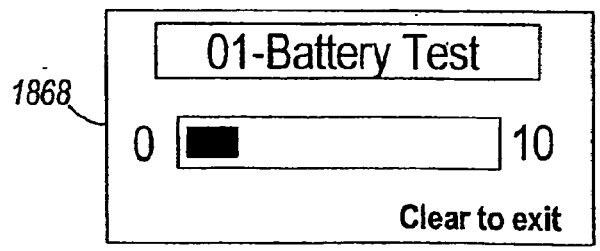
FIG. 194 shows a battery test screen according to the present invention.
Figure 195:
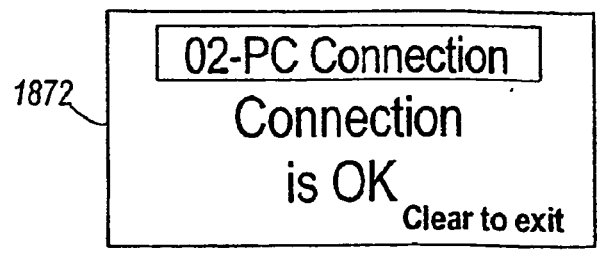
FIG. 195 shows a connection screen according to the present invention.
Figure 196:
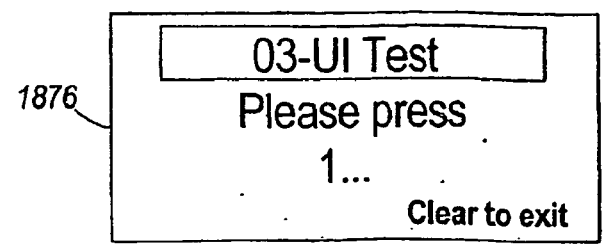
FIG. 196 shows a user interface test screen according to the present invention.

When the user selects to perform system diagnostics from screen 1644, a system diagnostics screen 1864 is displayed, as shown in FIG. 193. The system diagnostics provide a variety of diagnostic functions such as battery test, PC connection test, user interface ("UI") test, and the like. For example, when the user performs the battery test, as shown in screen 1868 of FIG. 194, the interface 52 will display an estimated amount of battery life left before the batteries 1430 will have to be replaced. To accurately test the battery life, the batteries 1430 are generally put under full load, the input/output chips are activated, the load cells 34 are polled, the swipe card reader 1436 is activated, and the backlight function is turned on. To test the PC connection, the user will select option 02 on screen 1864. The scale 10 will then test a connection to a PC, and return a message to indicate the connection is okay or not, as shown in screen 1872 of FIG. 195. The user can also select to test the user interface module 1508 by selecting option 03 of screen 1864. A UI test screen 1876 is shown in FIG. 196. The user is prompted to press different keys displayed on the display 1420.

Figure 197:
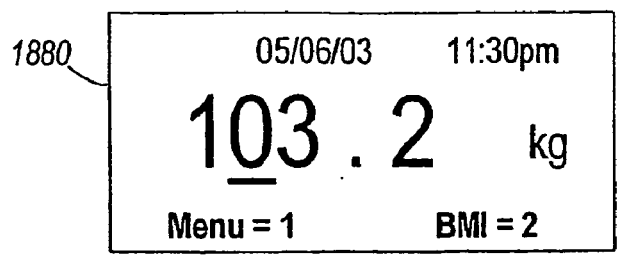
FIG. 197 shows a screen displaying information in metric system according to the present invention.
Figure 198:
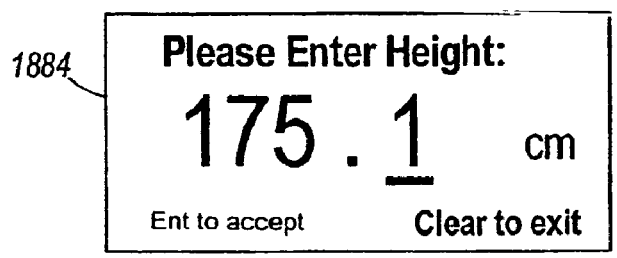
FIG. 198 shows a second screen displaying information in metric system according to the present invention.
Figure 199:
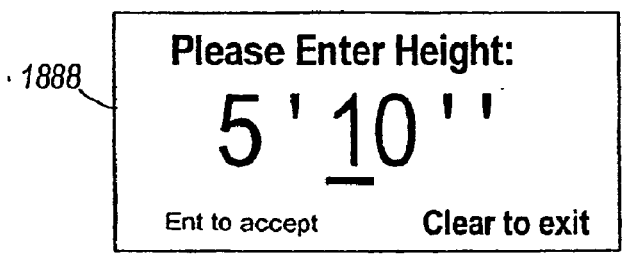
FIG. 199 shows a patient height screen according to the present invention.
Figure 200:
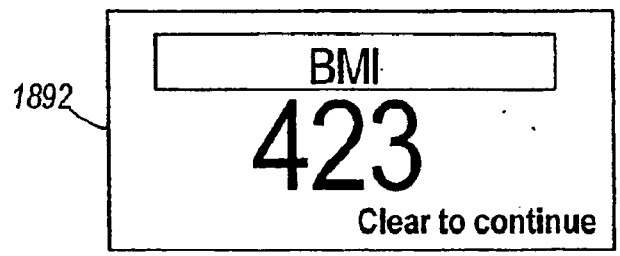
FIG. 200 shows a patient body mass index screen according to the present invention

Under a normal weighing mode, the scale 52 is set up to display and measure as described. For example, after a load is placed on the base 14, the load is weighed and measured, and weight is displayed. However, the scale 10 also allows the user to set up the scale 10 to display information in other fashion. For example, pressing a Kg/LB button on the scale 10 allows the user to switch between units of display. When the Kg/LB button is pressed, the display 1420 displays information in metric system, for example, in kilograms (with 100 gram increments) and centimeters (with 0.1 cm increments), as shown in screens 1880 and 1884 of FIGS. 197 and 198, respectively. Furthermore, the scale 10 can also be configure to determine a patient BMI. The scale 10 generally uses a patient weight, a patient height, and the like, to determine the patient BMI. These values are typically entered in screen 1888 of FIG. 199, and a resulting patient BMI is displayed in screen 1892 of FIG. 200.

The scale 10 is also configured to include watchdog functions to prevent unstable operations. Exemplary watchdog functions include battery life watchdog, unstable state watchdog, I/O watchdog, and card swipe watchdog. The battery life watchdog is to continuously check the remaining battery life. When a low battery value is reached, the system 1480 will display 1420 will flashing a battery to indicate a low battery operation. When the battery life watchdog detects that there is not enough battery life left to operate the scale 10 safely, the system 1480 is turned off automatically.

The unstable state watchdog is to check and make sure the scale 10 is in a stable state. For example, each operation that the scale 10 performs, there is a pointer that indicates a current program position. If the pointer skips a count, or cannot complete a certain operation, the unstable state watchdog will trigger an alert. If an unstable state has been identified, the scale 10 is either shut down, or reset.

The I/O watchdog functions to check for communication errors. The I/O watchdog will notify the user if the communication is incorrect while saving data to the memory, transferring data to a PC, or when there are problems communicating between the scale 10 and a PC. The card swipe watchdog will trigger an event when the user swipes a magnetic card. The card swipe watchdog will react according to the type of card swiped.

Figure 201:
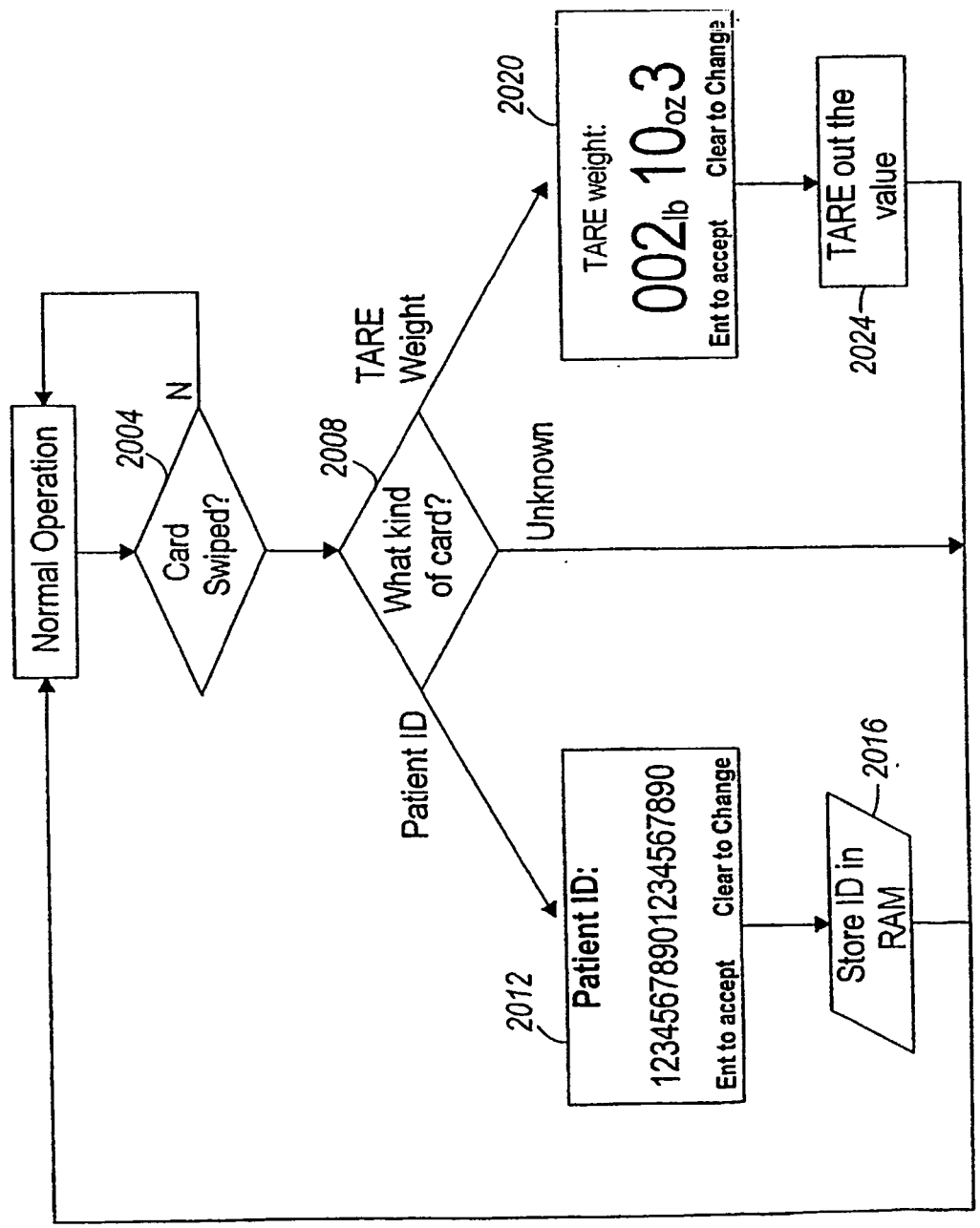
FIG. 201 shows a swipe card functional flow chart according to the present invention.

FIG. 201 shows a swipe card functional flow chart 2000 according to the present invention. As described in FIGS. 140, 151, and 155, the scale 10 includes an optional magnetic swipe card reader 1440 that is configured to read a card swiped across the channel 1476. The card generally includes patient data such as a TARE weight that the scale 10, and patient identification. When the user swipes the card, the scale 10 will detect the patient information, and react accordingly as shown in the flow chart 2000. For example, if it is determined that a card has been swiped at block 2004, the system 1480 will determine what information is stored in the swiped card at block 2008. For example, if the card contains a patient identification, screen 2012 is displayed showing the patient identification, and the patient identification is subsequently stored in the memory at block 2016. If only the tare weight is available, screen 2020 is displayed showing the tare weight. The measurement perform thereafter is tarred out by the tare weight at block 2024.

Figure 202:
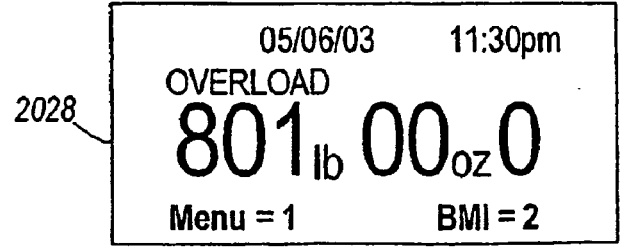
FIG. 202 shows a message screen according to the present invention.
Figure 203:
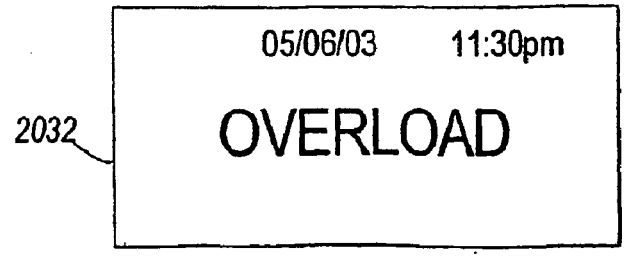
FIG. 203 shows an overload message screen according to the present invention.

The system 1480 is also configured to indicate an overload condition when the scale 10 is overloaded. Specifically, if the scale 10 is loaded with more than the allowed capacity (for example, 800 lbs), message screen 2028 (FIG. 202) is shown on the display 1420. After a final tolerance, ten pounds are reached for example, an overload message screen 2032 (FIG. 203) will be displayed showing an overload message. The overload message will be flashing until the load is removed or reduced within operating limits. While the overload message is displayed, other options (for example, menu, and BMI) will not be displayed and the corresponding functions will be disabled.

It should be understood that any of the software, hardware, communication features are useable with any of the scales 10, 10A, 10B, 10C, 10D described above.

The embodiments described above and illustrated in the figures are presented by way of example only and are not intended as a limitation upon the concepts and principles of the present invention. As such, it will be that various changes in the elements and their configuration and arrangement are possible without departing from the spirit and scope of the present invention. For example, various alternatives to the certain features and elements of the present invention are described with reference to specific embodiments of the present invention. With the exception of features, elements, and manners of operation that are mutually exclusive of or are inconsistent with each embodiment described above, it should be noted that the alternative features, elements, and manners of operation described with reference to one particular embodiment are applicable to the other embodiments.

We claim:

1. A medical scale for determining the weight of a person, the person being one of self-supported, partially self-supported and supported by a support device, said medical scale comprising:
    a base positionable on a support surface and adapted to support the person to be weighed;
    a plurality of load cells supported within the base;
    at least two spaced apart pillars coupled to and extending upwardly from the base, the pillars being spaced apart a distance to receive a portion of a person supported by a support device between the two pillars; and
    a user interface supported by the pillars and in communication with the load cells, the user interface being adjustable about a horizontal axis and about a vertical axis while supported by the pillars.

2. The medical scale of claim 1, further comprising a set of wheels coupled to the base to selectively allow the scale to be moved to another location.

3. The medical scale of claim 2, wherein the base is selectively pivotable with respect to the spaced apart pillars to move between a folded storage position and an unfolded use position.

4. The medical scale of claim 1, wherein each pillar has a first end coupled to the base and a second end positioned remote to the base, the second end of one pillar being coupled to the other pillar to provide a support surface for the user interface.

5. The medical scale of claim 4, wherein each pillar has a first portion coupled to the base and a second portion coupled to the first portion, the second portion extending from the first portion at an angle to position the support surface over a portion of the base.

6. The medical scale of claim 1, further comprising side rails coupled to and extending from the base, the side rails extending from a different side of the base than the pillars.

7. The medical scale of claim 1, wherein each load cell of the plurality of load cells is selectively diagnosed by the user interface to determine whether the load cell is properly functioning, each load cell being individually replaceable if the load cell is not properly functioning, a replacement load cell being individually calibrated by the user interface.

8. The medical scale of claim 1, wherein the user interface has a peripheral device communication module to allow selective communication with another device via a network.

9. The medical scale of claim 8, wherein the peripheral device communication module is adapted to receive and read an incoming software update and write a software update to a memory of the user interface.

10. The medical scale of claim 8, wherein the peripheral device communication module communicates information regarding the person being weighed to a remote device via the network.

11. The medical scale of claim 10, wherein the user interface further comprises a card scanner adapted to receive a user identification card, the card scanner configured to read information from the user identification card about the person being weighed and to communicate the information about the person being weighed to the user interface.

12. A medical scale for determining the weight of a person, the person being one of self-supported, partially self-supported and supported by a support device, said medical scale comprising:
    a base positionable on a support surface and adapted to support the person to be weighed;
    a set of wheels coupled to the base;
    at least two spaced apart pillars coupled to and extending upwardly from the base, the pillars being spaced apart a distance to receive a portion of a person supported by a support device, the pillars being coupled to the base at a pivot to allow selective pivotal movement between the base and the pillars;
    a user interface supported by the pillars and adjustable about a horizontal axis and about a vertical axis while supported by the pillars; and
    a plurality of load cells supported within the base and in communication with the user interface, the user interface selectively diagnosing whether each load cell is functioning properly, a non-properly functioning load cell being individually replaceable.

13. The medical scale of claim 12, wherein each pillar has a first end coupled to the base and a second end positioned remote to the base, the second end of each pillar being coupled to the other pillar to provide a support surface for the user interface.

14. The medical scale of claim 13, wherein each pillar has a first portion coupled to the base and a second portion coupled to the first portion, the second portion extending from the first portion at an angle to position the support surface over a portion of the base.

15. The medical scale of claim 12, further comprising side rails pivotally coupled to and extending from the base, the side rails extending from a different side of the base than the pillars.

16. The medical scale of claim 12, wherein the user interface has a peripheral device communication module to allow selective communication with another device via a network.

17. The medical scale of claim 16, wherein the peripheral device communication module is adapted to receive and read an incoming software update and write a software update to a memory of the user interface.

18. The medical scale of claim 16, wherein the peripheral device communication module communicates information regarding the person being weighed to a remote device via the network.

19. The medical scale of claim 18, wherein the user interface further comprises a card scanner adapted to receive a user identification card, the card scanner configured to read information from the user identification card about the person being weighed and to communicate the information about the person being weighed to the user interface.

20. A medical scale for determining the weight of a person, the person being one of self-supported, partially self-supported and supported by a support device, said medical scale comprising:
- a base positionable on a support surface and adapted to support a person to be weighed;
- a plurality of load cells supported within the base;
- a set of wheels coupled to the base;
- at least two spaced apart pillars coupled to and extending upwardly from the base, the pillars being spaced apart a distance to receive a portion of person supported by a support device, the pillars coupled to the base at a pivot to allow selective pivotal movement between the base and the pillars; and
- a user interface supported by the pillars and adjustable about a horizontal axis and about a vertical axis, the user interface communicating with the load cells and an external network, the user interface selectively diagnosing whether each load cell is functioning properly, a non-properly functioning load cell being individually replaceable, the user interface selectively receiving and reading an incoming software update from the network and writes the software update to a memory of the user interface, the user interface communicating information regarding the person being weighed to a remote device via the network, the user interface further including a card scanner adapted to receive a user identification card, the card scanner configured to read information from the user identification card about the person being weighed and to communicate the information about the person being weighed to the user interface.

21. The medical scale of claim 1, further comprising an adjustable interface mounting assembly positioned between the pillars and the user interface, the adjustable interface mounting assembly including a swivel member pivotally coupled to the pillars to allow rotation of the swivel member relative to the pillars about the vertical axis, and a pivot platform pivotally coupled to the swivel member to allow rotation of the pivot platform relative to the swivel member about the horizontal axis.

22. The medical scale of claim 12, further comprising an adjustable interface mounting assembly positioned between the pillars and the user interface, the adjustable interface mounting assembly including a swivel member pivotally coupled to the pillars to allow rotation of the swivel member relative to the pillars about the vertical axis, and a pivot platform pivotally coupled to the swivel member to allow rotation of the pivot platform relative to the swivel member about the horizontal axis.

23. The medical scale of claim 20, further comprising an adjustable interface mounting assembly positioned between the pillars and the user interface, the adjustable interface mounting assembly including a swivel member pivotally coupled to the pillars to allow rotation of the swivel member relative to the pillars about the vertical axis, and a pivot platform pivotally coupled to the swivel member to allow rotation of the pivot platform relative to the swivel member about the horizontal axis.

* * * * *